US008654291B2

(12) United States Patent
Ueda et al.

(10) Patent No.: US 8,654,291 B2
(45) Date of Patent: *Feb. 18, 2014

(54) PIXEL CIRCUIT AND DISPLAY DEVICE

(75) Inventors: Naoki Ueda, Osaka (JP); Yoshimitsu Yamauchi, Osaka (JP); Fumiki Nakano, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 71 days.

This patent is subject to a terminal disclaimer.

(21) Appl. No.: 13/504,074

(22) PCT Filed: Oct. 21, 2010

(86) PCT No.: PCT/JP2010/068581

§ 371 (c)(1),
(2), (4) Date: Apr. 25, 2012

(87) PCT Pub. No.: WO2011/052472

PCT Pub. Date: May 5, 2011

(65) Prior Publication Data

US 2012/0218246 A1    Aug. 30, 2012

(30) Foreign Application Priority Data

| Oct. 29, 2009 | (JP) | 2009-248964 |
| Apr. 15, 2010 | (JP) | 2010-094029 |
| Oct. 8, 2010 | (JP) | 2010-228756 |

(51) Int. Cl.
*G02F 1/1337* (2006.01)

(52) U.S. Cl.
USPC ............. 349/130; 349/84; 349/122; 349/123; 349/139; 349/143

(58) Field of Classification Search
USPC ............. 349/56, 84, 122, 123, 130, 139, 143
See application file for complete search history.

(56) References Cited

U.S. PATENT DOCUMENTS

| 7,893,896 B2 | 2/2011 | Choi |
| 7,928,533 B2 | 4/2011 | Zheng et al. |
| 8,310,638 B2 * | 11/2012 | Yamauchi et al. ............ 349/130 |
| 2002/0060674 A1 | 5/2002 | Tsutsui et al. |
| 2004/0066364 A1 | 4/2004 | Toyozawa et al. |

(Continued)

FOREIGN PATENT DOCUMENTS

| EP | 1 654 723 | 5/2006 |
| JP | 61-69283 | 4/1986 |

(Continued)

OTHER PUBLICATIONS

International Search Report mailed Nov. 30, 2010, directed to International Application No. PCT/JP2010/068581; 4 pages.

*Primary Examiner* — Jennifer Doan

(74) *Attorney, Agent, or Firm* — Morrison & Foerster LLP

(57) ABSTRACT

A display device in which low power consumption is realized without lowering an aperture ratio is provided. A liquid crystal capacitive element Clc is sandwiched between a pixel electrode 20 and an opposite electrode 80. The pixel electrode 20, one end of a first switch circuit 22, one end of a second switch circuit 23 and a first terminal of a second transistor T2 form an internal node N1. The other terminals of the first switch circuit 22 and the second switch circuit 23 are connected to a source line SL. The second switch circuit 23 is a series circuit composed of a first transistor T1 and a diode D1. A control terminal of the first transistor T1, a second terminal of the second transistor T2 and one end of a boost capacitive element Cbst form an output node N2. The other end of the boost capacitive element Cbst and the control terminal of the second transistor T2 are connected to a boost line BST and a reference line REF, respectively. The diode D1 has a rectifying function from the source line SL to the internal node N1.

36 Claims, 40 Drawing Sheets

(56) References Cited

U.S. PATENT DOCUMENTS

| | | |
|---|---|---|
| 2004/0130544 A1 | 7/2004 | Sun |
| 2006/0232535 A1 | 10/2006 | Toyozawa et al. |
| 2006/0232577 A1 | 10/2006 | Edwards et al. |
| 2008/0136795 A1 | 6/2008 | Numao et al. |
| 2010/0149080 A1 | 6/2010 | Teranishi et al. |
| 2010/0177083 A1 | 7/2010 | Yamashita |

FOREIGN PATENT DOCUMENTS

| | | |
|---|---|---|
| JP | 61-74481 | 4/1986 |
| JP | 2002-156922 | 5/2002 |
| JP | 2003-122331 | 4/2003 |
| JP | 2004-212924 | 7/2004 |
| JP | 2005-18088 | 1/2005 |
| JP | 2006-343563 | 12/2006 |
| JP | 2007-502068 | 2/2007 |
| JP | 2007-334224 | 12/2007 |
| JP | 2010-145663 | 7/2010 |
| JP | 2010-160376 | 7/2010 |
| WO | WO-2005/015532 | 2/2005 |

* cited by examiner

PIXEL CIRCUIT AND DISPLAY DEVICE

REFERENCE TO RELATED APPLICATIONS

This application is a National Phase filing under 35 U.S.C. §371 of International Application No. PCT/JP2010/068581 filed on Oct. 21, 2010, and which claims priority to Japanese Patent Applications No. 2009-248964 filed on Oct. 29, 2009, No. 2010-094029 filed on Apr. 15, 2010, and No. 2010-228756 filed on Oct. 8, 2010.

FIELD OF THE INVENTION

The present invention relates to a pixel circuit and a display device provided with the same, and more particularly to an active matrix type display device.

BACKGROUND OF THE INVENTION

A mobile terminal such as a mobile telephone or a mobile game machine uses a liquid crystal display device as its displaying means, in general. In addition, since the mobile telephone is driven by a battery, it is strongly required to reduce power consumption. Therefore, information such as a time or remaining battery level which needs to be constantly displayed is displayed on a reflective subpanel. In addition, recently, both normal display by way of a full-color display and reflective constant display are required to be realized on the same main panel.

FIG. 39 shows an equivalent circuit of a pixel circuit of a general active matrix type liquid crystal display device. In addition, FIG. 40 shows a circuit arrangement example of the active matrix type liquid crystal display device having m×n pixels. In addition, each of the numbers m and n is two or more integer.

As shown in FIG. 40, a switch element composed of a thin film transistor (TFT) is provided at each intersecting point of m source lines SL1, SL2, ..., SLm and n scanning lines GL1, GL2, ..., GLn. In FIG. 39, the source lines SL1, SL2, ..., SLm are represented by a source line SL, and similarly, the scanning lines GL1, GL2, ..., GLn are represented by a scanning line GL.

As shown in FIG. 39, a liquid crystal capacitive element Clc and an auxiliary capacitive element Cs are connected in parallel through the TFT. The liquid crystal capacitive element Clc has a laminated structure in which a liquid crystal layer is provided between a pixel electrode 20 and an opposite electrode 80. The opposite electrode is also referred to as a common electrode.

In addition, in FIG. 40, as for the pixel circuit, the TFT and the pixel electrode (black rectangular part) are simply shown.

The auxiliary capacity Cs has one end (one electrode) connected to the pixel electrode 20, and the other end (the other electrode) connected to an auxiliary capacity line CSL, and is provided to stabilize a voltage of the pixel data held in the pixel electrode 20. The auxiliary capacity Cs has an effect of preventing the voltage of the pixel data held in the pixel electrode from fluctuating due to a leak current of the TFT, a fluctuation of electric capacity of the liquid crystal capacitive element Clc between a black display and a white display due to dielectric constant anisotropy of liquid crystal molecules, and a voltage fluctuation generated through parasitic capacity between the pixel electrode and a surrounding wiring. By sequentially controlling a voltage of the scanning line, the TFT connected to the scanning line is turned on, and a voltage of pixel data supplied to the source line is written in the corresponding pixel electrode with respect to each scanning line.

As for the normal display by way of the full-color display, even when display contents are still images, the same display contents are repeatedly written in the same pixel with respect to each frame. Thus, the voltage of the pixel data held in the pixel electrode is updated, so that the voltage fluctuation of the pixel data is minimized, and a high-quality display of the still image can be maintained.

Power consumption to drive the liquid crystal display device is mainly dominated by power consumption to drive a source line by a source driver, and roughly expressed by a relational expression shown in the following formula 1, wherein P represents power consumption, f represents a refreshing rate (the number of times to perform a refreshing action for one frame per unit time), C represents load capacity driven by the source driver, V represents a drive voltage of the source driver, n represents the number of scanning lines, and m represents the number of source lines. Here, the refreshing action means an action to apply the voltage to the pixel electrode through the source line while maintaining the display contents.

$$P \propto f \cdot C \cdot V^2 \cdot n \cdot m \tag{Formula 1}$$

Meanwhile, in the case of the constant display, since the display contents are still images, it is not always necessary to update the voltage of the pixel data with respect to each frame. Therefore, in order to further reduce the power consumption, a refreshing frequency is lowered at the time of this constant display. However, when the refreshing frequency is lowered, the pixel data voltage held in the pixel electrode fluctuates due to a leak current of the TFT. The voltage fluctuation leads to a fluctuation of display brightness (transmittance of liquid crystal) of each pixel, and this is recognized as a flicker. In addition, since an average potential is lowered in each frame period, a display quality could be lowered such that a sufficient contrast cannot be provided.

Here, as a method to solve the problem that the display quality is lowered due to the lowering of the refreshing frequency and to cut the power consumption at the same time in the constant display of the still image of the remaining battery level or the time display, a configuration is disclosed in the following patent document 1. According to the configuration disclosed in the patent document 1, a liquid crystal display can be implemented by both transmissive and reflective functions, and moreover, a memory part is provided in a pixel circuit in a pixel region in which the reflective liquid crystal display can be provided. This memory part holds information to be displayed in the reflective liquid crystal display part as a voltage signal. At the time of the reflective liquid crystal display, information corresponding to this voltage is displayed when the pixel circuit reads the voltage held in the memory part.

According to the patent document 1, since the memory part is composed of a SRAM, and the voltage signal is statically held, the refreshing action is not needed, so that the display quality can be maintained, and the power consumption is reduced at the same time.

Patent document 1: Japanese Unexamined Patent Publication No. 2007-334224

SUMMARY OF THE INVENTION

However, when the above-described configuration is employed in the liquid crystal display device such as the mobile telephone, it is necessary to provide a memory part to store pixel data with respect to each pixel or each pixel group, in addition to an auxiliary capacitive element to hold the voltage of the pixel data serving as analog information at the time of a normal action. This causes an increase in the number of the element and the number of signal lines to be formed on an array substrate (active matrix substrate) in the display part of the liquid crystal display device, so that an aperture ratio is lowered in a transmissive mode. In addition, when a polarity reversion drive circuit to perform AC driving for the liquid crystal is provided together with the above memory part, the aperture ratio is further lowered. Thus, when the aperture ratio is lowered due to the increase in the number of the elements and the signal lines, brightness of the display image is lowered in the normal display mode.

In addition, at least two gradations are assumed in the above constant display mode, but a multicolored display is required to be implemented in the constant display mode. However, when such display mode is implemented in the conventional configuration, the number of the required memory parts increases as a matter of course, and accordingly the number of the elements and the number of the signal lines further increase.

The present invention was made in view of the above problems, and it is an object of the present invention to provide a pixel circuit and a display device in which a liquid crystal display is prevented from deteriorating and a display quality is prevented from being lowered at low power consumption without lowering an aperture ratio, and especially to enable a refreshing action to be performed in a multicolored display mode while preventing an increase in the number of the elements and signal lines.

In order to attain the above object, a pixel circuit according to the present invention includes a display element part including a unit display element, an internal node composing a part of the display element part, for holding a pixel data voltage applied to the display element part, a first switch circuit for transferring the pixel data voltage supplied from a data signal line to the internal node through at least a predetermined switch element, a second switch circuit for transferring a voltage supplied from the data signal line to the internal node without passing through the predetermined switch element, and a control circuit for holding a predetermined voltage corresponding to the pixel data voltage held by the internal node at one end of a first capacitive element, and controlling ON/OFF of the second switch circuit, in which the second switch circuit is a series circuit including a first transistor element having a first terminal, a second terminal, and a control terminal for controlling connection between the first and second terminals, and a diode element, the control circuit is a series circuit including a second transistor element having a first terminal, a second terminal, and a control terminal for controlling connection between the first and second terminals, and the first capacitive element, one end of each of the first and second switch circuits is connected to the data signal line, the other end of each of the first and second switch circuits, and the first terminal of the second transistor element are connected to the internal node, the diode element has a rectifying function from the data signal line to the internal node, the control terminal of the first transistor element, the second terminal of the second transistor element, and one end of the first capacitive element are connected to each other to form an output node of the control circuit, the control terminal of the second transistor element is connected to a first control line, and the other end of the first capacitive element is connected to a second control line.

At this time, the predetermined switch element may include a third transistor element having a first terminal, a second terminal, and a control terminal for controlling connection between the first and second terminals, and its control terminal may be connected to a scan signal line.

In addition, the second switch circuit is a series circuit including the first transistor element, the diode element, and a fourth transistor element having a first terminal, a second terminal, and a control terminal for controlling connection between the first and second terminals, and its control terminal may be connected to the second control line or a third control line different from the second control line.

In addition, in the above configuration, the first switch circuit may be a series circuit including the fourth transistor element in the second switch circuit and the predetermined switch element, or a series circuit including a fifth transistor element having a control terminal connected to the control terminal of the fourth transistor element in the second switch circuit and the predetermined switch element.

Furthermore, in addition to the above configuration, the pixel circuit according to the present invention having other characteristics further includes a second capacitive element having one end connected to the internal node, and the other end connected to a fourth control line or a predetermined fixed voltage line.

In addition, according to a display device of the present invention, a pixel circuit array includes the above pixel circuits arranged in a row direction and a column direction, the data signal line is provided with respect to each of the columns, one end of the first switch circuit in each of the pixel circuits arranged in the same column is connected to the common data signal line, the control terminal of the second transistor element in each of the pixel circuits arranged in the same row or the same column is connected to the common first control line, and the other end of the first capacitive element in each of the pixel circuits arranged in the same row or the same column is connected to the common second control line, and the display device includes a data signal line drive circuit for driving the data signal lines individually, and a control line drive circuit for driving the first and second control lines individually.

In addition to the above characteristics, according to the display device of the present invention having other characteristics, the predetermined switch element is a third transistor element having a first terminal, a second terminal, and a control terminal for controlling ON between the first and second terminals, and the control terminal is connected to a scan signal line, the scan signal line is provided with respect to each of the rows, and the pixel circuits arranged in the same row are connected to the common scan signal line, and a scan signal line drive circuit for driving the scan signal lines individually is provided.

Here, when the second switch circuit is a series circuit including the first transistor element, the diode element, and a fourth transistor element having a first terminal, a second terminal, and a control terminal for controlling connection between the first and second terminals, the control terminal of the fourth transistor element in each of the pixel circuits arranged in the same row or the same column may be connected to the common second control line. Alternatively, the control terminal of the fourth transistor element may be connected to the common third control line. In this case, the third control line is controlled by the control line drive circuit.

In addition, in the above configuration, the first switch circuit may be a series circuit including the fourth transistor element in the second switch circuit, and the third transistor element, or a series circuit including a fifth transistor element having a control terminal connected to the control terminal of the fourth transistor element in the second switch circuit, and the third transistor element.

In addition to the above characteristics, according to the display device of the present invention, at a time of a writing action for writing the pixel data in the pixel circuits arranged in one selected row individually, the scan signal line drive circuit applies a predetermined selected row voltage to the scan signal line in the selected row to turn on the third transistor elements arranged in the selected row, and applies a predetermined unselected row voltage to the scan signal line in an unselected row to turn off the third transistor elements arranged in the unselected row, and the data signal line drive circuit applies a data voltage corresponding to the pixel data to be written in the pixel circuit in each column in the selected row, to the data signal lines, individually.

Here, at the time of the writing action, it is preferable that the control line drive circuit applies a predetermined voltage to the first control line to turn on the second transistor element.

In addition, according to the display device of the present invention, at a time of a writing action for writing the pixel data in the pixel circuits arranged in one selected row individually, the scan signal line drive circuit applies a predetermined selected row voltage to the scan signal line in the selected row to turn on the third transistor elements arranged in the selected row, and applies a predetermined unselected row voltage to the scan signal line in an unselected row to turn off the third transistor elements arranged in the unselected row, the control line drive circuit applies a predetermined selecting voltage to the second control line arranged in the selected row to turn on the fourth transistor elements, and applies a predetermined non-selecting voltage to the second control line in the unselected row to turn off the fourth transistor elements, and the data signal line drive circuit applies a data voltage corresponding to the pixel data to be written in the pixel circuit in each column in the selected row, to the data signal lines, individually.

In addition, when the control terminal of the fourth transistor element of the pixel circuit is connected to the third control line, the control line drive circuit may apply the selecting voltage to the third control line in the selected row, and apply the non-selecting voltage to the third control line in the unselected row.

In addition, according to the display of the present invention, the internal node of each of the pixel circuits in the pixel circuit array holds one voltage state among a plurality of discrete voltage states, in which multi-gradation is implemented by the different voltage states, and at a time of a self refreshing action for compensating voltage fluctuations of the internal nodes at the same time by activating the second switch circuits and the control circuits in the plurality of pixel circuits, the scan signal line drive circuit applies a predetermined voltage to the scan signal lines connected to all the pixel circuits in the pixel circuit array to turn off the third transistor elements, the data signal line drive circuit applies a refreshing input voltage provided by adding a predetermined first adjusting voltage corresponding to a voltage drop in the second switch circuit, to a refreshing desired voltage corresponding to the voltage state of a target gradation to be subjected to a refreshing action, to the data signal line, and the control line drive circuit applies a refreshing reference voltage provided by adding a predetermined second adjusting voltage corresponding to a voltage drop in the first control line and the internal node, to a refreshing isolation voltage defined by a middle voltage between a voltage state of a gradation one step lower than the target gradation and the voltage state of the target gradation, to the first control line, and applies a boost voltage having a predetermined amplitude to the second control line to apply a voltage change due to capacitive coupling through the first capacitive element, to the output node, and when the voltage state of the internal node is higher than the refreshing desired voltage, the diode element is reversely biased from the data signal line to the internal node, and the data signal line and the internal node are not connected, when the voltage state of the internal node is lower than the refreshing isolation voltage, a potential fluctuation of the output node due to the boost voltage application is suppressed, the first transistor element is turned off, and the data signal line and the internal node are not connected, and when the voltage state of the internal node is higher than the refreshing isolation voltage and lower than the refreshing desired voltage, the diode element is forwardly biased from the data signal line to the internal node, the potential fluctuation of the output node is not suppressed, the first transistor element is turned on, and the refreshing desired voltage is applied to the internal node, so that the refreshing action is executed for the pixel circuit having the internal node showing the voltage state of the target gradation.

In addition, as other characteristics, when the first switch circuit of the pixel circuit includes the fourth transistor element or the fifth transistor element, the control line drive circuit applies a predetermined voltage to the third control line to turn on the fourth transistor element, and applies a boost voltage having a predetermined amplitude to the second control line to apply a voltage change due to capacitive coupling through the first capacitive element, to the output node to execute the refreshing action for the pixel circuit having the internal node showing the voltage state of the target gradation.

In addition, in the above case, it is preferable that a predetermined voltage is applied to the third control line after the refreshing reference voltage is applied to the first control line, and the boost voltage is applied to the second control line.

In addition to the above characteristics, as other characteristics, under the condition that the third transistor element is turned off, the refreshing input voltage is applied to the data signal line, and the refreshing reference voltage is applied to the first control line, the action to apply the boost voltage to the second control line is executed several times while changing the values of the refreshing input voltage and the refreshing isolation voltage, so that the refreshing action is sequentially executed for the pixel circuits having the internal nodes showing the voltage states of different gradations.

At this time, the boost voltage is applied while the refreshing input voltage and the refreshing isolation voltage are changed the number of times provided by subtracting one from the number of gradations corresponding to the number of the voltage states held by the internal node of each of the pixel circuits in the pixel circuit array.

In addition to the above characteristics, according to the display device of the present invention having other characteristics, after completion of a refreshing step including the action in which the action to apply the boost voltage to the second control line is executed several times while changing the values of the refreshing input voltage and the refreshing isolation voltage under the condition that the third transistor element is turned off, the refreshing input voltage is applied to the data signal line, and the refreshing reference voltage is applied to the first control line, a stand-by step is executed in such a manner that the data signal line drive circuit applies a voltage corresponding to a minimum value of the voltage state held by the internal node to the data signal line, and the control line drive circuit does not apply the boost voltage to the second control line, and applies a voltage to the first control line over at least a given time to turn on the second transistor element regardless of the voltage state of the internal node.

At this time, it is preferable that after the stand-by step is executed over a time which is ten times as long as that of the refreshing step, the refreshing step is executed again.

In addition, in the above configuration, it is preferable that the first adjusting voltage is a turn-on voltage of the diode element. In addition, it is preferable that the second adjusting voltage is a threshold voltage of the second transistor element.

In addition, according to the present invention having other characteristics, at the time of the self refreshing action, under the condition that a first gradation is set as the target gradation, the refreshing input voltage is applied to the data signal line, and the refreshing reference voltage is applied to the first control line, the boost voltage is applied to the second control line, and then with the boost voltage continuously applied, a second gradation one step higher than the first gradation is set as the target gradation, the refreshing reference voltage applied to the first control line is changed, and thereafter the refreshing input voltage applied to the data signal line is changed, so that the refreshing action is sequentially executed for the pixel circuits having the internal nodes showing the voltage states of different gradations.

Thus, in a case where a gradation higher than the second gradation exists, after completion of the refreshing action for the second gradation, with the boost voltage continuously applied, an action is repeatedly executed in such a manner that a one step higher gradation is set as the target gradation, the refreshing reference voltage applied to the first control line is changed, and thereafter the refreshing input voltage applied to the data signal line is changed.

In addition, in the above method, when the control terminal of the fourth transistor element is connected to the common third control line, in addition to applying the boost voltage to the second control line, a predetermined voltage may be applied to the third control line to turn on the fourth transistor element. At this time, after the target gradation is changed to the second gradation, the boost voltage is continuously applied to the second control line, and the predetermined voltage is continuously applied to the third control line to turn on the fourth transistor element.

Thus, in a case where a gradation higher than the second gradation exists, after completion of the refreshing action for the second gradation, with the boost voltage and the predetermined voltage to turn on the fourth transistor element continuously applied, an action is repeatedly executed in such a manner that a one step higher gradation is set as the target gradation, the refreshing reference voltage applied to the first control line is changed, and thereafter the refreshing input voltage applied to the data signal line is changed.

When the self refreshing action is performed by the above method, the refreshing action for the different gradations can be executed while preventing the number of times to change the boost voltage from being increased, so that power consumption is further reduced.

In addition, according to the display device according to the present invention having other characteristics, the second control lines connected to the other ends of the first capacitive elements of the pixel circuits arranged in odd-numbered rows or odd-numbered columns are electrically connected to each other, the second control lines connected to the other ends of the first capacitive elements of the pixel circuits arranged in even-numbered rows or even-numbered columns are electrically connected to each other, and the second control line connected to the other end of the first capacitive element of each of the pixel circuits arranged in the odd-numbered row or the odd-numbered column and the second control line connected to the other end of the first capacitive element of each of the pixel circuits arranged in the even-numbered row or the even-numbered column are not electrically connected to each other, and driven by the control line drive circuit individually.

In addition, according to the display device according to the present invention having other characteristics, the second control lines connected to the other ends of the first capacitive elements, and the third control lines connected to the control terminals of the forth transistor elements are electrically connected to each other, respectively in the pixel circuits arranged in odd-numbered rows or odd-numbered columns, the second control lines connected to the other ends of the first capacitive elements, and the third control lines connected to the control terminals of the forth transistor elements are electrically connected to each other, respectively in the pixel circuits arranged in even-numbered rows or even-numbered columns, the second control line connected to the other end of the first capacitive element of each of the pixel circuits arranged in the odd-numbered row or the odd-numbered column, and the second control line connected to the other end of the first capacitive element of each of the pixel circuits arranged in the even-numbered row or the even-numbered column are not electrically connected to each other, and driven by the control line drive circuit individually, and the third control line connected to the control terminal of the fourth transistor terminal of each of the pixel circuits arranged in the odd-numbered row or the odd-numbered column, and the third control line connected to the control terminal of the fourth transistor terminal of each of the pixel circuits arranged in the even-numbered row or the even-numbered column are not electrically connected to each other, and driven by the control line drive circuit individually.

According to the display device of the present invention having other characteristics, a terminal, which is opposite to a terminal connected to the internal node, of the terminals of the unit display element is connected to a common electrode, and the writing is performed in such a manner that at the time of the writing action for writing the pixel data in the pixel circuit, a polarity of a potential of the internal node based on a potential of the common electrode is changed between the pixel circuits arranged in the odd-numbered row or the odd-numbered column, and the pixel circuits arranged in the even-numbered row or the even-numbered column.

According to the display device of the present invention having other characteristics, two high and low voltages are allowed to be applied to the common electrode, and the two high and low voltages to be applied to the common electrode are switched between a period to perform the writing action for the pixel circuits arranged in the odd-numbered row or the odd-numbered column, and a period to perform the writing action for the pixel circuits arranged in the even-numbered row or the even-numbered.

According to the display device of the present invention having other characteristics, the refreshing action is executed for the pixel circuits arranged in the odd-numbered row or the odd-numbered column in such a manner that under the condition that one of the high and low voltages is applied to the common electrode, the third transistor element is turned off, and under the condition that the refreshing input voltage is applied to the data signal line, and the refreshing reference voltage is applied to the first control line, the boost voltage is applied to the second control line connected to the odd-numbered row or the odd-numbered column, and the refreshing action is executed for the pixel circuits arranged in the even-numbered row or the even-numbered column in such a manner that after the voltage applied to the common electrode is switched to the other of the high and low voltages, under the condition that the refreshing input voltage is applied to the data signal line, and the refreshing reference voltage is applied to the first control line, the boost voltage is applied to the second control line connected to the even-numbered row or the even-numbered column.

According to the configuration of the present invention, in addition to the normal writing action, the action (self refreshing action) to restore the absolute value of the voltage between both ends of the display element part, to a value at the time of the last writing action can be performed without depending on the writing action. Especially, according to the present invention, only the pixel circuit having the internal node to be recovered to the voltage state of the target gradation can be automatically refreshed among the pixel circuits, by applying the pulse voltage one time, so that the self refreshing action can be performed in the circumstance where the multivalued voltage state is held in the internal node.

In the case where the plurality of pixel circuits are arranged, the normal writing action is executed with respect to each row in general. Thus, it is necessary to drive the driver circuit up to the number of times corresponding to the number of rows of the arranged pixel circuits.

According to the pixel circuit of the present invention, the refreshing action can be executed for the plurality of arranged pixels collectively with respect to each voltage state held therein by performing the self refreshing action. Therefore, the number of times required to drive the driver circuit from the start to the end of the refreshing action can be considerably reduced, and power consumption can be cut.

Thus, since it is not necessary to separately provide a memory part such as a SRAM in the pixel circuit, the aperture rate is not largely lowered unlike the conventional technique.

DETAILED DESCRIPTION OF THE INVENTION

Figure 39:
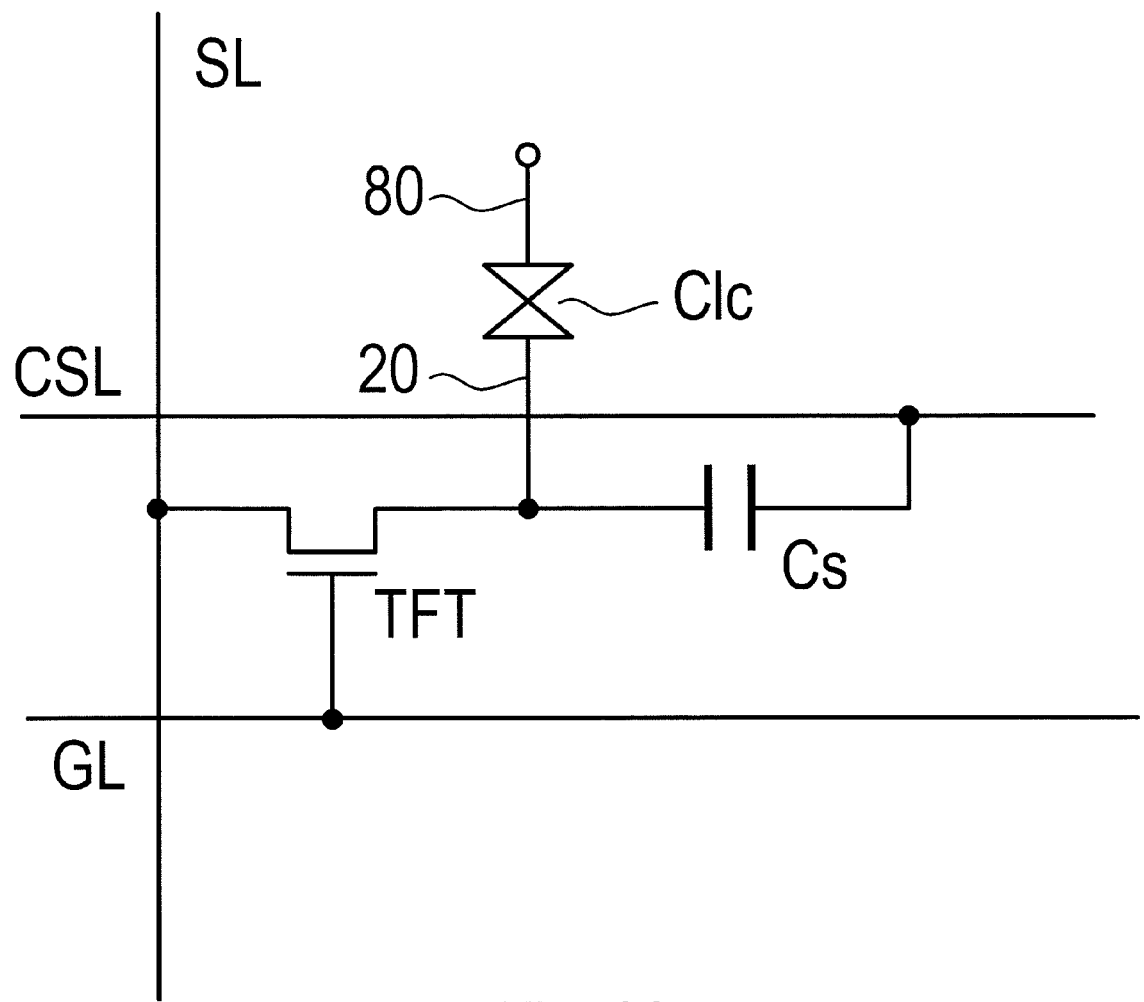
FIG. 39 is an equivalent circuit diagram of a pixel circuit of a general active matrix type liquid crystal display device.
Figure 40:
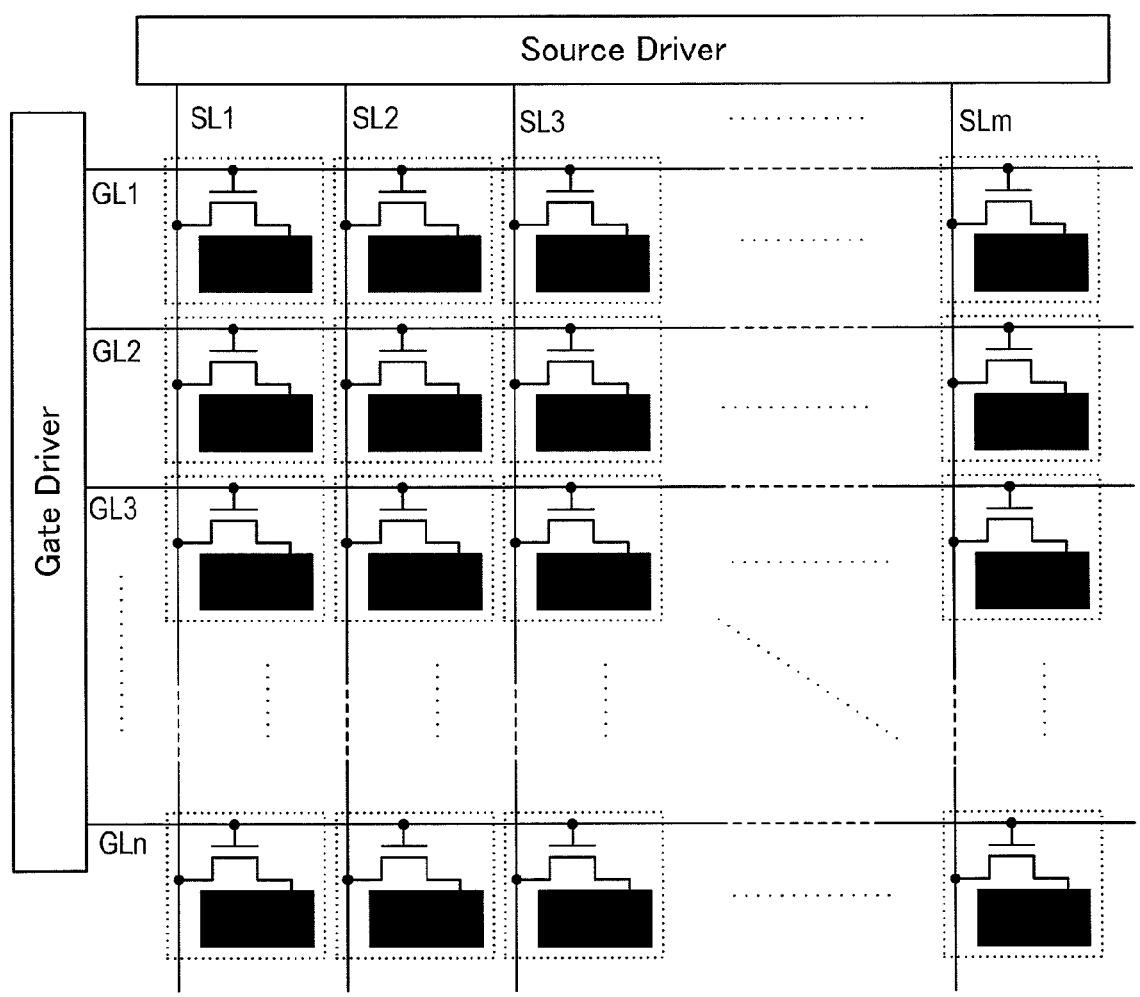
FIG. 40 is a block diagram showing a circuit arrangement example of an active matrix type liquid crystal display device having m×n pixels.

Hereinafter, a description will be given of each embodiment of a pixel circuit and a display device of the present invention with reference to the drawings. In addition, the same components as those in FIGS. 39 and 40 are marked with the same references.

[First Embodiment]

In a first embodiment, a description will be given of configurations of the display device of the present invention (hereinafter, simply referred to as the "display device") and the pixel circuit of the present invention (hereinafter, simply referred to as the "pixel circuit").

<<Display Device>>

Figure 1:
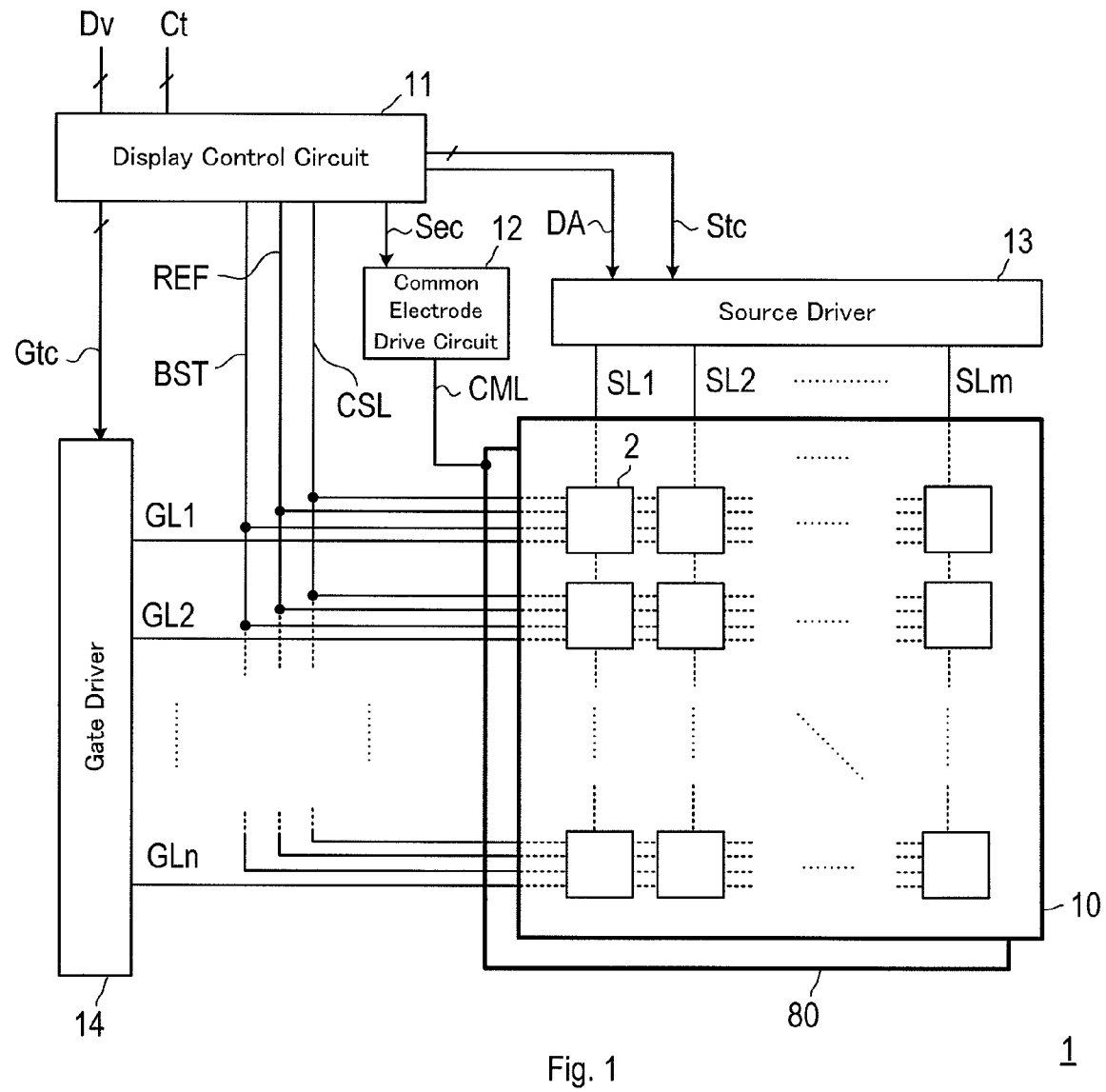
FIG. 1 is a block diagram showing one example of a schematic configuration of a display device of the present invention.

FIG. 1 shows a schematic configuration of a display device 1. The display device 1 includes an active matrix substrate 10, an opposite electrode 80, a display control circuit 11, an opposite electrode drive circuit 12, a source driver 13, a gate driver 14, and various signal lines which will be described below. On the active matrix substrate 10, a plurality of pixel circuits 2 are arranged in raw and column directions, respectively, and a pixel circuit array is formed.

In addition, the pixel circuit 2 is shown as a block in FIG. 1 so as to prevent the drawing from becoming complicated. Moreover, for descriptive purposes, the active matrix substrate 10 is shown above the opposite electrode 80 so as to make it clear that the various signal lines are formed on the active matrix substrate 10.

According to this embodiment, the display device 1 can make a screen display in two display modes such as a normal display mode and a constant display mode with the same pixel circuit 2. In the normal display mode, a moving image or a still image is displayed in full color and a transmissive liquid crystal display is made with a backlight. Meanwhile, in the constant display mode in this embodiment, three or more gradations are displayed by a pixel circuit unit, and the three adjacent pixel circuits 2 are allocated to three primary colors (R, G, B), respectively. For example, in a case where the number of the gradations is 3, 27 colors are displayed, and in a case where the number of the gradations is 4, 64 colors are displayed. However, the assumed number of the gradations is smaller than that of the normal display mode.

In addition, in the constant display mode, the number of display colors can be increased by an area coverage modulation by further combining a plurality of sets of the three adjacent pixel circuits. Moreover, the constant display mode in this embodiment can be used in the transmissive liquid crystal display and a reflective liquid crystal display.

In the following description, for descriptive purposes, a minimum display unit corresponding to the one pixel circuit 2 is referred to as the "pixel", and "pixel data" to be written in each pixel circuit is gradation data of each color, in a case of a color display with the three primary colors (R, B, G). In a case of a color display which includes brightness data of the plurality of gradations, in addition to the primary colors, the brightness data is also included in the pixel date.

Figure 2:
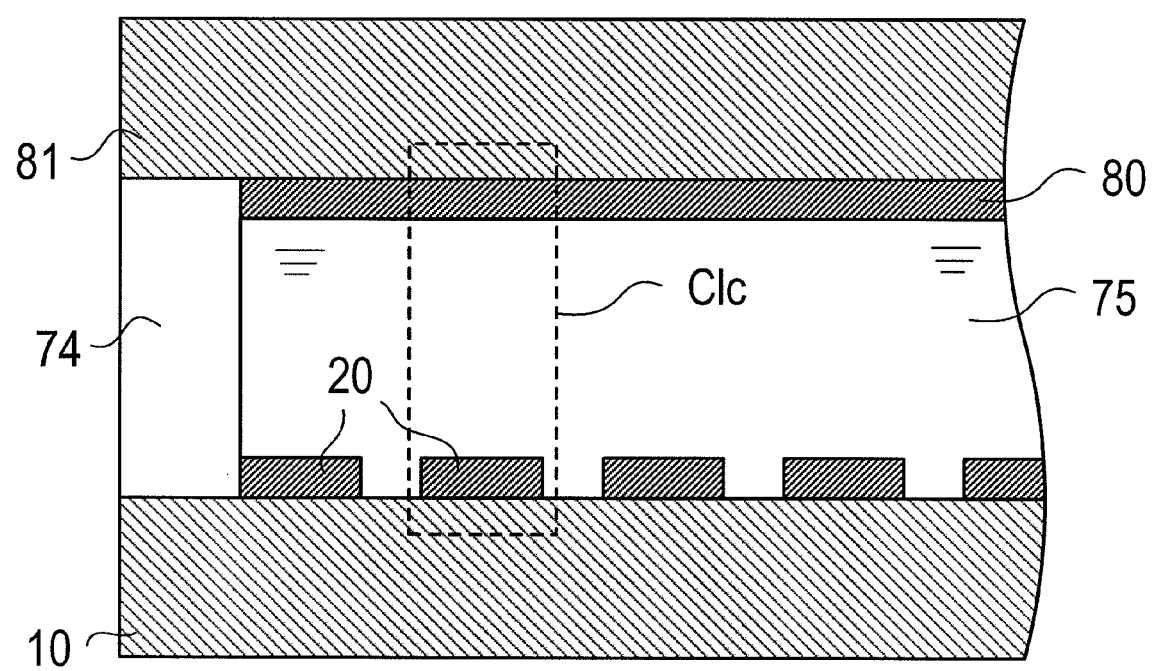
FIG. 2 is a partial cross-sectional schematic structure diagram of a liquid crystal display device.

FIG. 2 is a schematic cross-sectional structure view showing a relationship between the active matrix substrate 10 and the opposite electrode 80, and shows a structure of a display element part 21 (refer to FIG. 4) serving as a component of the pixel circuit 2. The active matrix substrate 10 is a light transmissive transparent substrate composed of glass or plastic.

As shown in FIG. 1, the pixel circuit 2 each including the signal lines are formed on the active matrix substrate 10. In FIG. 2, a pixel electrode 20 is shown as a representative of the component of the pixel circuit 2. The pixel electrode 20 is composed of a light transmissive transparent conductive material such as ITO (indium tin oxide).

A light transmissive opposite substrate 81 is arranged so as to be opposed to the active matrix substrate 10, and a liquid crystal layer 75 is held in a gap between the substrates. A polarization plate (not shown) is attached to an outer surface of each substrate.

The liquid crystal layer 75 is sealed with a sealing material 74, in a surrounding area of both substrates. On the opposite substrate 81, the opposite electrode 80 composed of the light transmissive transparent conductive material such as ITO is formed so as to be opposed to the pixel electrode 20. This opposite electrode 80 is formed as a single film so as to spread nearly all over the opposite substrate 81. Here, a unit liquid crystal display element Clc (refer to FIG. 4) is composed of the one pixel electrode 20, the opposite electrode 80, and the liquid crystal layer 75 held therebetween.

Furthermore, a backlight device (not shown) is arranged on a back surface side of the active matrix substrate 10, and can emit light in a direction from the active matrix substrate 10 toward the opposite substrate 81.

As shown in FIG. 1, the signal lines are formed on the active matrix substrate 10 in horizontal and vertical directions. Thus, the pixel circuits 2 are formed, in the shape of a matrix, at intersecting points of m source lines (SL1, SL2, ..., SLm) extending in the vertical direction (column direction), and n gate lines (GL1, GL2, ..., GLn) extending in the horizontal direction (row direction). Each of the numbers m and n is two or more natural number. In addition, the source lines are represented by the "source line SL", and the gate lines are represented by the "gate line GL".

Here, the source line SL corresponds to a "data signal line", and the gate line GL corresponds to a "scan signal line". In addition, the source driver 13 corresponds to a "data signal line drive circuit", the gate driver 14 corresponds to a "scan signal line drive circuit", the opposite electrode drive circuit 12 corresponds to an "opposite electrode voltage supply circuit", and the display control circuit 11 partially corresponds to a "control line drive circuit".

In addition, in FIG. 1, each of the display control circuit 11 and the opposite electrode drive circuit 12 is illustrated so as to exist independently from the source driver 13 and the gate driver 14, but the display control circuit 11 and the opposite electrode drive circuit 12 may be included in these drivers.

Figure 3:
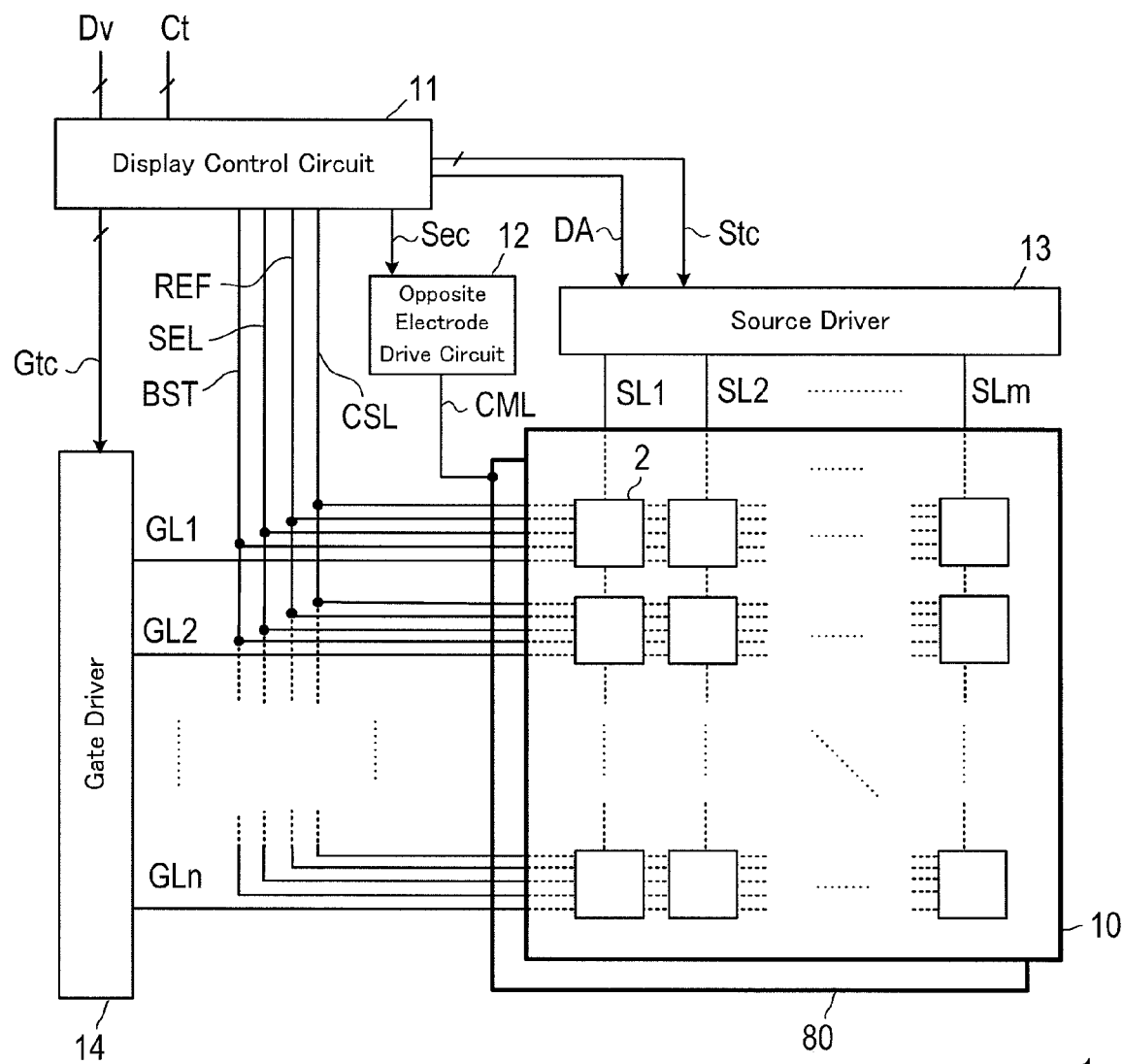
FIG. 3 is a block diagram showing one example of a schematic configuration of a display device of the present invention.

According to this embodiment, a reference line REF, an auxiliary capacity line CSL, and a boost line BST are provided as the signal lines to drive the pixel circuit 2, as well as the source line SL and the gate line GL described above. In addition, as another configuration example, a selection line SEL can be further provided. FIG. 3 shows a configuration of the display device in this case.

The reference line REF, the boost line BST, and the selection line SEL correspond to a "first control line", a "second control line", and a "third control line", respectively, and are driven by the display control circuit 11. In addition, the auxiliary capacity line CSL corresponds to a "fourth control line" or a "fixed voltage line" and is driven by the display control circuit 11, as one example.

Referring to FIGS. 1 to 3, each of the reference line REF, the boost line BST, and the auxiliary capacity line CSL is provided in each row so as to extend in a row direction, and wirings of each row are mutually connected and unified in a periphery part of the pixel circuit array, but the wiring in each row may be individually driven and a common voltage may be applied thereto according to an operation mode, or each line may be provided in each column so as to extend in a column direction. Basically, each of the reference line REF, the boost line BST, and the auxiliary capacity line CSL is configured to be shared by the plurality of pixel circuits 2. In addition, in the case where the selection line SEL is further provided, it may be provided in the same manner as that of the boost line BST.

The display control circuit 11 controls a writing action in the normal display mode and the constant display mode, and a self refreshing action in the constant display mode as will be described below.

At the time of the writing action, the display control circuit 11 receives a data signal Dv and a timing signal Ct representing an image to be displayed, from an external signal source, and based on the signals Dv and Ct, generates a digital image signal DA and a data side timing control signal Stc to be applied to the source driver 13, a scan side timing control signal Gtc to be applied to the gate driver 14, and an opposite voltage control signal Sec to be applied to the opposite electrode drive circuit 12 as signals to display the image on the display element part 21 (refer to FIG. 4) of the pixel circuit array, and signal voltages to be applied to the reference line REF, the boost line BST, the auxiliary capacity line CSL, and the selection SEL (in the case it is provided).

The source driver 13 is controlled by the display control circuit 11 so as to apply a source signal having a predetermined voltage amplitude to each source line SL at predetermined timing at the time of the writing action and the self refreshing action.

At the time of the writing action, the source driver 13 generates a voltage appropriate for a voltage level of an opposite voltage Vcom which corresponds to a pixel value for one display line represented by the digital signal DA, as source signals Sc1, Sc2, . . . , Scm with respect to each horizontal period (also referred to as the "H period"), based on the digital image signal DA and the data side timing control signal Stc. As this voltage, a multi-gradation voltage is assumed in both of the normal display mode and the constant display mode, but the gradation number in the constant display mode is smaller than that in the normal display mode in this embodiment, and the voltage is a three-gradation (three-valued) voltage. Thus, these source signals are applied to the corresponding source lines SL1, SL2, . . . , SLm, respectively.

In addition, at the time of the self refreshing action, the source driver 13 is controlled by the display control circuit 11 so as to apply the same voltage to all the source lines SL connected to the target pixel circuits 2, at the same timing (detail will be described below).

The gate driver 14 is controlled by the display control circuit 11 so as to apply a gate signal having a predetermined voltage amplitude to each gate line GL at predetermined timing at the time of the writing action and the self refreshing action. In addition, the gate driver 14 may be formed on the active matrix substrate 10 like the pixel circuit 2.

At the time of the writing action, the gate driver 14 sequentially selects the gate lines GL1, GL2, . . . , GLn for roughly each horizontal period, in each frame period of the digital image signal DA, in order to write the source signals Sc1, Sc2, . . . , Scm in each pixel circuit 2, based on the scan side timing control signal Gtc.

In addition, at the time of the self refreshing action, the gate driver 14 is controlled by the display control circuit 11 so as to apply the same voltage to all the gate lines GL connected to the target pixel circuits 2, at the same timing (detail will be described below).

The opposite electrode drive circuit 12 applies the opposite voltage Vcom to the opposite electrode 80 through an opposite electrode wiring CML. According to this embodiment, the opposite electrode drive circuit 12 outputs the opposite voltage Vcom so that it is alternately switched between a predetermined high level (5 V) and a predetermined low level (0 V) in the normal display mode and the constant display mode. Thus, the action to drive the opposite electrode 80 while switching the voltage between the high level and the low level is referred to as the "opposite AC driving".

According to the "opposite AC driving" in the normal display mode, the opposite voltage Vcom is switched between the high level and the low level with respect to each horizontal period and each frame period. That is, in a certain frame period, a voltage polarity between the opposite electrode 80 and the pixel electrode 20 is changed between the two adjacent horizontal periods. In addition, in the same horizontal period, the voltage polarity between the opposite electrode 80 and the pixel electrode 20 is changed between the two adjacent frame periods.

Meanwhile, in the constant display mode, the same voltage level is maintained in the one frame period, and the voltage polarity between the opposite electrode 80 and the pixel electrode 20 is changed between the two adjacent writing actions.

When the voltage having the same polarity is continuously applied to between the opposite'electrode 80 and the pixel circuit 20, burn-in of the display screen (surface burn-in) is caused, so that a polarity reversing action is needed, and when the "opposite AC driving" is employed, a voltage amplitude to be applied to the pixel electrode 20 can be reduced in the polarity reversing action.

<<Pixel Circuit>>

Figure 4:
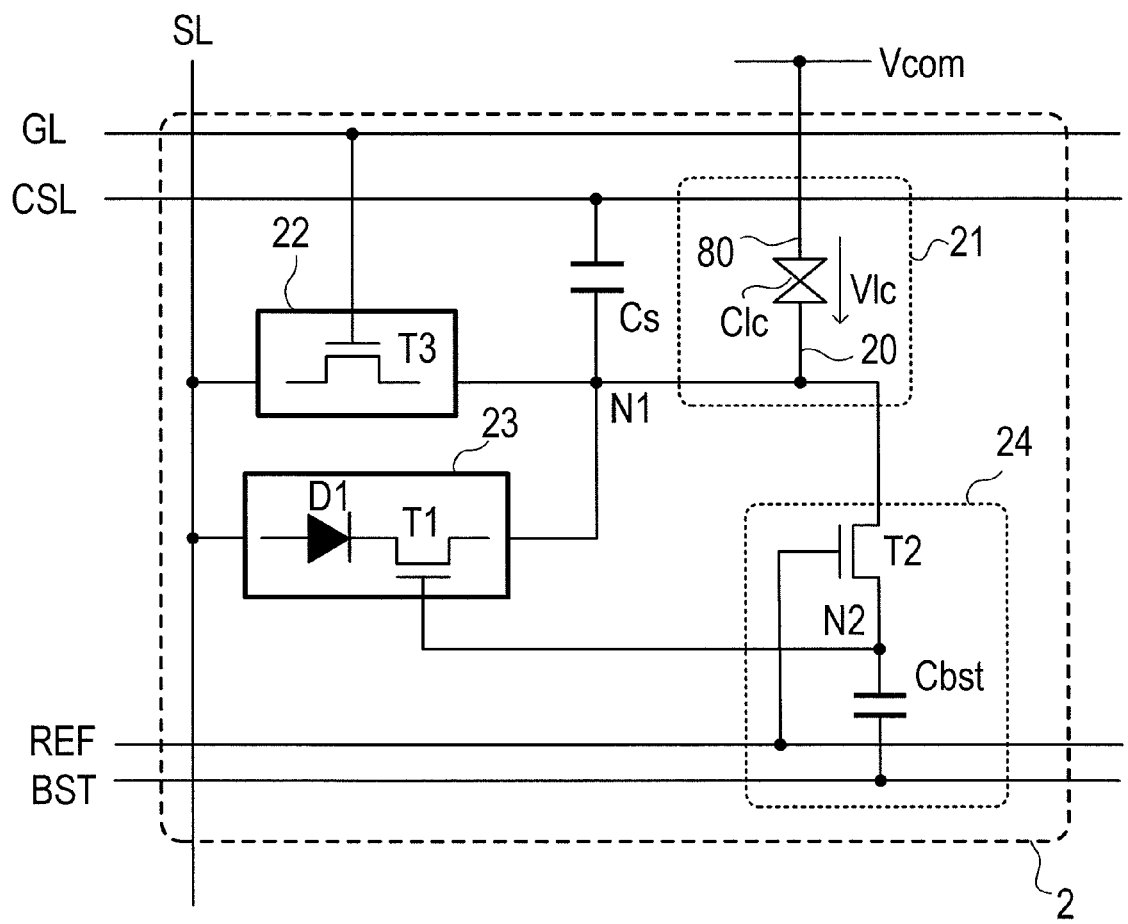
FIG. 4 is a circuit diagram showing a basic circuit configuration of a pixel circuit of the present invention.
Figure 5:
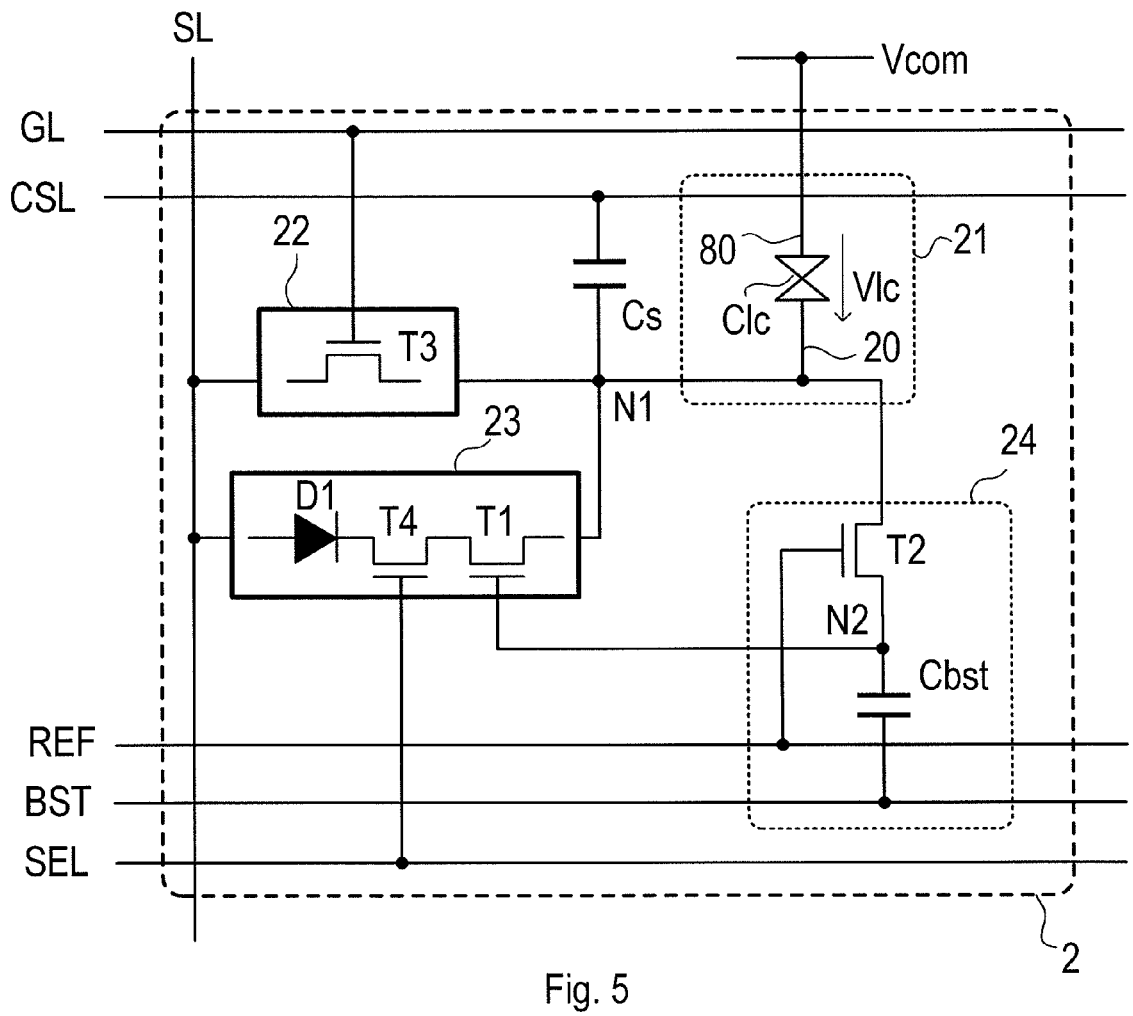
FIG. 5 is a circuit diagram showing another basic circuit configuration of a pixel circuit of the present invention.
Figure 6:
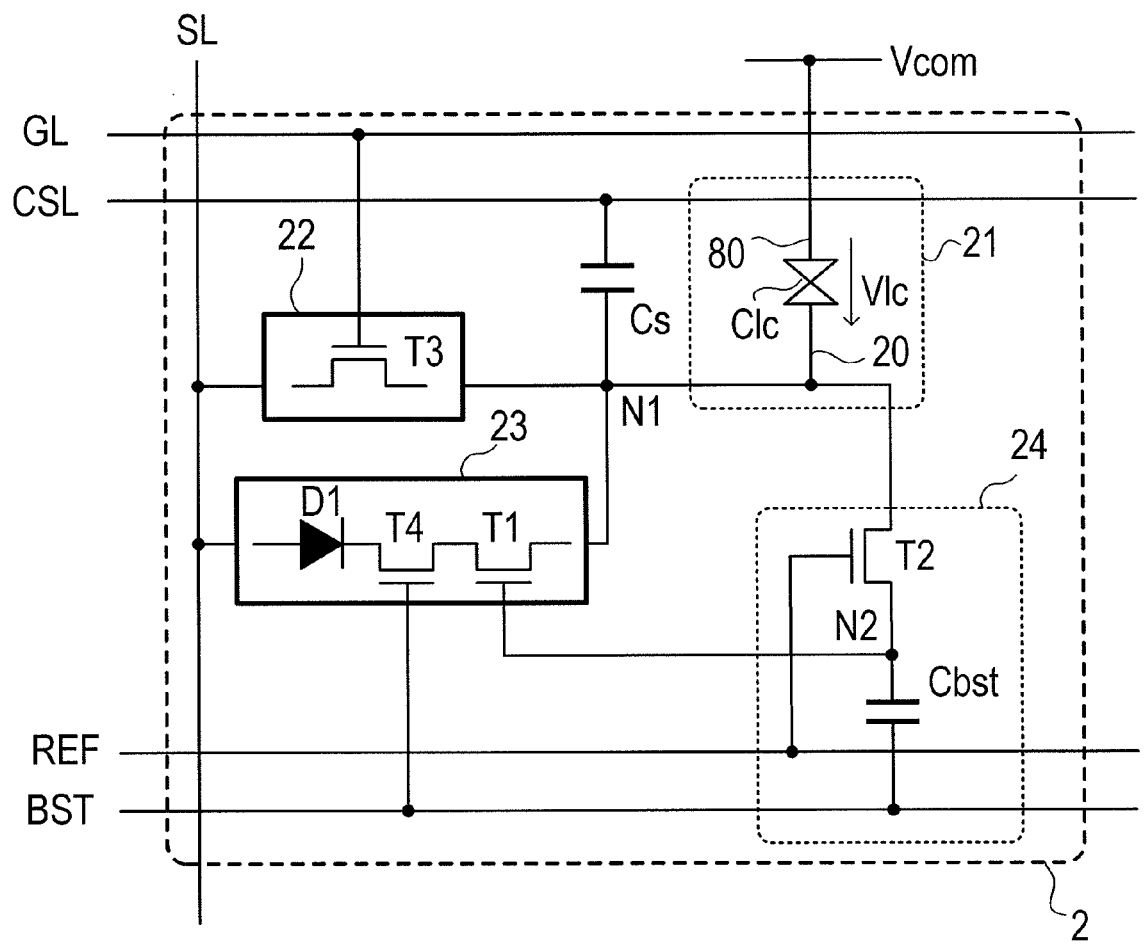
FIG. 6 is a circuit diagram showing another basic circuit configuration of a pixel circuit of the present invention.

Next, a configuration of the pixel circuit 2 will be described with reference to FIGS. 4 to 17. FIGS. 4 to 6 show basic circuit configurations of the pixel circuits 2 of the present invention. The pixel circuit 2 includes the display element part 21 including the unit liquid crystal display element Clc, a first switch circuit 22, a second switch circuit 23, a control circuit 24, and an auxiliary capacitive element Cs, in common with all circuit configurations. The auxiliary capacitive element Cs corresponds to a "second capacitive element".

In addition, the basic circuit configurations shown in FIGS. 4, 5, and 6 show common circuit configurations including basic circuit configurations belonging to first to third types which will be described below. Since the unit liquid crystal display element Clc has been already described with reference to FIG. 2, its description is omitted.

The pixel electrode 20 is connected to one ends of the first switch circuit 22, the second switch circuit 23, and the control circuit 24, whereby an internal node N1 is formed. The internal node N1 holds a voltage of the pixel data supplied from the source line SL at the time of the writing action.

The auxiliary capacitive element Cs has one end connected to the internal node N1, and the other end connected to the auxiliary capacity line CSL. This auxiliary capacitive element Cs is additionally provided so that the internal node N1 can stably hold the voltage of the pixel data.

One end of the first switch circuit 22, which does not compose the internal node N1, is connected to the source line SL. The first switch circuit 22 has a transistor T3 functioning as a switch element. The transistor T3 is a transistor whose control terminal is connected to the gate line, and corresponds to a "third transistor element". The first switch circuit 22 is turned off and the source line SL and the internal node N1 are not connected when at least the transistor T3 is off.

One end of the second switch circuit 23, which does not compose the internal node N1, is connected to the source line SL. The second switch circuit 23 is a series circuit composed of a transistor T1 and a diode D1. In addition, the transistor T1 is a transistor whose control terminal is connected to an output node N2 of the control circuit 24, and corresponds to a "first transistor element". In addition, the diode D1 performs a rectifying action in a direction from the source line SL to the internal node N1, and corresponds to a "diode element". The diode D1 is formed with a PN junction in this embodiment, but it may be formed with a schottky junction or diode connection of a MOSFET (MOSFET in which a drain or source is connected to a gate).

Hereinafter, as shown in FIG. 4, a configuration in which the second switch circuit 23 is the series circuit composed of the transistor T1 and the diode D1, and a transistor T4 is not included is referred to as a first type.

Unlike the first type, as shown in FIGS. 5 and 6, the second switch circuit 23 may be a series circuit including the transistor T4 in addition to the transistor T1 and the diode D1. At this time, two types are provided in FIGS. 5 and 6 respectively, depending on the signal line to which the control terminal of the transistor T4 is connected. According to the type (second type) of the pixel circuit shown in FIG. 5, the selection line SEL is additionally provided in addition to the boost line BST, and a control terminal of the transistor T4 is connected to the selection line SEL. Meanwhile, according to the type (third type) of the pixel circuit shown in FIG. 6, the control terminal of the transistor T4 is connected to the boost line BST. In addition, the selection line SEL does not exist in the first type as a matter of course. The transistor T4 corresponds to a "fourth transistor element".

In the case of the first type, when the transistor T1 is on, and a potential difference more than a turn-on voltage is generated between both ends of the diode D1, the second switch circuit 23 is turned on in a direction from the source line SL to the internal node N1. Meanwhile, in the case of the second and third types, when each of the transistors T1 and T3 is on, and the potential difference more than the turn-on voltage is generated between both ends of the diode D1, the second switch circuit 23 is turned on in the direction from the source line SL to the internal node N1.

The control circuit 24 is a series circuit composed of a transistor T2 and a boost capacitive element Cbst. A first terminal of the transistor T2 is connected to the internal node N1, and a control terminal thereof is connected to the reference line REF. In addition, a second terminal of the transistor T2 is connected to a first terminal of the boost capacitive element Cbst and the control terminal of the transistor T1, whereby the output node N2 is formed. A second terminal of the boost capacitive element Cbst is connected to the boost line BST. The transistor T2 corresponds to a "second transistor element".

Meanwhile, one end of the auxiliary capacitive element Cs, and one end of the liquid crystal capacitive element Clc are connected to the internal node N1. In order to prevent the references from becoming complicated, electrostatic capacity of the auxiliary capacitive element (referred to as the "auxiliary capacity") is represented by Cs, and electrostatic capacity of the liquid crystal capacitive element (referred to as the "liquid crystal capacity") is represented by Cls. At this time, total capacity which is parasitic in the internal node N1, that is, pixel capacity Cp in which the pixel data is written and held is roughly expressed by a sum of the liquid crystal capacity Clc and the auxiliary capacity Cs (Cp≈Clc+Cs).

At this time, the boost capacitive element Cbst is set such that Cbst <<Cp is established wherein Cbst represents electrostatic capacity of this element (referred to as the "boost capacity").

When the transistor T2 is on, the output node N2 holds the voltage according to the voltage level of the internal node N1, but when the transistor T2 is off, it maintains an original holding voltage even when the voltage level of the internal node N1 changes. This holding voltage of the output node N2 controls on/off of the transistor T1 of the second switch circuit 23.

Each of the four kinds of transistors T1 to T4 is a thin film transistor such as a polycrystalline silicon TFT or an amorphous silicon TFT which is formed on the active matrix substrate 10, and one of the first and second terminals corresponds to a drain electrode, and the other thereof corresponds to a source electrode, and the control terminal corresponds to a gate electrode. In addition, each of the transistors T1 to T4 may be composed of a single transistor element, but in a case where a leak current is highly required to be suppressed, it may be configured such that the several transistors are connected in series and their control terminals are connected to one another. In the following description about the operation of the pixel circuit 2, it is assumed that the each of the transistors T1 to T4 is an N-channel type polycrystalline silicon TFT, and its threshold voltage is about 2 V.

In addition, similar to the transistors T1 to T4, the diode D1 is also formed on the active matrix substrate 10. According to this embodiment, the diode D1 is provided as the PN junction composed of polycrystalline silicon.

<First Type>

First, a description will be given of the pixel circuit belonging to the first type, in which the second switch circuit 23 is the series circuit composed of the transistor T1 and the diode D1.

At this time, as described above, pixel circuits 2A shown in FIGS. 7 and 8 are assumed, depending on the configuration of the first switch circuit 22.

Figure 7:
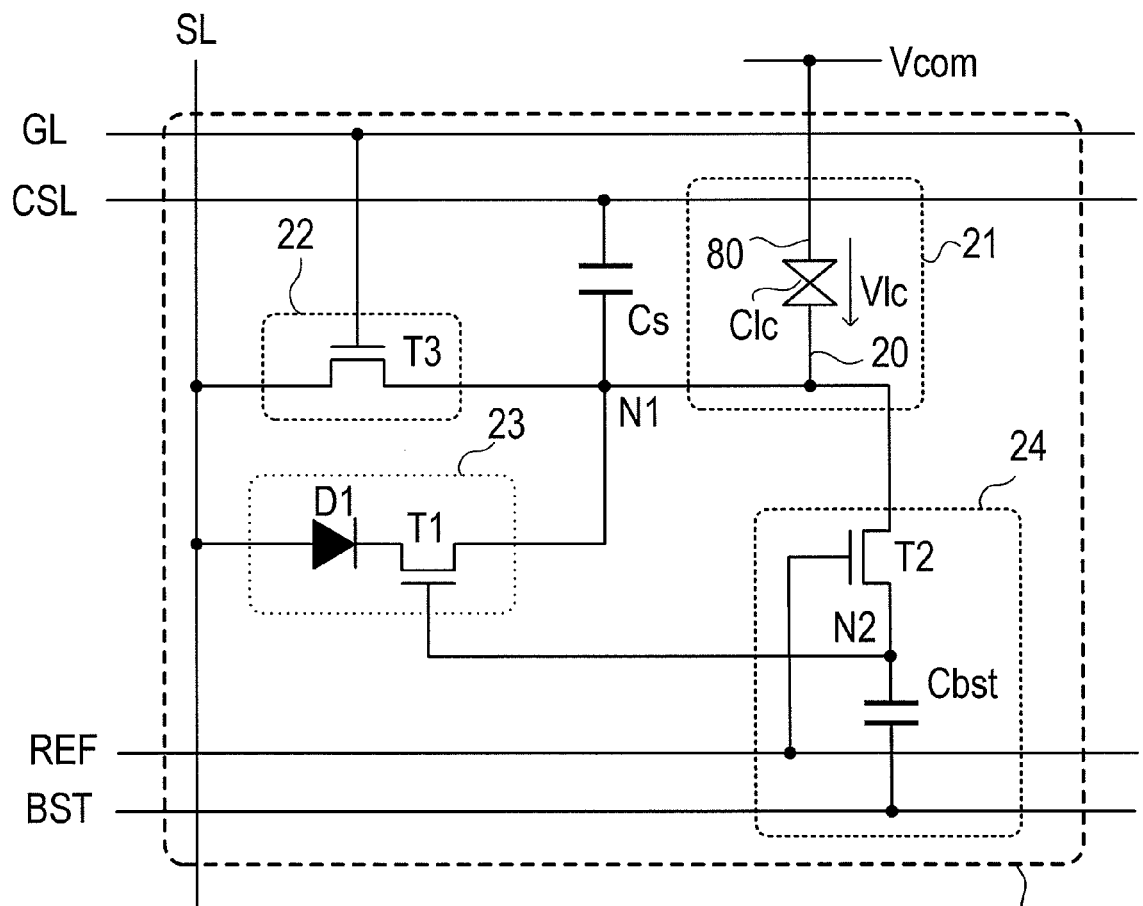
FIG. 7 is a circuit diagram showing a first type circuit configuration example, among the pixel circuits of the present invention.

The first type pixel circuit 2A shown in FIG. 7 has the first switch circuit 22 only composed of the transistor T3.

Figure 8:
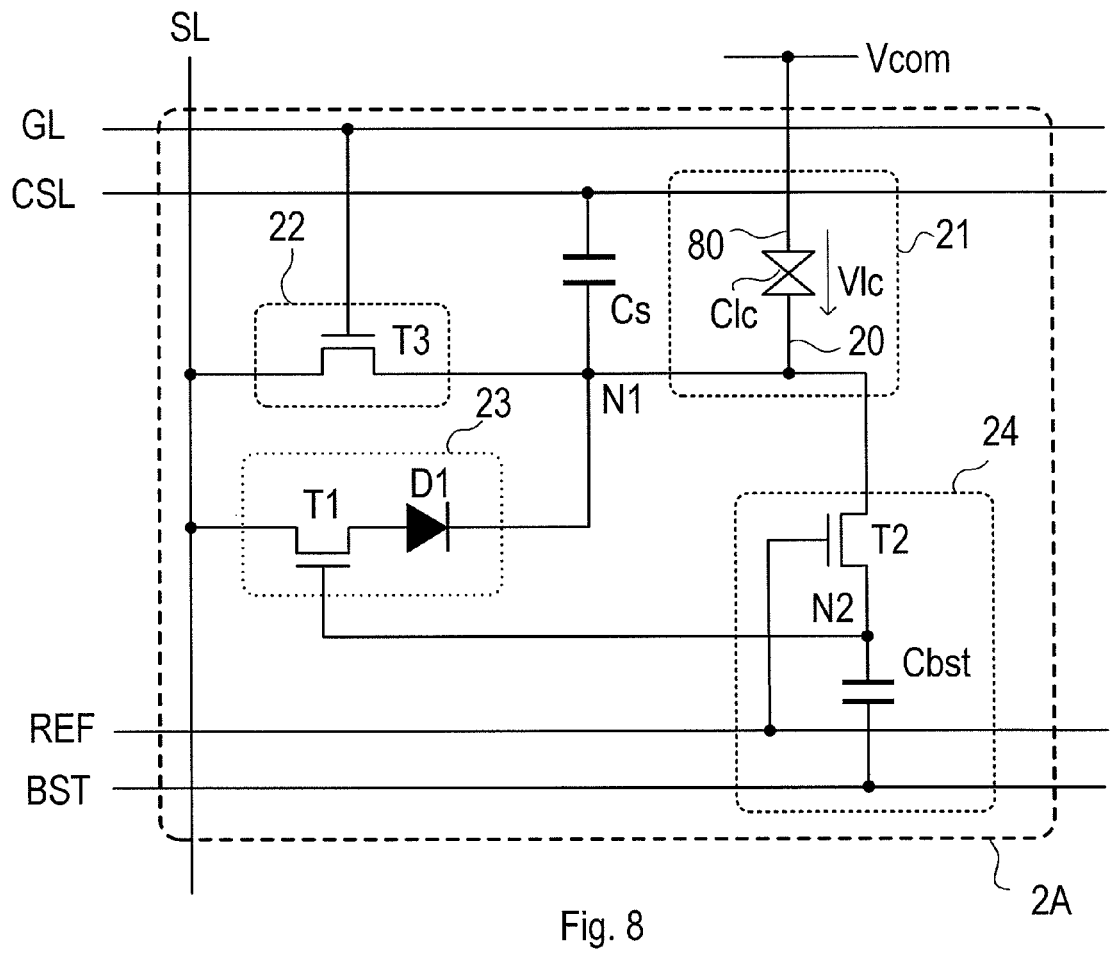
FIG. 8 is a circuit diagram showing another first type circuit configuration example, among the pixel circuits of the present invention.

Here, FIG. 7 shows a configuration example in which the second switch circuit 23 is the series circuit composed of the diode D1 and the transistor T1, the first terminal of the transistor T1 is connected to the internal node N1, the second terminal of the transistor T1 is connected to a cathode terminal of the diode D1, and an anode terminal of the diode D1 is connected to the source line SL, as one example. However, as shown in FIG. 8, the positions of the transistor T1 and the diode D1 may be exchanged in the series circuit. In addition, as another circuit configuration, the transistor T1 may be sandwiched between the two diodes D1.

<Second Type>

Next, a description will be given of the pixel circuit belonging to the second type, in which the second switch circuit 23 is the series circuit composed of the transistor T1, the diode D1, and the transistor T4, and the control terminal of the transistor T4 is connected to the selection line SEL.

Figure 9:
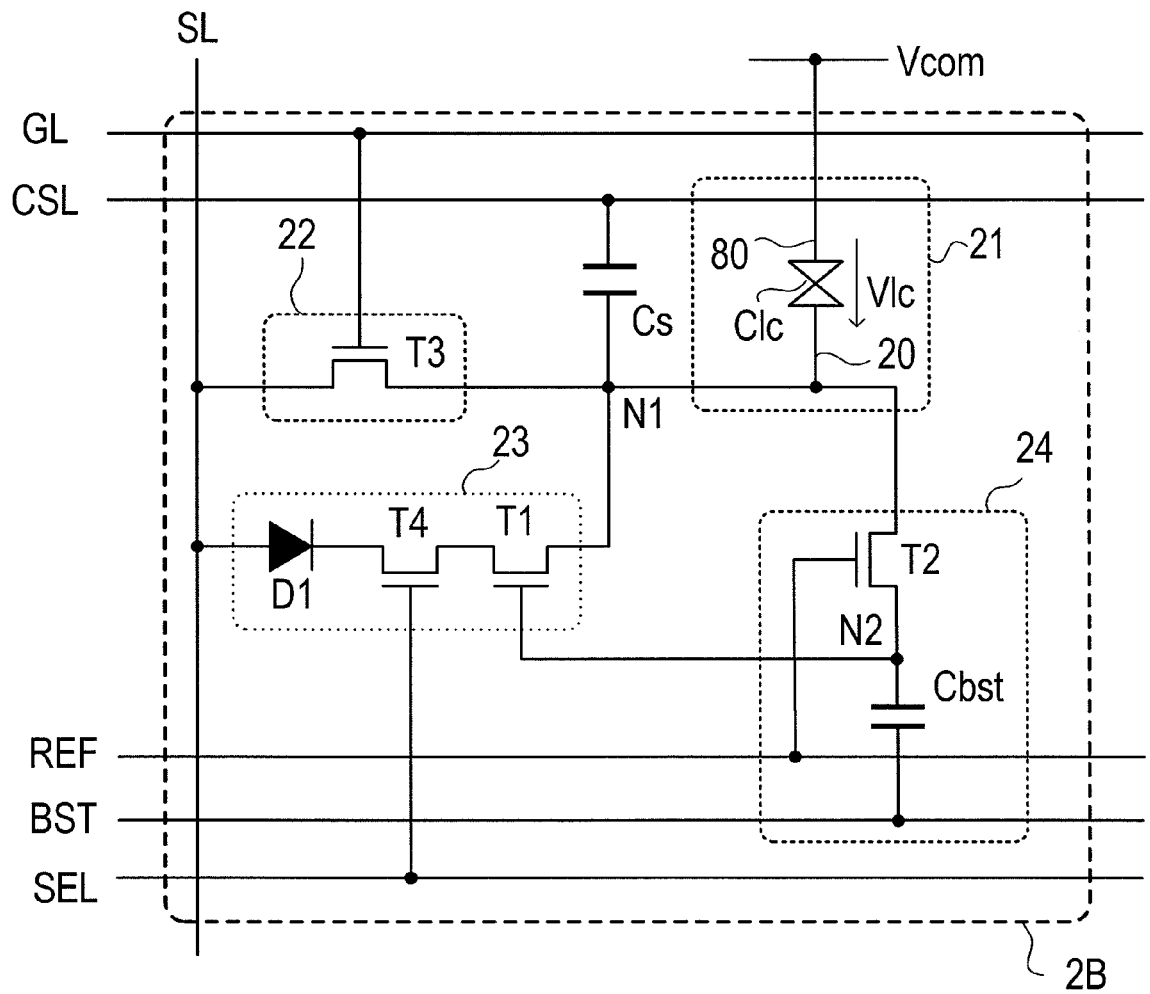
FIG. 9 is a circuit diagram showing a second type circuit configuration example, among the pixel circuits of the present invention.
Figure 10:
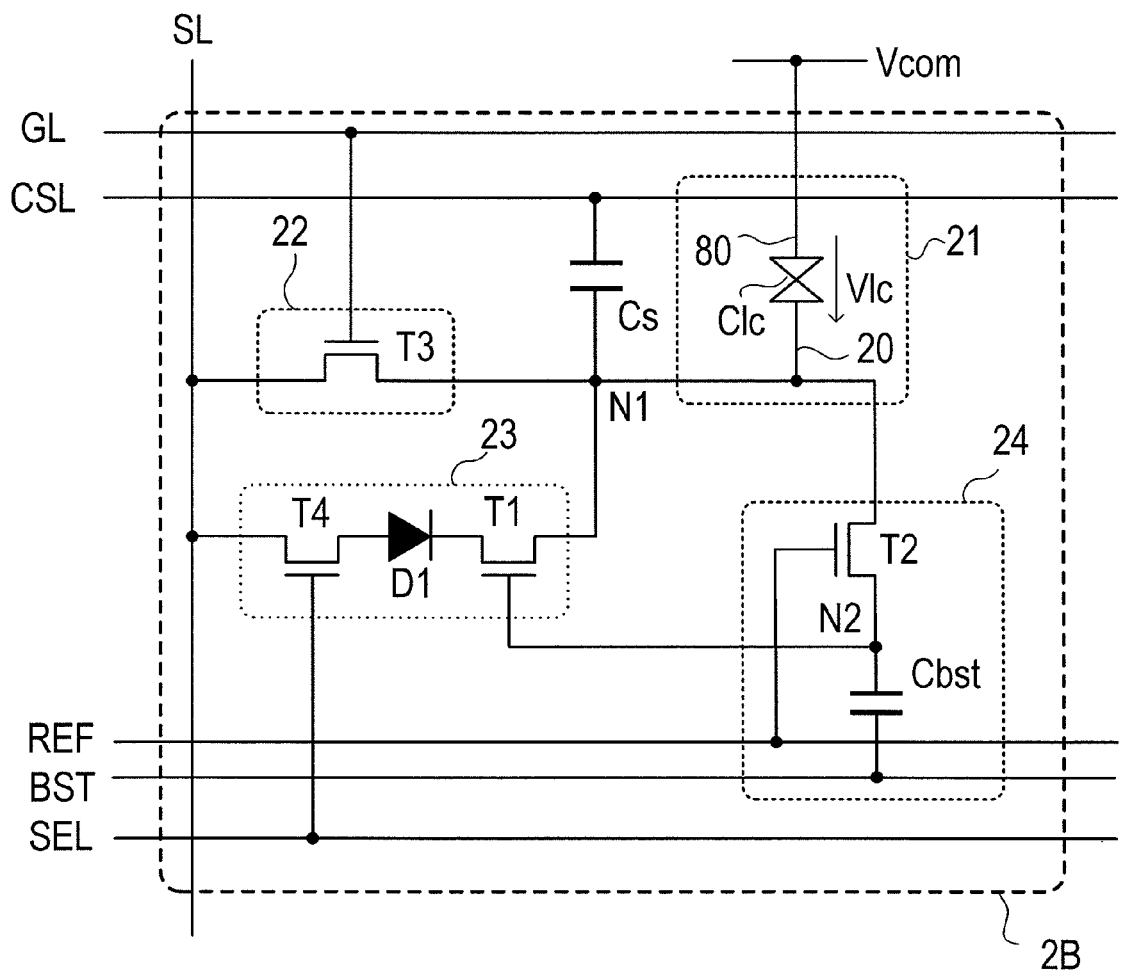
FIG. 10 is a circuit diagram showing a second type circuit configuration example, among the pixel circuits of the present invention.
Figure 11:
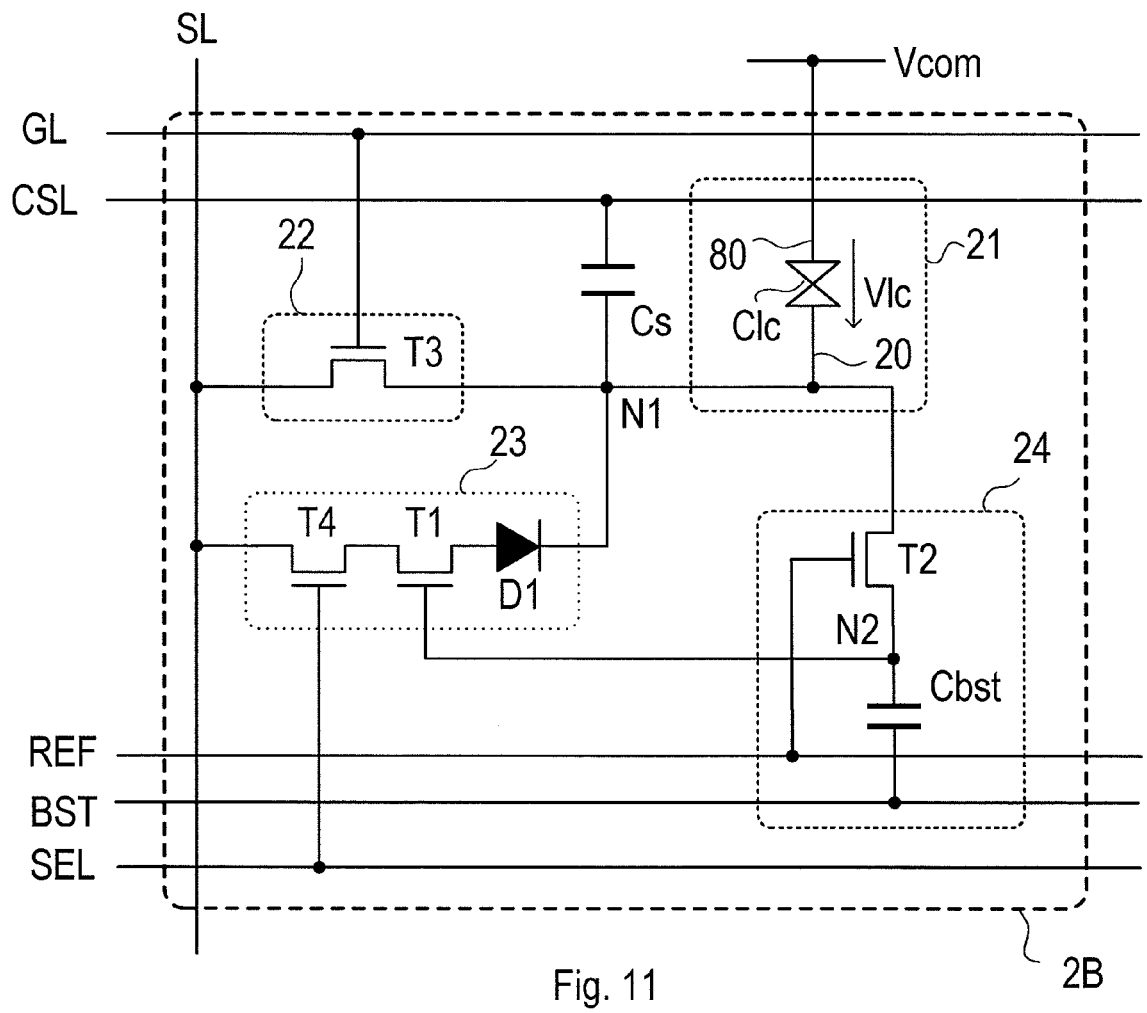
FIG. 11 is a circuit diagram showing a second type circuit configuration example, among the pixel circuits of the present invention.

In the second type, pixel circuits 2B shown in FIGS. 9 to 11 and pixel circuits 2C shown in FIGS. 12 to 15 are assumed, depending on the configuration of the first switch circuit 22.

According to the pixel circuit 2B shown in FIG. 9, the first switch circuit 22 is only composed of the transistor T3. In addition, similar to the first type, as for the configuration of the second switch circuit 23, variation circuits can be implemented depending on the arrangement of the diode D1 (refer to FIGS. 10 and 11). In addition, the positions of the transistors T1 and T4 may be exchanged in the circuits.

Figure 12:
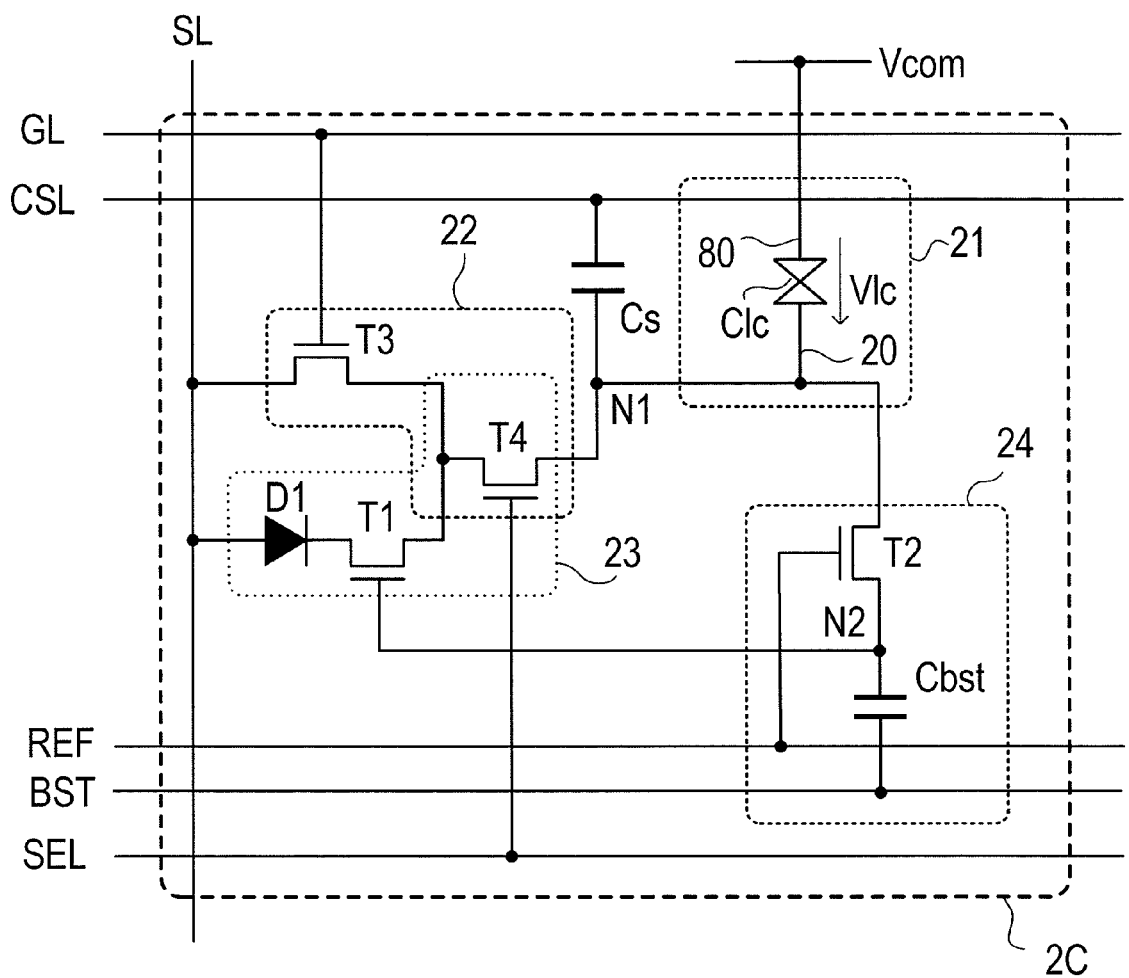
FIG. 12 is a circuit diagram showing a second type circuit configuration example, among the pixel circuits of the present invention.
Figure 13:
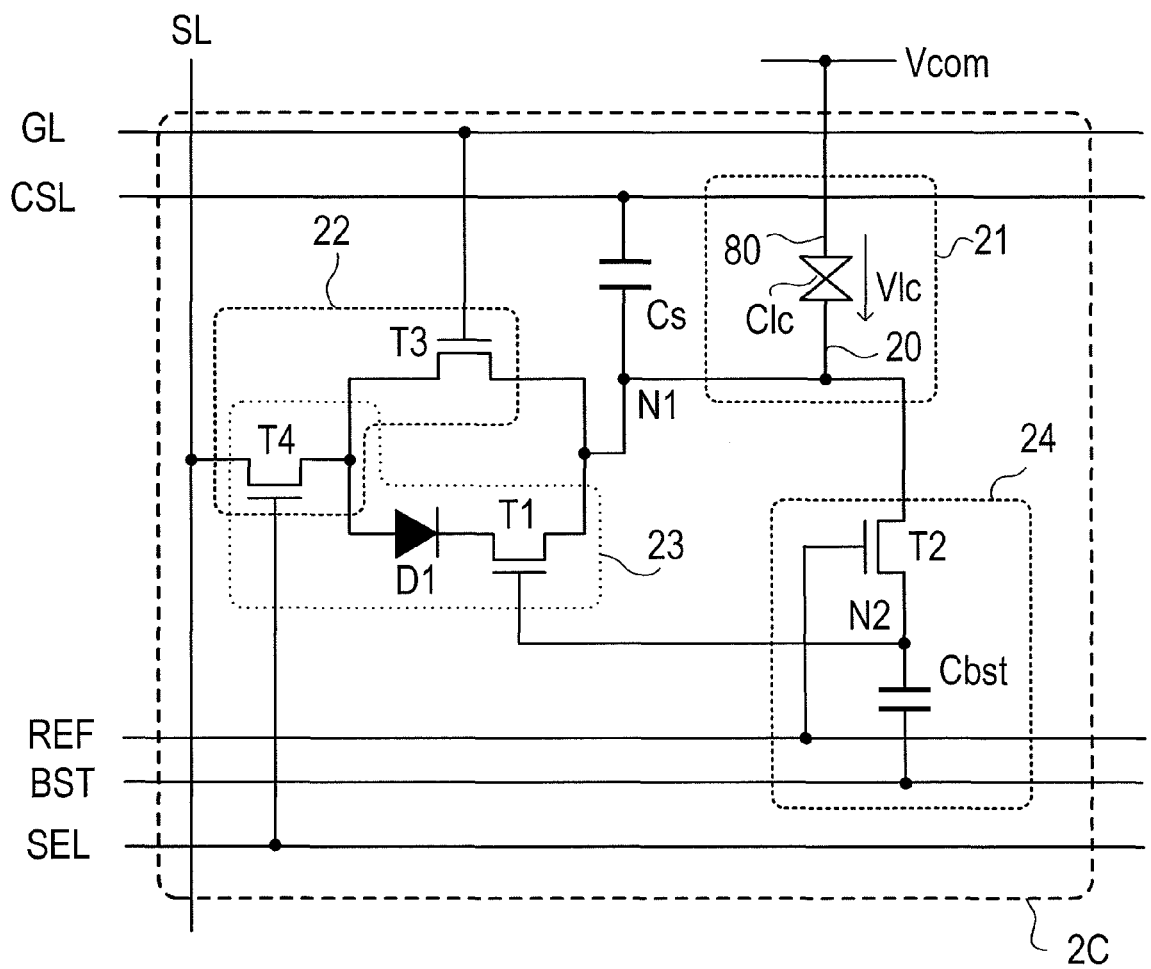
FIG. 13 is a circuit diagram showing a second type circuit configuration example, among the pixel circuits of the present invention.
Figure 14:
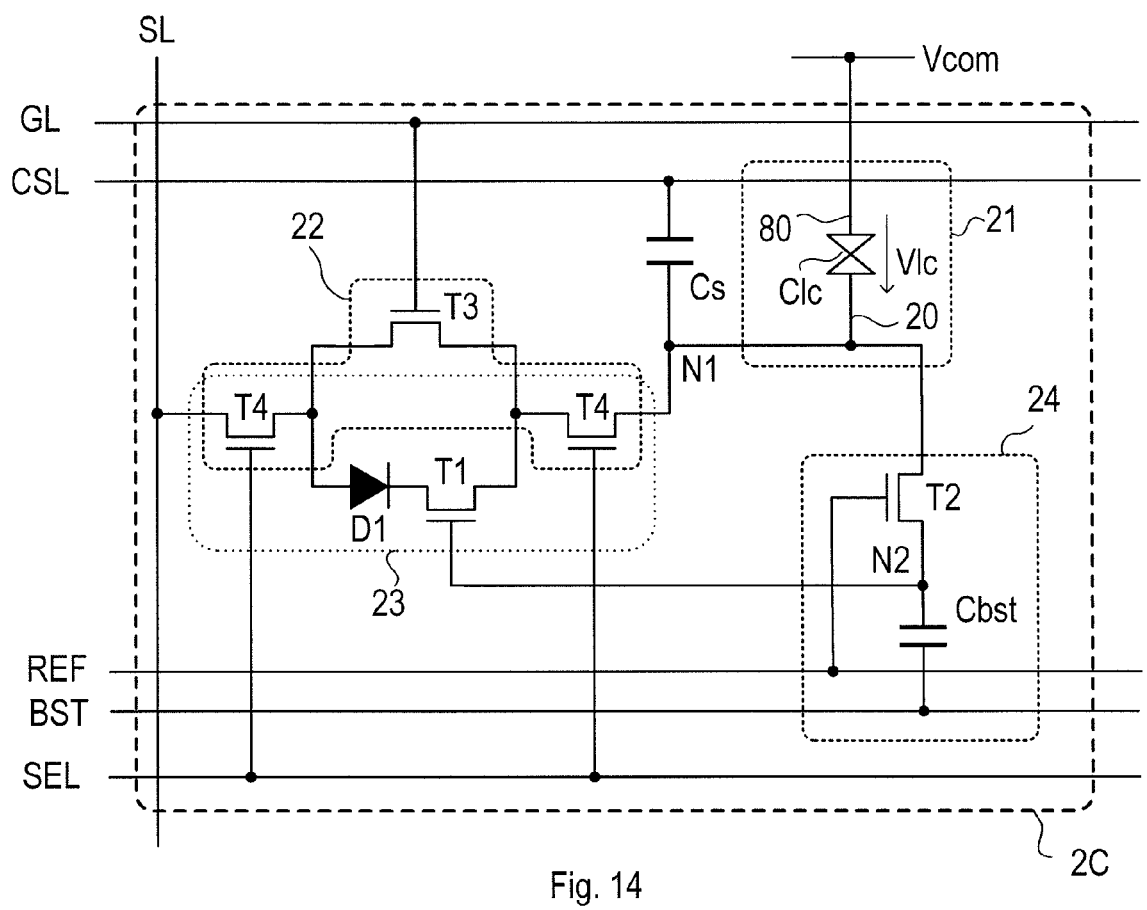
FIG. 14 is a circuit diagram showing a second type circuit configuration example, among the pixel circuits of the present invention.

The pixel circuit 2C shown in FIG. 12 has the first switch circuit 22 which is the series circuit composed of the transistor T3 and the transistor T4. A variation circuit is implemented as shown in FIG. 13 by changing the arranged position of the transistor T4. In addition, a variation circuit can be implemented as shown in FIG. 14 by providing the plurality of transistors T4.

Figure 15:
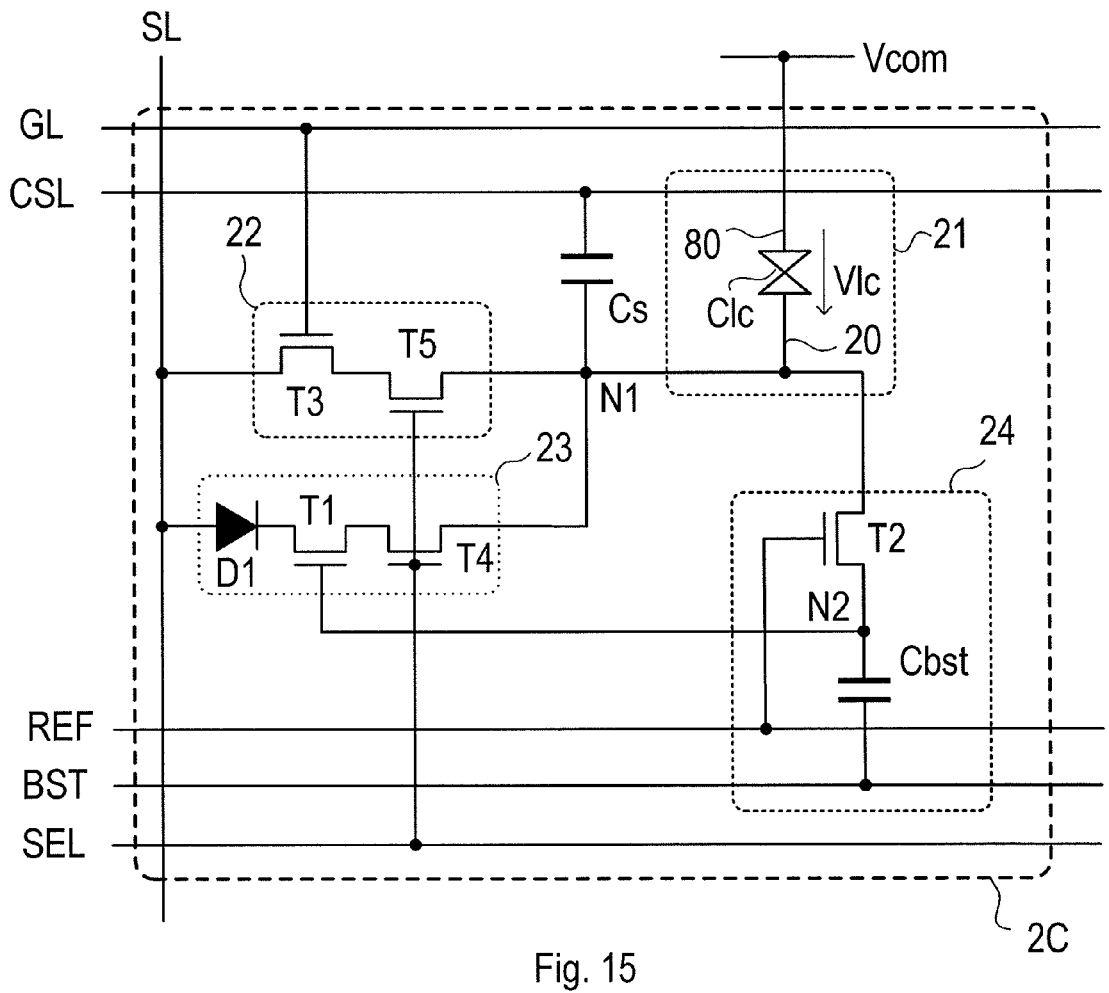
FIG. 15 is a circuit diagram showing a second type circuit configuration example, among the pixel circuits of the present invention.

Furthermore, as shown in FIG. 15, instead of the transistor T4 in the first switch circuit 22, a variation circuit can be implemented such that a transistor T5 is connected to the transistor T4 through their control terminals.

<Third Type>

Next, a description will be given of the pixel circuit belonging to the third type in which the second switch circuit 23 is the series circuit composed of the transistor T1, the diode D1, and the transistor T4, and the control terminal of the transistor T4 is connected to the boost line BST.

Figure 16:
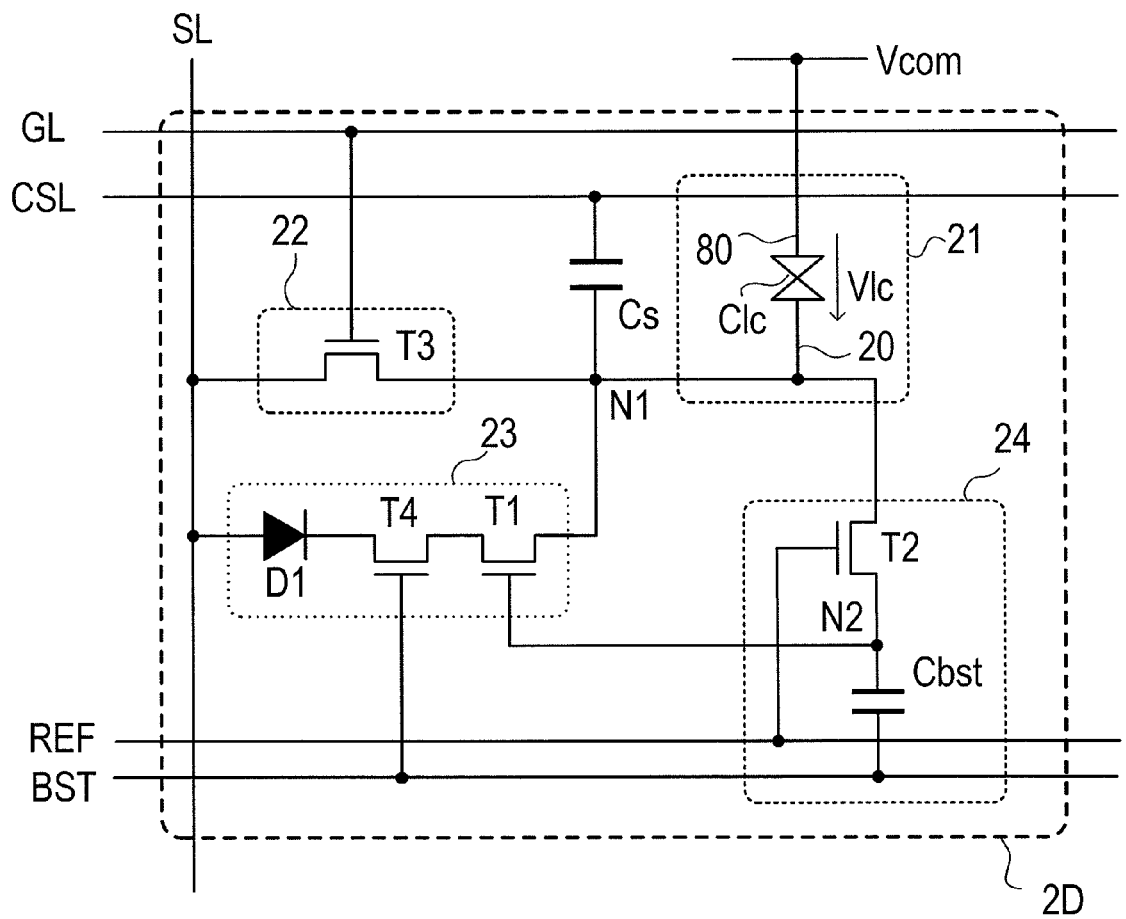
FIG. 16 is a circuit diagram showing a third type circuit configuration example, among the pixel circuits of the present invention.
Figure 17:
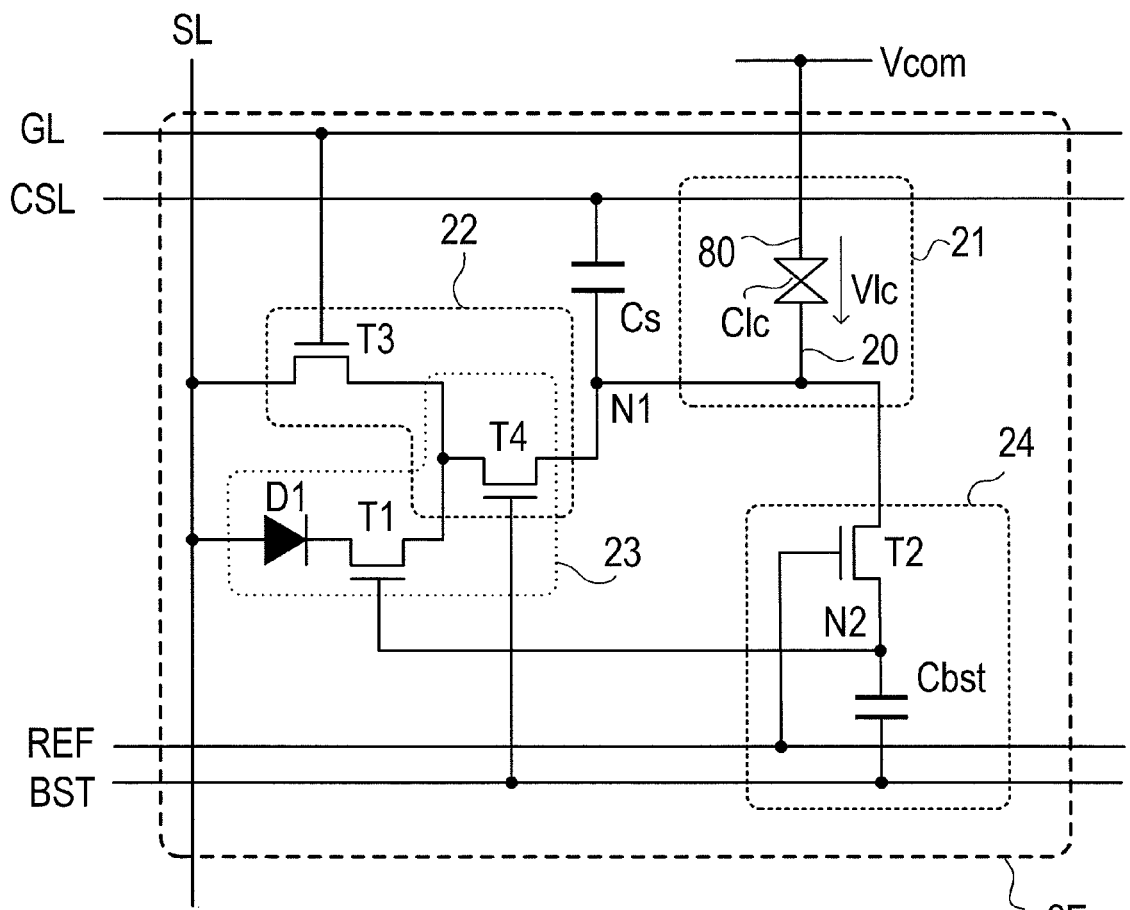
FIG. 17 is a circuit diagram showing a third type circuit configuration example, among the pixel circuits of the present invention.

The third type pixel circuit has a configuration in which the control terminal of the transistor T4 is connected to the boost line BST, and the selection SEL is not provided, compared to the second type pixel circuit. Therefore, the pixel circuits corresponding to the pixel circuits 2B shown in FIGS. 9 to 11, and the pixel circuits 2C shown in FIGS. 12 to 15 can be realized. As one example, a pixel circuit 2D corresponding to the pixel circuit 2B shown in FIG. 9 is shown in FIG. 16, and a pixel circuit 2E corresponding to the pixel circuit 2C shown in FIG. 12 is shown in FIG. 17.

In addition, in the above type of pixel circuits, the same transistor elements or diode elements may be connected in series, respectively.

[Second Embodiment]

In a second embodiment, a description will be given of a self refreshing action in each of the first to third type pixel circuits with reference to the drawings.

The self refreshing action means an action in the constant display mode performed for the plurality of the pixel circuits 2 such that the first switch circuits 22, the second switch circuits 23, and the control circuits 24 are activated in a predetermined sequence, and the potentials of the pixel electrodes 20 (this is also the potentials of the internal nodes N1) are restored to a potential of the gradation written in the last writing action, and for the pixels of all gradations, the pixel circuits are collectively recovered at the same time with respect to each gradation. The self refreshing action is a specific action by the pixel circuits 2A to 2E in the present invention, and power consumption can be considerably reduced, compared to the conventional "external refreshing action" in which the potential of the pixel electrode 20 is restored by performing the normal writing action. In addition, the above term "at the same time" in "collectively at the same time" means "the same time" having a time width of a series of actions in the self refreshing action.

Meanwhile, in the conventional case, an action to reverse the polarity only of a liquid crystal voltage Vcl applied to between the pixel electrode 20 and the opposite electrode 80 was executed while maintaining its absolute value (external polarity reversing action) by performing the writing action. When this external polarity reversing action is performed, the polarity is reversed and the absolute value of the liquid crystal voltage Vcl is updated to a state at the time of the last writing. That is, the polarity reversing and the refreshing action are performed at the same time. Therefore, it is not normally performed to execute the refreshing action with a view to only updating the absolute value of the liquid crystal voltage Vcl without reversing the polarity, but hereinafter, such refreshing action is referred to as the "external refreshing action" with a view to comparing it with the self refreshing action, for convenience in description.

In addition, in the case where the refreshing action is executed by the external polarity reversing action, the writing action is still performed. That is, also when compared to this conventional method, the power consumption is considerably reduced by the self refreshing action in this embodiment.

As will be described below, according to the self refreshing action in this embodiment, all of the pixel circuits are set to the same voltage state, but actually, under this voltage state, the pixel circuit in which the internal node N1 shows the voltage state of specific one gradation is only automatically selected, and the potential of the internal node N1 is restored (refreshed). That is, although the voltage is applied to all the pixel circuits, the potential of the internal node N1 is refreshed in some pixel circuits, and it is not refreshed in the other pixel circuits, at the time of the voltage application, in practice.

Therefore, in order to avoid confusion in description, the term "self refreshing (action)" and the term "refreshing (action)" are to be intentionally distinguished in the following description. The former is used in a wide concept referring to a series of actions to restore the potential of the internal node N1 of each pixel circuit. Meanwhile, the latter is used in a narrow concept referring to an action to actually restore the potential (potential of the internal node) of the pixel electrode. That is, according to the "self refreshing action" in this embodiment, only the internal node showing the voltage state of the specific one gradation is automatically and selectively "refreshed" by setting the same voltage state for all the pixel circuits. Thus, the value of the voltage is changed so as to change the gradation as the "refreshing" target, and the voltage is similarly applied, so that "refreshing" is performed for all gradations. Thus, according to the "self refreshing action" in this embodiment, the "refreshing action" is performed with respect to each gradation.

The voltage is applied to all the gate lines GL, the source lines SL, the reference lines REF, the auxiliary capacity lines CSL, and the boost lines BST which are connected to the pixel circuit 2 serving as the target of the self refreshing action, and to the opposite electrode 80 at the same timing. In the case of the second type pixel circuit having the selection line SEL, the voltage is similarly applied to the selection line SEL.

Thus, under the same timing, the same voltage is applied to all the gate lines GL, the same voltage is applied to all the reference lines REF, the same voltage is applied to all the auxiliary capacity lines CSL, and the same voltage is applied to all the boost lines BST. The timing control of the voltage application is performed by the display control circuit 11 shown in FIG. 1, and individual voltage application is performed by the display control circuit 11, the opposite electrode drive circuit 12, the source driver 13, and the gate driver 14.

In the constant display mode in this embodiment, as described in the first embodiment, it is also assumed that the three-gradation (three-valued) pixel data is held in the pixel circuit unit. At this time, the potential VN1 (this is also the potential of the pixel electrode 20) held in the internal node N1 shows three voltage states such as first to third voltage states. According to this embodiment, as one example, the first voltage state (high voltage state) is set to 5 V, the second voltage state (middle voltage state) is set to 3 V, and the third voltage state (low voltage state) is set to 0 V.

In the state just before the execution of the self refreshing action, it is assumed that there are the pixel in which the pixel electrode 20 is written in the first voltage state, the pixel in which it is written in the second voltage state, and the pixel in which it is written in the third voltage state. However, according to the self refreshing action in this embodiment, the voltage is applied based on the same sequence regardless of the voltage state of the pixel electrode 20, so that the refreshing action can be executed for all the pixel circuits. These contents will be described with reference to a timing chart and a circuit diagram.

In addition, hereinafter, a case where the voltage is written in the first voltage state (high level voltage) in the last writing action, and the high level voltage is to be restored is referred to as the "case H", a case where the voltage is written in the second voltage state (middle level voltage) in the last writing action, and the middle level voltage is to be restored is referred to as the "case M", and a case where the voltage is written in the third voltage state (low level voltage) in the last writing action, and the low level voltage is to be restored is referred to as the "case L".

In addition, as described in the first embodiment, it is assumed that the threshold voltage of each transistor is 2 V. In addition, it is assumed that the turn-on voltage of the diode D1 is 0.6 V.

<First Type>

First, a description will be given of the self refreshing action for the first type pixel circuit 2A in which the second switch circuit 23 is the series circuit composed of the transistor T1 and the diode D1 only. Here, the pixel circuit 2A shown in FIG. 7 is assumed.

Figure 18:
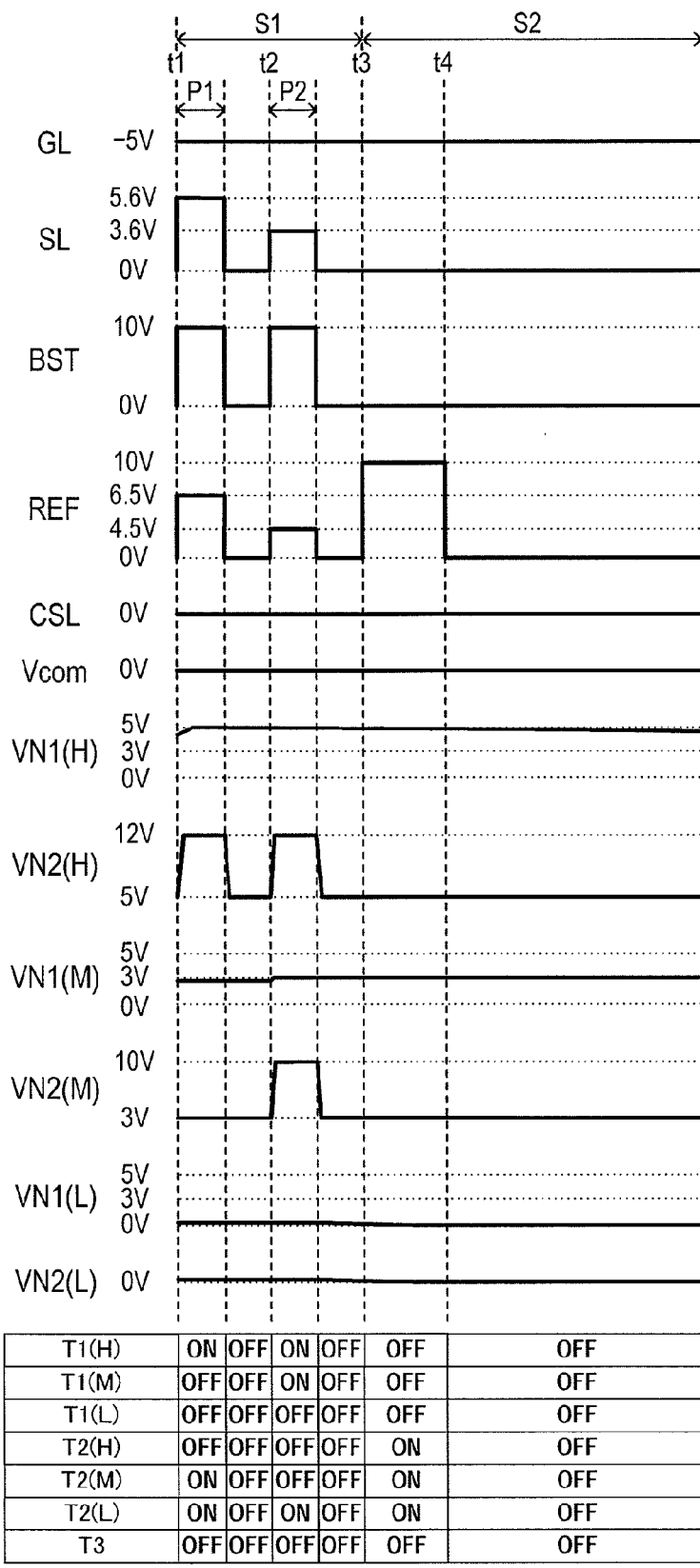
FIG. 18 is a timing chart of a self refreshing action according to a second embodiment in the first and third type pixel circuits.

FIG. 18 shows a timing chart of the first type self refreshing action. As shown in FIG. 18, the self refreshing action is divided into two steps S1 and S2, and the step S1 is provided with two phases P1 and P2. FIG. 18 illustrates voltage waveforms of all the gate lines GL, the source lines SL, the boost lines BST, the reference lines REF, the auxiliary capacity lines CSL, and the boost lines BST which are connected to the pixel circuits 2A serving as the target of the self refreshing action, and a voltage waveform of the opposite voltage Vcom. In addition, according to this embodiment, it is assumed that all the pixel circuits of the pixel circuit array are the target of the self refreshing action.

In addition, FIG. 18 shows waveforms showing changes of the potential (pixel voltage) VN1 of the internal node N1, and the potential VN2 of the output node N2 in the each of the cases, H, M, and L, and on/off states of the transistors. T1 to T3 in each step and each phase. Furthermore, FIG. 18 shows the case in the parentheses. For example, VN1 (H) is a waveform showing the change of the potential VN1 in the case H.

In addition, it is assumed that the high level has been written in the case H, the middle level has been written in the case M, and the low level has been written in the case L at a point before a time (t1) to start the self refreshing action.

After the writing action has been executed and the time has elapsed, the potential VN1 of the internal node N1 changes due to generation of a leak current of each transistor in the pixel circuit. In the case H, the VN1 is 5 V just after the writing action, but this value becomes lower than the original value after the time has elapsed. Similarly, in the case M, the VN1 is 3 V just after the writing action, but this value becomes lower than the original value after the time has elapsed. In each of these cases H and M, the potential of the internal node N1 gradually decreases with time mainly because a leak current flows toward a lower potential (such as the ground line) through the off-state transistor.

In addition, in the case L, the potential VN1 is 0 V just after the writing action, it could rise a little with time. This is because when the writing voltage is applied to the source line SL at the time of the writing action in another pixel circuit, a leak current flows from the source line SL to the internal node N1 through the off-state transistor even in the unselected pixel circuit.

FIG. 18 shows that the VN1(H) is a little lower than 5 V, the VN1(M) is a little lower than 3 V, and the VN1(L) is a little higher than 0 V, at the time t1. This is because the above potential fluctuation is considered.

The self refreshing action in this embodiment is mainly divided into the two steps S1 and S2. The step S1 corresponds to a "refreshing step", and the step S2 corresponds to a "standby step".

In the step S1, the refreshing action is directly executed for the case H and the case M by applying pulse voltages. Meanwhile, in the step S2, the refreshing action is indirectly executed for the case L by applying a constant voltage for a time longer than that of the step S1 (such as ten times or more). In addition, the term "directly executed" means that the internal node N1 and the source line SL are connected through the second switch circuit 23, so that the voltage applied to the source line SL is applied to the internal node N1, and the potential VN1 of the internal node is set to a desired value. In addition, the term "indirectly executed" means that the internal node N1 and the source line SL are not connected through the second switch circuit 23, but the potential VN1 of the internal node N1 is brought closer to a desired value by using a leak current slightly flowing between the internal node N1 and the source line SL through the off-state first switch circuit 22.

In addition, in the step S1, the phase P1 and P2 differ depending on whether the case H or M is refreshed. In FIG. 18, in the phase P1, only the internal node N1 of the case H (high voltage writing) is refreshed, and in the phase P2, only the internal node N1 of the case M (middle voltage writing) is refreshed. Hereinafter, this operation will be described in detail.

<<Step S1/phase P1>>

In the phase P1 to be started at the time t1, a voltage which can completely turn off the transistor T3 is applied to the gate line GL. Here, the voltage is −5 V. In addition, during the execution of the self refreshing action, the transistor T3 is constantly off, so that the voltage applied to the gate line GL may remain unchanged during the self refreshing action.

The opposite voltage Vcom applied to the opposite electrode 80, and a voltage applied to the auxiliary capacity line CSL are set to 0 V. Here, the voltage is not limited to 0 V, and a voltage value before the time t1 may be maintained as it is. In addition, these voltages also may remain unchanged during the self refreshing action.

At the time t1, a voltage provided by adding a turn-on voltage Vdn of the diode D1 to the desired voltage of the internal node N1 to be restored by the refreshing action is applied to the source line SL. In the phase P1, the refreshing target is the case H, so that the desired voltage of the internal node N1 is 5 V. Therefore, when the turn-on voltage Vdn of the diode D1 is 0.6 V, 5.6 V is applied to the source line SL.

In addition, the desired voltage of the internal node N1 corresponds to a "refreshing desired voltage", the turn-on voltage Vdn of the diode D1 corresponds to a "first adjusting voltage", and the voltage actually applied to the source line SL in the refreshing step S1 corresponds to a "refreshing input voltage". Thus, with the above terms, it is defined that <refreshing input voltage=refreshing desired voltage+first adjusting voltage>. In the phase P1, the refreshing input voltage is 5.6 V.

At the time t1, in a case where the internal node N1 shows the voltage state (gradation) as the refreshing target or higher (high gradation), a voltage that turns off the transistor T2 is applied to the reference line REF, while in a case where it shows the voltage state (low gradation) lower than the voltage state (gradation) as the refreshing target, a voltage that turn on the transistor T2 is applied thereto. In the phase P1, the refreshing target is the case H (first voltage state), and there is no voltage state higher than this, so that in the case where the internal node N1 is in the first voltage state (case H), the voltage that turns off the transistor T2 is applied to the reference line REF, while in the case where it is in the second voltage state (case M) and the third voltage state (case L), the voltage that turns on the transistor T2 is applied thereto.

More specifically, since a threshold voltage Vt2 of the transistor T2 is 2 V, the transistor T2 in the case M can be turned on by applying the voltage higher than 5 V (=3+2) to the reference line REF. However, when the voltage higher than 7 V (=5+2) is applied to the reference line REF, the transistor T2 in the case H as the target in the phase P1 comes to be also turned on. Therefore, the voltage between 5 V and 7 V is to be applied to the reference line REF.

In addition, it is assumed that the potential of the internal node N1 falls from the voltage state written by the last writing action by a certain level just before the execution of the self refreshing action due to the above-described leak current. That is, the potential VN1 of the internal node N1 corresponding to the case M could fall to about 2.5 V just before the execution of the self refreshing action. In this case, when the voltage of about 5.1 V is supposedly applied to the reference line REF, the transistor T2 could be turned off in the case M also, depending on the degree of the potential fall of the internal node N1, so that the voltage is set to 6.5 V with a view to staying on the safe side.

When 6.5 V is applied to the reference line REF, the transistor T2 is turned off in the pixel circuit in which the potential VN1 of the internal node N1 is 4.5 V or more. Meanwhile, the transistor T2 is turned on in the pixel circuit in which the VN1 is lower than 4.5 V. The self refreshing action is to be executed for the internal node N1 in the case H written to 5 V in the last writing action before it falls by 0.5 V or more due to the generation of the leak current so that the VN1 can be at 4.5 V or more, and as a result, the transistor T2 is turned off. Meanwhile, the internal node N1 in the case M written to 3 V and the internal node N1 of the case L written to 0 V by the last writing action do not become 4.5 V or more even after the time has elapsed, so that the transistor T2 is turned on in these cases.

Based on the above description, a value provided by subtracting the threshold voltage Vt2 of the transistor T2 from a voltage Vref applied to the reference line REF needs to exist between the internal node potential VN1 in the case H serving as the refreshing target in this phase, and the internal node potential VN1 in the case M in the voltage state one step lower than the above. In other words, in this phase P1, the voltage Vref applied to the reference line REF needs to satisfy the condition that 3 V<(Vref−Vt2)<5 V. The voltage of Vref-Vt2 corresponds to a "refreshing isolation voltage", and the Vt2 corresponds to a "second adjusting voltage", and the Vref corresponds to a "refreshing reference voltage". When the above condition is described with these terms, the "refreshing reference voltage" to be applied to the reference line REF in the phase P1 corresponds to the voltage value provided by adding the "second adjusting voltage" corresponding to the threshold voltage of the transistor T2, to the "refreshing isolation voltage" defined as the middle voltage between the voltage state (gradation) serving as the refreshing action target, and the voltage state (gradation) one step lower than the above.

As for the boost line BST, a voltage that turns on the transistor T1 in the case H in which the transistor T2 is off as described above, and turns off the transistor T1 in the cases M and L in which the transistor T2 is on is applied thereto.

The boost line BST is connected to the one end of the boost capacitive element Cbst. Therefore, when the high level voltage is applied to the boost line BST, the potential of the other end of the boost capacitive element Cbst, that is, a potential VN2 of the output node N2 is thrust upward. Thus, hereinafter, an action to thrust the potential of the output node N2 upward by increasing the voltage to be applied to the boost line BST is referred to as the "boost upthrust".

As described above, in the case H, the transistor T2 is off in the phase P1. Therefore, a potential fluctuation amount of the node N2 due to the boost upthrust is determined by a ratio between the boost capacity Cbst and the total capacity which is parasitic in the node N2. For example, in a case where the ratio is 0.7, when the potential of one electrode of the boost capacitive element increases by ΔVbst, the potential of the other electrode, that is, the node N2 increases by roughly 0.7 ΔVbst.

In the case H, the potential VN1 (H) of the internal node N1 shows roughly 5 V at the time t1. When a potential higher than the VN1 (H) by the threshold voltage 2 V or more is applied to the gate of the transistor T1, that is, the output node N2, the transistor T1 is turned on. According to this embodiment, it is assumed that the voltage applied to the boost line BST at the time t1 is 10 V. In this case, the potential of the output node N2 rises by 7 V. As will be described below in a fourth embodiment, since the transistor T2 is on in the writing action, the node N2 shows roughly the same potential (5 V) as that of the node N1 at the point just before the time t1. Thus, the potential of the node N2 shows 12 V due to the boost upthrust. Therefore, the potential difference more than the threshold voltage is generated between the gate of the transistor T1 and the node N1, so that the transistor T1 is turned on.

On the other hand, in the case M and the case L in which the transistor T2 is off in the phase P1, unlike the case H, the output node N2 and the internal node N1 are electrically connected. In this case, the potential fluctuation amount of the output node N2 due to the boost upthrust is affected by the total parasitic capacity of the internal node N1, in addition to the boost capacity Cbst and the total parasitic capacity of the node N2.

Since the internal node N1 is connected to the one end of the auxiliary capacitive element Cs, and the one end of the liquid crystal capacitive element Clc, the total capacity Cp which is parasitic in the internal node N1 is expressed by the sum of the liquid crystal capacity Clc and the auxiliary capacity Cs as described above. Thus, the boost capacity Cbst is considerably smaller than the liquid crystal capacity Cp. Therefore, a ratio of the boost capacity to the total capacity is extremely small such as about 0.01 or less. In this case, when the potential of one electrode of the boost capacitive element increases by ΔVbst, the other electrode, that is, the potential of the output node N2 only increases by up to 0.01 ΔVbst. That is, in the case M and the case L, even when ΔVbst=10 V, the potentials VN2 (M) and VN2 (L) of the output nodes N2 hardly increase.

In the case M, the potential VN2 (M) shows almost 3 V at the point just before the time t1. In addition, in the case L, the VN2 (L) show almost 0 V at the point just before the time t1. Therefore, in both cases, even when the boost upthrust is performed at the time t1, a potential sufficient to turn on the transistor is not applied to the gate of the transistor T1. That is, unlike the case H, the transistor T1 is still off.

In addition, in the cases M and L, the potential of the output node N2 just before the time t1 is not necessary to be 3 V and 0 V, respectively, and the potential only has to be a potential which does not turn on the transistor T1 even when a fine potential fluctuation due to the pulse voltage application to the boost line BST is considered. Similarly, in the case H, the potential of the node N1 just before the time t1 is not necessarily 5 V, and the potential only has to be a potential which turns on the transistor T1 after due consideration on the potential fluctuation due to the boost upthrust under the condition that the transistor T2 is in off state.

In the case H, the transistor T1 is turned on due to the boost upthrust. In addition, 5.6 V is applied to the source line SL, so that when the potential VN1 (H) of the internal node N1 falls a little from 5 V, a potential difference more than the turn-on voltage Vdn of the diode D1 is generated between the source line SL and the internal node N1. Therefore, the diode D1 is turned on from the source line SL toward the internal node N1, and a current flows from the source line SL toward the internal node N1. Thus, the potential VN1 (H) of the internal node N1 rises. In addition, the potential continues to rise until the potential difference between the source line SL and the internal node N1 becomes equal to the turn-on voltage Vdn of the diode D1, and stops when the potential difference becomes equal to the Vdn. Here, the voltage applied to the source line SL is 5.6 V, and the turn-on voltage Vdn of the diode D1 is 0.6 V, so that the rise of the potential VN1 (H) of the internal node N1 stops at 5 V. That is, the refreshing action is executed in the case H.

Thus, as described above, in the cases M and L, since the transistor T1 is off, the source line SL and the internal node N1 are not connected. Thus, the voltage applied to the source line SL does not affect the potentials VN1 (M) and VN1 (L) of the internal node N1.

To summarize the above, the refreshing action is executed for the pixel circuit in which the potential of the internal node N1 is the refreshing isolation voltage or more and the refreshing desired voltage or less. In the phase P1, the refreshing isolation voltage is 4.5 V (=6.5-2 V), and the refreshing desired voltage is 5 V, so that the refreshing action to refresh the potential VN1 to 5 V is executed only for the pixel circuit in which the potential VN1 of the internal node N1 is 4.5 to 5 V, that is, for the case H.

In addition, after the phase P1, the voltage application to each of the source line SL, the boost line BST, and the reference line REF is once stopped. Then, the next phase P2 starts at a time t2.

<<Step S1/phase 2>>

In the phase P2 to be started at the time t2, the case M (middle voltage writing node) is the refreshing target.

More specifically, 3.6 V is applied to the source line SL as the refreshing input voltage. This voltage 3.6 V is a value provided by adding the turn-on voltage Vdn of the diode D1 to the refreshing desired voltage (3 V) of the internal node N1 in the phase P2.

Thus, in a case where the internal node N1 shows the voltage state (case M) serving as the refreshing target or the higher voltage state (case H), a voltage that turns off the transistor T2 is applied to the reference line REF, while in a case where it shows the voltage state (case L) lower than the voltage state (case M) serving as the refreshing target, a voltage that turns on the transistor T2 is applied thereto. Considering similarly to the phase P1, when the voltage higher than 2 V is applied to the reference line REF, the transistor T2 can be turned on in the case L. However, when the voltage higher than 5 V is applied to the reference line REF, the transistor T2 in the case M comes to be also turned on. Therefore, formally, the voltage between 2 V and 5 V is to be applied to the reference line REF. However, since the voltage has to be applied with a view to staying on the safe side similar to the phase P1, 4.5 V is applied as one example here. This voltage 4.5 V corresponds to the refreshing reference voltage in the phase P2, and the voltage 2.5 V which is provided by subtracting the threshold voltage of the transistor T2 therefrom corresponds to the refreshing isolation voltage.

At this time, when the potential VN1 of the internal node N1 is the refreshing isolation voltage of 2.5 V or more, the transistor T2 is turned off. Meanwhile, the transistor T2 is turned on in the pixel circuit in which the VN1 is lower than 2.5 V. That is, in the case H written to 5 V, and the case M written to 3 V in the last writing action, the VN1 is 2.5 V or more, so that the transistor T2 is turned off. Meanwhile, in the case L written to 0 V in the last writing action, the VN1 is lower than 2.5 V, so that the transistor T2 is turned on.

As for the boost line BST, a voltage that turns on the transistor T1 in the cases H and M in which the transistor T2 is off, and a voltage that turns off the transistor T1 in the case L in which the transistor T2 is on is applied thereto. Here, the voltage is 10 V similar to the phase P1. While the transistor T1 is turned on because the potential of the output node N2 is thrust upward due to the boost upthrust in the cases H and M, the transistor T1 is not turned on in the case L because the potential VN2 (L) of the output node N2 hardly changes even when the boost upthrust is performed. This principle is similar to the phase P1, so that detailed description is omitted.

In the case H, the transistor T1 is turned on due to the boost upthrust. However, 3.6 V is applied to the source line SL. Even when the potential VN1 (H) of the internal node N1 falls a little from 5 V, the fall amount is less than 1 V. Thus, a reversely-biased state is provided from the source line SL toward the internal node N1, so that the source line SL and the internal node N1 are not connected due to a rectifying action of the diode D1. That is, the potential VN1 (H) of the internal node N1 is not affected by the voltage applied to the source lines SL.

In the case M also, the transistor T1 is turned on due to the boost upthrust. Since the voltage 3.6 V is applied to the source line SL, in the case where the potential VN1 (M) of the internal node N1 falls a little from 3 V, a potential difference more than the turn-on voltage Vdn of the diode D1 is generated between the source line SL and the internal node N1. Therefore, the diode D1 is turned on from the source line SL toward the internal node N1, and a current flows from the source line SL toward the internal node N1. Thus, the potential VN1 (M) of the internal node N1 continues to rise until the potential difference between the source line SL and the internal node N1 becomes equal to the turn-on voltage Vdn (=0.6

V). That is, the VN1 (M) reaches 3 V, and maintains the potential. Thus, the refreshing action is executed for the case H.

Thus, as described above, since the transistor T1 is off in the case L, the source line SL and the internal node N1 are not connected. Thus, the voltage applied to the source line SL does not affect the potential of the VN1 (L) of the internal node N1.

To summarize the above, in the phase P2, the refreshing isolation voltage is 2.5 V (=4.5−2 V), and the refreshing desired voltage is 3 V, so that the refreshing action to refresh the potential VN1 to 3 V is executed only for the pixel circuit in which the potential VN1 of the internal node N1 is 2.5 to 3 V, that is, for the case M.

In addition, after the phase P2, the voltage application to each of the source line SL, the boost line BST, and the reference line REF is stopped. Then, the process moves to the stand-by step S2.

<<Step S2>>

In the step S2 to be started at a time t3, a voltage that surely turns on the transistor T2 regardless of the potential VN1 of the internal node N1 is applied to the reference line REF. Here, 10 V is applied. The other signal lines maintain the same voltage states as those at the end of the phase P2.

In these voltage states, the transistor T2 is turned on, and the transistor T1 is turned off in all the cases H, M, and L. In addition, since the low level voltage is still applied to the gate line GL, the transistor T3 remains off. Thus, the potential VN1 of the internal node N1 remains the state just after the end of the refreshing step S1. In addition, the output node N2 is connected to the internal node N1, so that the VN2 is equal to the VN1.

Then, at a time t4, the voltage applied to the reference line REF is shifted to low level (0 V). Thus, the transistor T2 is turned off.

In this step S2, the same voltage states are maintained over a time which is sufficiently longer than the step S1. Since 0 V is applied to the source line SL in this period, a leak current is generated from the internal node N1 to the source line SL through the off-state transistor T3. As described above, even when the VN1 (L) is a little higher than 0 V at the time t1, the VN1 (L) is gradually brought closer to 0 V over the period of the stand-by step S2. Thus, the refreshing action is executed "indirectly" for the case L.

However, the generation of this leak current is not limited to the case L, and it is generated in the case H and the case M. Therefore, in the case H and the case M also, the VN1 is refreshed to 5 V and 3 V, respectively at the point just after the step S1, but in the step S2, the VN1 gradually falls. Therefore, it is preferable to execute the refreshing action for the cases H and M again by executing the refreshing step S1 again after the voltage state of the stand-by step S2 has lasted for a certain period of time.

As described above, the potential VN1 of the internal node N1 can be returned to the last written state in each of the cases H, M, and L by repeating the refreshing step S1 and the stand-by step S2.

Like the conventional case, in the case where the refreshing action is performed for each pixel circuit by the "writing action" through the source line SL, it is necessary to scan the gate line GL in a vertical direction one by one. Therefore, it is necessary to apply a high level voltage to the gate line GL by the number (n) of the gate lines. In addition, it is necessary to apply the same potential level as the potential level written in the last writing action to each source line SL, so that charge/discharge actions are needed for the source lines SL up to n times.

Meanwhile, according to this embodiment, the potential of the internal node N1, that is, the voltage of the pixel electrode 20 can be returned to the potential state at the time of the writing action for all the pixel circuits, regardless of the voltage state of the internal node N1, by only applying the pulse voltage in twice in the refreshing step S1, and then maintaining the constant voltage state in the subsequent stand-by step. That is, the number of times to change the voltage applied to each line to return the potential of the pixel electrode 20 of each pixel can be considerably reduced in the one frame period, and furthermore, its control contents can be simplified. Therefore, power consumption for the gate driver 14 and the source driver 13 can be considerably cut.

In addition, the self refreshing action described with reference to FIG. 18 assumes the pixel circuit 2A in FIG. 7, but it is clear that the self refreshing action can be executed by the same method for the variation type pixel circuit shown in FIG. 8.

In addition, in the case where the two or more diodes D1 are provided in the second switch circuit 23, the source line SL and the internal node N1 are not connected unless a potential difference provided by multiplying the turn-on voltage Vdn by the number of the diodes D1 or more exists in a direction from the source line SL to the internal node N1, in the second switch circuit 23. Therefore, in the case where the two diodes D1 are provided in the second switch circuit 23, for example, it is necessary to apply a voltage which is provided by adding a twofold value of the turn-on voltage Vdn, as the first adjusting voltage, to the refreshing desired voltage in each case, as the refreshing input voltage to the source line SL. As for the other points, the self refreshing action can be executed by the same method as that in FIG. 18.

In addition, instead of the voltage application method shown in FIG. 18, the following method can be used.

1) In FIG. 18, the refreshing action is executed for the case H in the phase P1, and then the refreshing action is executed for the case M. This order may be reversed.

In addition, as for the order of the step S1 and the step S2, since the steps S1 and S2 are repeated, discussion about it is not meaningful.

2) The voltage 10 V is applied to the boost line BST in both the phases P1 and P2. However, the transistor T1 in the case H only has to be turned on in the phase P1, and the transistor T1 in the case M only has to be turned on in the phase P2. In the phase P2, the voltage applied to the source line SL is 3.6 V, and the threshold voltage of the transistor T3 is 2 V, so that a voltage of at least 5.6 V may be applied when the turn-on voltage Vdn of the diode D1 is not considered. That is, in the phase P2, the voltage applied to the boost line BST can be lower than that of the phase P1, to the extent that the transistor T1 in the case M is turned on.

3) In the stand-by step S2, the high level voltage (10 V) is applied to the reference line REF from the time t3 to t4. This voltage is applied to allow the potential VN2 of the output node N2 to become equal to the potential VN1 of the internal node N1. Thus, the high level voltage may be applied to the reference line REF in any timing in the period of the step S2.

Figure 19:
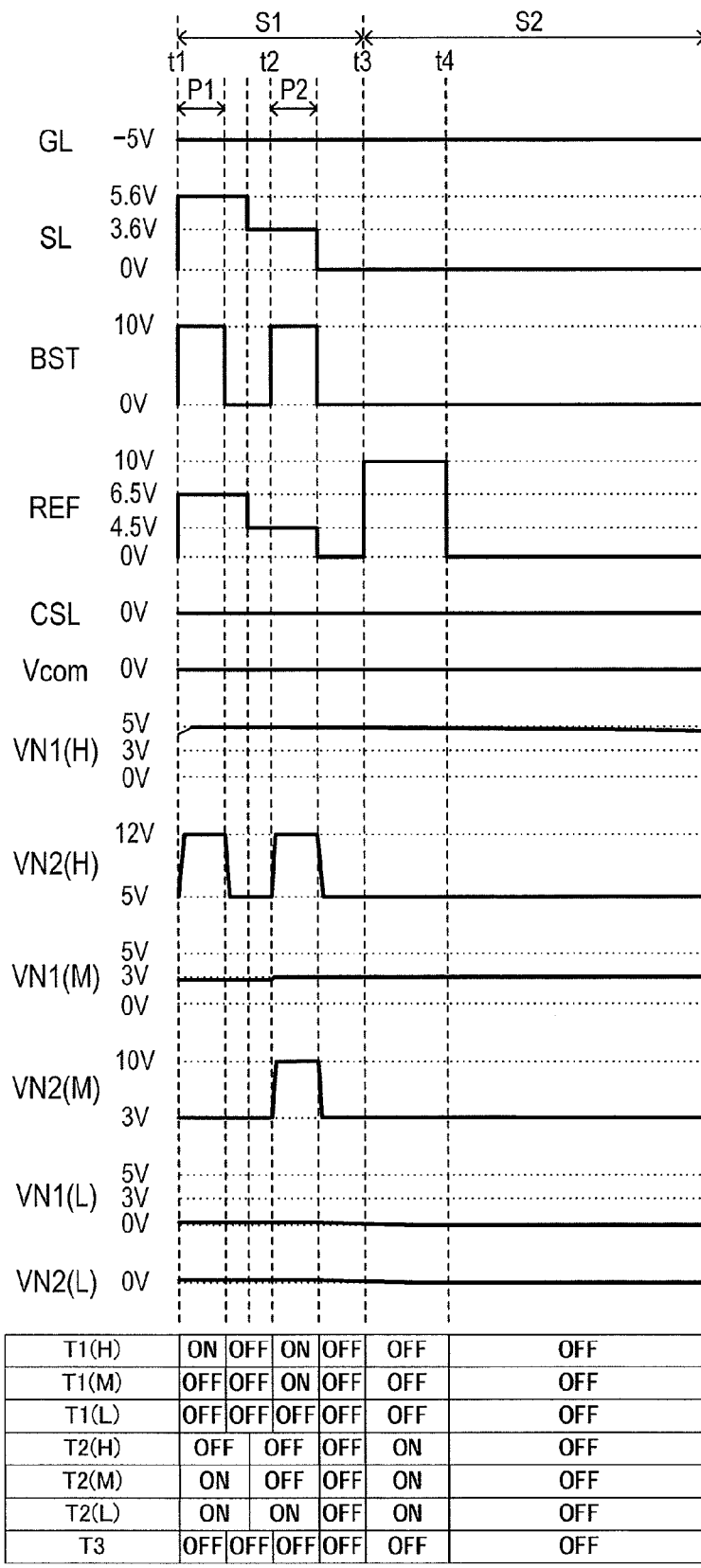
FIG. 19 is another timing chart of a self refreshing action according to the second embodiment in the first and third type pixel circuits.

4) In FIG. 18, in the refreshing step S1, after the refreshing action in the phase P1, the voltages applied to the source line SL and the reference line REF are lowered to the low level (0 V) once, and then the refreshing action is executed in the phase P2. However, the voltage applied to each line is not necessarily lowered to low level. For example, as shown in FIG. 19, in a period between the phases P1 and P2, that is, in a period while the level of the boost line BST is at low level (0 V), the voltages applied to the source line SL and the reference line REF may be set to values to be applied in the phase P2. In this case, compared to FIG. 18, a fluctuation width of the voltage applied to each of the source line SL and the reference line REF can be small.

Figure 20:
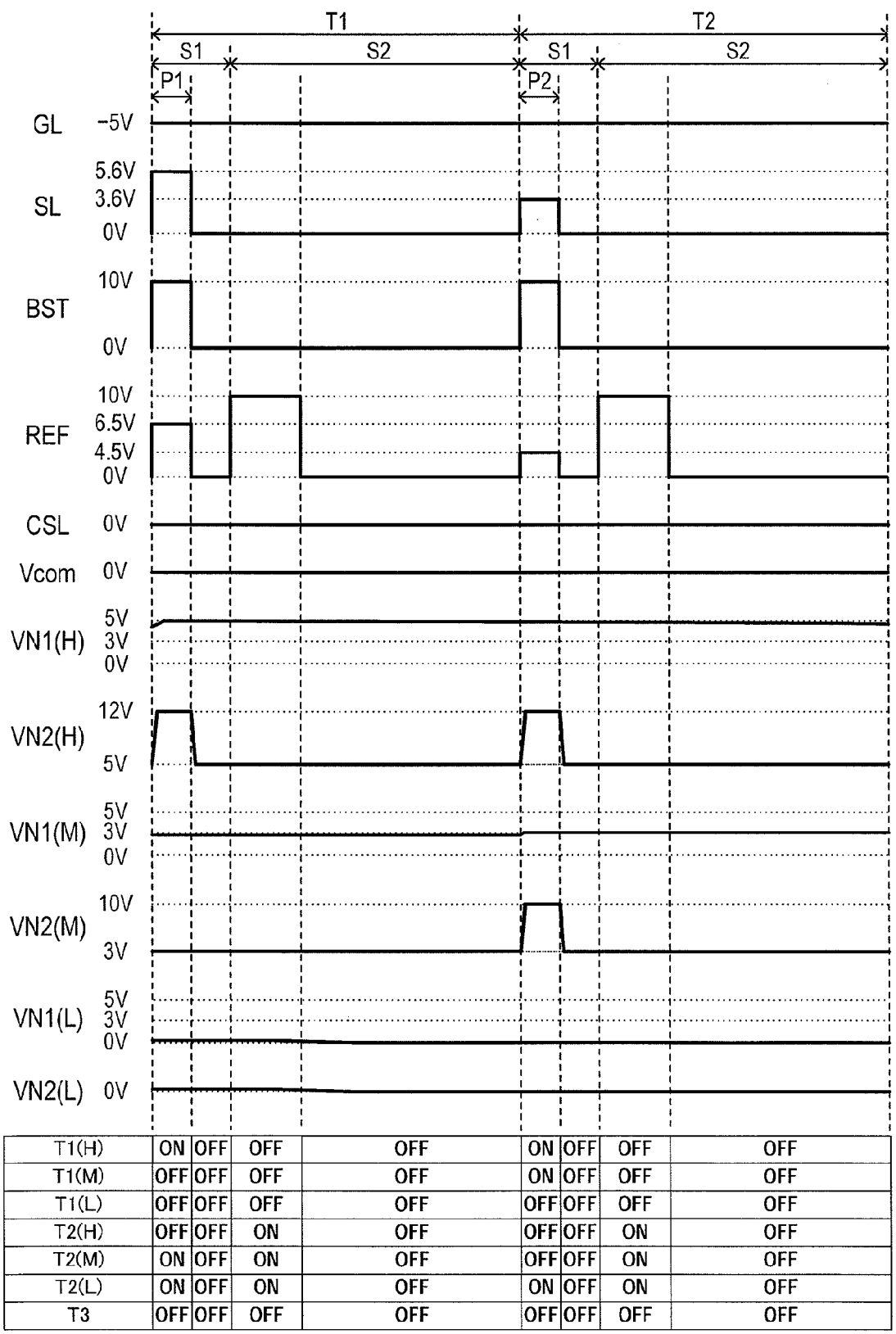
FIG. 20 is another timing chart of a self refreshing action according to the second embodiment in the first and third type pixel circuits.

5) In the above embodiment, as the series of self refreshing actions, it is assumed that the refreshing action is performed for the case H and the case M in the refreshing step S1, the stand-by step S2 is performed, and then the steps are repeated. Meanwhile, as another configuration, after the refreshing action has been performed for a predetermined gradation in the refreshing step S1 in a certain term, the stand-by step S2 is performed, and then the refreshing action is performed for another gradation in the refreshing step S1 in the next term (refer to FIG. 20). In FIG. 20, the refreshing action is performed for the node N1 of the case H, in the refreshing step S1 in a term T1 (P1), the stand-by step S2 is performed, and the refreshing action is performed for the node N1 of the case M in the refreshing step S1 in the next term T2 (P2). Thus, the gradation as the target of the refreshing action may be changed with respect to each term.

<Second Type>

Next, a description will be given of the pixel circuit belonging to the second type in which the second switch circuit 23 is the series circuit composed of the transistor T1, the diode D1, and the transistor T4, and the control terminal of the transistor T4 is connected to the selection line SEL.

First, a description will be given of a case where the self refreshing action is executed for the second type pixel circuit 2B shown in FIG. 9. It differs from the pixel circuit 2A shown in FIG. 7 in that the conduction state of the second switch circuit 23 is controlled by the transistor T4 in addition to the transistor T1 and the diode D1.

Here, as described in the above first type, the source line SL and the internal node N1 are connected through the second switch circuit 23 only in the refreshing step S1. Thus, in the refreshing step S1, only the case serving as the target of the refreshing action is turned on by the diode D1 or the transistor T1, and in the other cases, the second switch circuit 23 is off because the diode D1 is reversely biased, or the transistor T1 is turned off. These are the same in the second type also.

Figure 21:
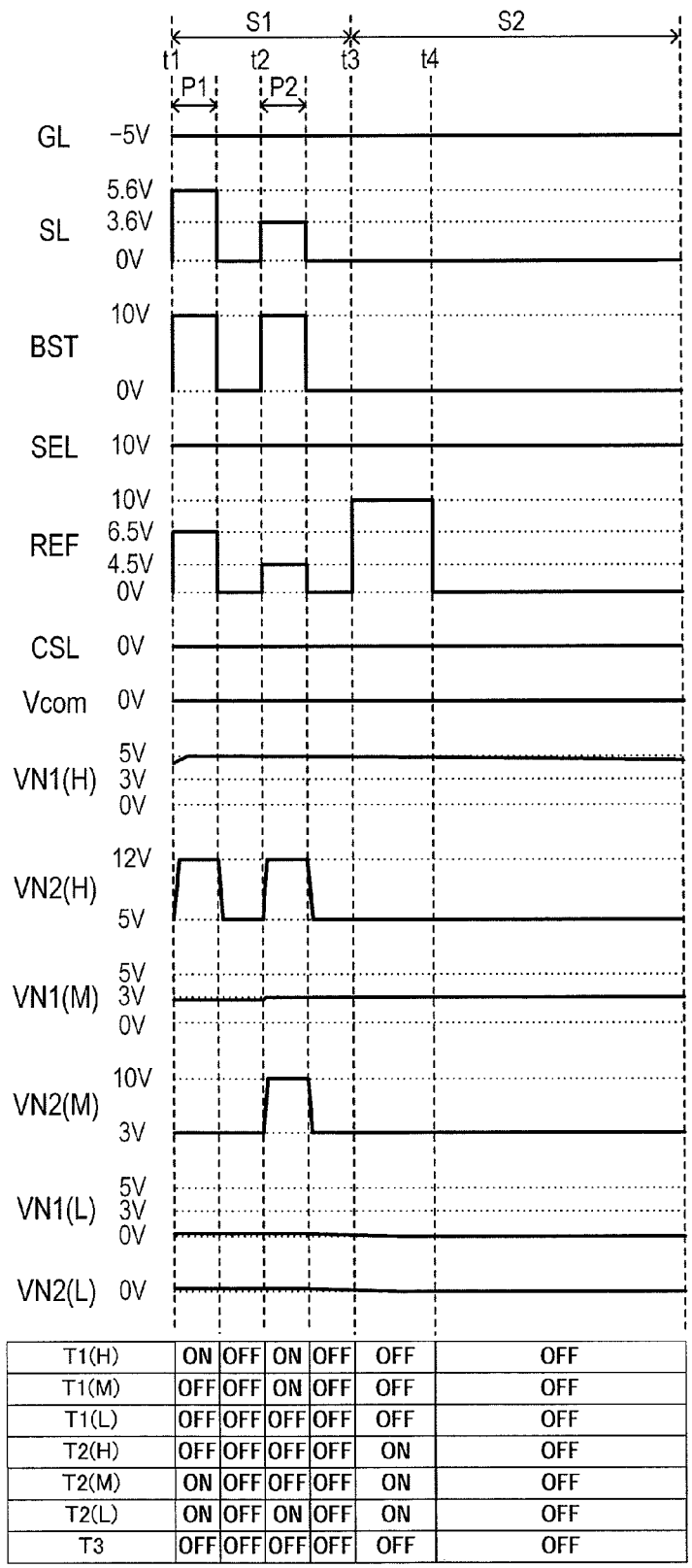
FIG. 21 is a timing chart of a self refreshing action according to the second embodiment in the second type pixel circuit.

In the second type, the transistor T4 is provided, and the selection line SEL to control the on/off of the transistor T4 is provided separately from the boost line BST. Therefore, totally the same voltage state as in the first type can be implemented by applying the voltage that keep the transistor T4 on, to the selection line SEL in the refreshing step S1. FIG. 21 shows a timing chart in this case. In addition, the voltage applied to the selection line SEL is 10 V here.

Figure 22:
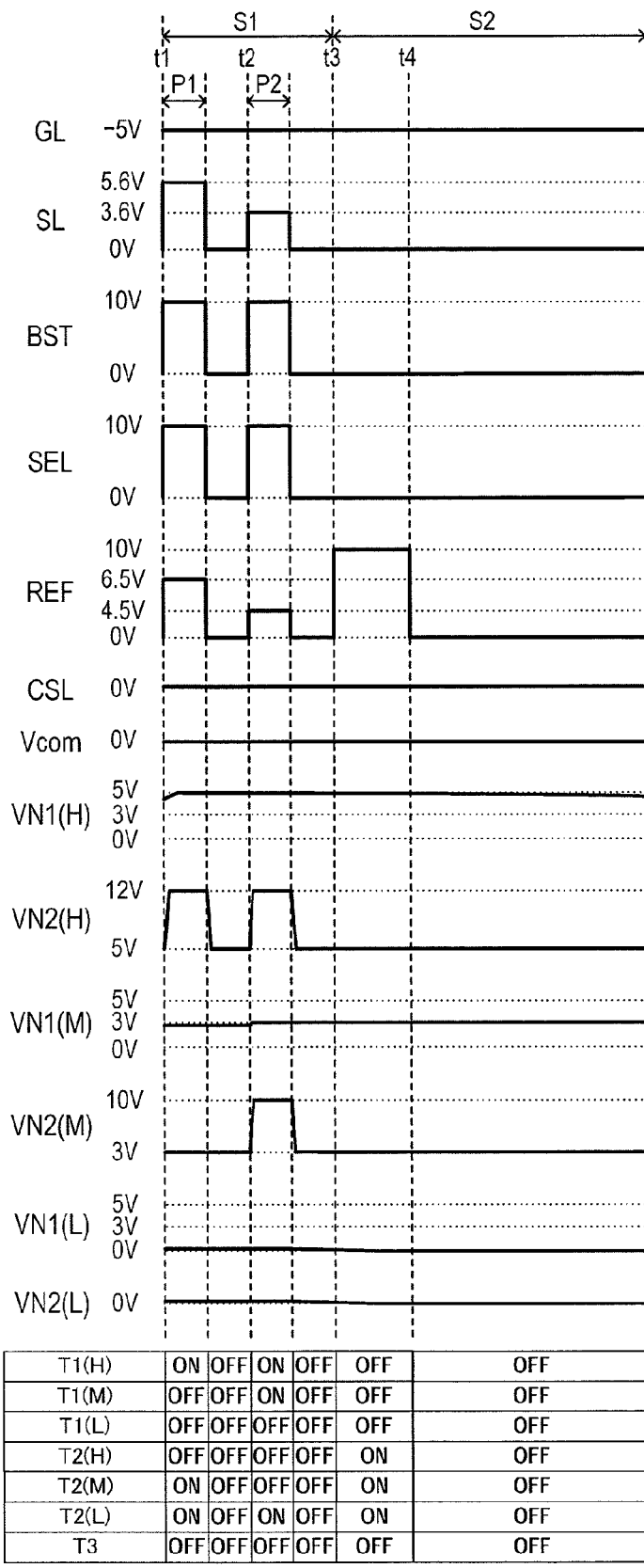
FIG. 22 is another timing chart of a self refreshing action according to the second embodiment in the second type pixel circuit.

As a matter of course, the pulse-shaped voltage may be applied to the selection line SEL at the same timing as the timing when a boost voltage is applied to the boost line BST. FIG. 22 shows a timing chart in this case.

The above description is applied to the pixel circuits 2B shown in FIGS. 10 and 11, and the pixel circuits 2C shown in FIGS. 12 to 15 as a matter of course, and its description is omitted.

<Third Type>

A description will be given of the pixel circuit belonging to the third type in which the second switch circuit 23 is the series circuit composed of the transistor T1, the diode D1, and the transistor T4, and the control terminal of the transistor T4 is connected to the boost line BST.

According to the pixel circuit belonging to the third type, compared to the pixel circuit belonging to the second type, the control terminal of the transistor T4 is connected to the boost line BST, and the selection line SEL is not provided. Therefore, unlike the second type pixel circuit, the boost line BST controls the on/off of the transistor T4.

However, as shown in FIG. 22, in the second type, when the pulse voltage is applied to the selection line SEL at the same timing as the boost line BST, totally the same voltage states as that of the first type pixel circuit can be implemented. Thus, this means that totally the same voltage state can be implemented even when the control terminal of the transistor T4 is connected to the boost line BST.

Therefore, the self refreshing action can be executed for the pixel circuit 2D shown in FIG. 16 by providing the same voltage state as that in FIG. 18. Thus, this is the same with the pixel circuit 2E shown in FIG. 17. Detailed description is omitted.

[Third Embodiment]

In the third embodiment, a description will be given of a case where the self refreshing action is executed by a voltage application method different from that of the second embodiment, with reference to the drawings. In addition, the self refreshing action of this embodiment is divided into the refreshing step S1 and the stand-by step S2, similar to the second embodiment.

According to the second embodiment, only the internal node N1 of the case H (high voltage writing) is refreshed in the phase P1, and only the internal node N1 of the case M (middle voltage writing) is refreshed in the phase P2. Thus, in the step S1, the pulse voltage needs to be applied to the boost line BST in each of the phase P1 and phase P2.

Meanwhile, according to this embodiment, only the internal node N1 of the case M (middle voltage writing) is refreshed in the phase P1, and only the internal node N1 of the case H (high voltage writing) is refreshed in the phase P2 as will be described below. Thus, in the step S1, the high level voltage is applied to the boost line BST from the phase P1 to the phase P2. Thus, the number of times to change the voltage applied to the boost line BST is reduced in the step S1, so that power consumption at the time of the self refreshing action can be cut. Hereinafter, this operation will be described in detail.

<First Type>

A description will be given of a case where the self refreshing action in this embodiment is performed for the first type pixel circuit 2A, with reference to a timing chart shown in FIG. 23. The pixel circuit 2A assumes the pixel circuit 2A shown in FIG. 7 similar to the second embodiment.

<<Step S1/phase P1>>

It is assumed that in the phase P1, the writing node N1 (M) of the case M (middle voltage state) is the refreshing target.

In the step S1 to be started at the time t1, a voltage which can completely turn off the transistor T3 is applied to the gate line GL. Here, the voltage is −5 V. In addition, during the execution of the self refreshing action, the transistor T3 is constantly off, so that the voltage applied to the gate line GL may remain unchanged during the self refreshing action.

The opposite voltage Vcom applied to the opposite electrode 80, and the voltage applied to the auxiliary capacity line CSL are set to 0 V. The voltage is not limited to 0 V, and a voltage value before the time t1 may be maintained as it is. In addition, these voltages also may remain unchanged during the self refreshing action.

In a case where the internal node N1 shows the voltage state (gradation) as refreshing target or higher voltage state (high gradation), a voltage that turns off the transistor T2 is applied to the reference line REF, while in a case where it shows the voltage state (low gradation) lower than the voltage state (gradation) as the refreshing target, a voltage that turns on the transistor T2 is applied thereto. In the phase P1, the refreshing target is the second voltage state (case M), so that the voltage that turns off the transistor T2 is applied to the reference line REF in the case where the internal node N1 is in the second voltage state (case M) and in the case where it is in the first voltage state (case H), while the voltage that turns on the transistor T2 is applied thereto in the case where it is in the third voltage state (case L).

More specifically, since the threshold voltage Vt2 of the transistor T2 is 2 V, the transistor T2 in the case L can be turned on by applying the voltage higher than 2 V to the reference line REF. However, when the voltage higher than 5 V is applied to the reference line REF, the transistor T2 in the target case M in the phase P1 comes to be also turned on. Therefore, the voltage between 2 V and 5 V is to be applied to the reference line REF. In FIG. 23, 4.5 V is applied to the reference line REF.

When 4.5 V is applied to the reference line REF, the transistor T2 is turned off in the pixel circuit in which the potential VN1 of the internal node N1 is 2.5 V or more. Meanwhile, the transistor T2 is turned on in the pixel circuit in which the VN1 is lower than 2.5 V.

As for the internal node N1 of the case M written to 3 V in the last writing action, by executing the self refreshing action before it falls by more than 0.5 V due to the leak current, the VN1 can be 2.5 V or more, so that the transistor T2 is turned off. In addition, as for the internal node N1 of the case H written to 5 V in the last writing action, the VN1 can be 2.5 V or more for the same reason, so that the transistor T2 is turned off. Meanwhile, as for the internal node N1 of the case L written to 0 V in the last writing action, it does not reach 2.5 V or more even when a time has elapsed, so that the transistor T2 is turned on.

A voltage provided by adding the turn-on voltage Vdn of the diode D1 to the desired voltage of the internal node N1 to be restored by the refreshing action is applied to the source line SL (time t2). Here, since the refreshing target is the case M, in the phase P1 in this embodiment, the desired voltage of the internal node N1 is 3 V. Therefore, when the turn-on voltage Vdn of the diode D1 is 0.6 V, 3.6 V is applied to the source line SL. In addition, the time t1 to apply 4.5 V to the reference line REF, and the time t2 to apply 3.6 V to the source line SL may be the same time.

In addition, the desired voltage of the internal node N1 corresponds to a "refreshing desired voltage", the turn-on voltage Vdn of the diode D1 corresponds to a "first adjusting voltage", and the voltage actually applied to the source line SL in the refreshing step S1 corresponds to a "refreshing input voltage". Thus, the refreshing input voltage is 3.6 V in the phase P1.

As for the boost line BST, a voltage that turns on the transistor T1 in the case M and the case H in which the transistor T2 is off as described above is applied thereto, while a voltage that turns off the transistor T1 in the case L in which the transistor T2 is in on is applied thereto (time t3). The boost line BST is connected to the one end of the boost capacitive element Cbst. Therefore, when the high level voltage is applied to the boost line BST, the potential of the other end of the boost capacitive element Cbst, that is, the potential of the output node N2 is thrust upward.

As described above, in the case M and the case H, the transistor T2 is off in the phase P1. Therefore, a potential fluctuation amount of the node N2 due to the boost upthrust is determined by a ratio between the boost capacity Cbst and the total capacity which is parasitic in the node N2. For example, when the ratio is 0.7, and one electrode of the boost capacitive element increases by ΔVbst, the other electrode, that is, the node N2 increases by about 0.7 ΔVbst.

In the case M, the potential VN1 (M) of the internal node N1 shows roughly 3 V at the time t1. When a potential higher than the VN1 (M) by the threshold voltage of 2 V or more is applied to the gate of the transistor T1, that is, the output node N2, the transistor T1 is turned on. According to this embodiment, it is assumed that the voltage applied to the boost line BST at the time t1 is 10 V. In this case, the potential of the output node N2 rises by 7 V. Since the transistor T2 is on in the writing action, the node N2 shows roughly the same potential (about 3 V) as that of the node N1 at the point just before the time t1. Thus, the node N2 shows about 10 V due to the boost upthrust. Therefore, the potential difference more than the threshold voltage is generated between the gate of the transistor T1 and the node N1, so that the transistor T1 is turned on.

In the case H also, since the node N2 shows about 12 V due to the boost upthrust, the transistor T1 is turned on.

On the other hand, in the case L in which the transistor T2 is on in the phase P1, unlike the case M and the case H, the output node N2 and the internal node N1 are electrically connected. In this case, the potential fluctuation amount of the output node N2 due to the boost upthrust is affected by the total parasitic capacity of the internal node N1, in addition to the boost capacity Cbst and the total parasitic capacity of the node N2.

The internal node N1 is connected to the one end of the auxiliary capacitive element Cs, and the one end of the liquid crystal capacitive element Clc, and the total capacity Cp which is parasitic in the internal node N1 is expressed by the sum of the liquid crystal capacity Clc and the auxiliary capacity Cs. Thus, the boost capacity Cbst is considerably smaller than the liquid crystal capacity Cp. Therefore, a ratio of the boost capacity to the total capacity is extremely small such as about 0.01 or less. In this case, when one electrode of the boost capacitive element increases by ΔVbst, the other electrode, that is, the output node N2 only increases by up to 0.01 ΔVbst. That is, in the case L, even when ΔVbst=10 V, the potential VN2 (L) of the output node N2 hardly increases.

In the case L, the potential VN2 (L) shows roughly 0 V at the point just before the time t1. Therefore, even when the boost upthrust is performed at the time t1, a potential sufficient to turn on the transistor is not applied to the gate of the transistor T1. That is, unlike the case M, the transistor T1 is still off.

In the case M, the transistor T1 is turned on due to the boost upthrust. In addition, 3.6 V is applied to the source line SL, so that when the potential VN1 (M) of the internal node N1 falls a little from 3 V, a potential difference more than the turn-on voltage Vdn of the diode D1 is generated between the source line SL and the internal node N1. Therefore, the diode D1 is turned on from the source line SL toward the internal node N1, and a current flows from the source line SL toward the internal node N1. Thus, the potential VN1 (M) of the internal node N1 rises. In addition, the potential continues to rise until the potential difference between the source line SL and the internal node N1 becomes equal to the turn-on voltage Vdn of the diode D1, and stops when it becomes equal to the Vdn. Here, the voltage applied to the source line SL is 3.6 V, and the turn-on voltage Vdn of the diode D1 is 0.6 V, so that the rise of the potential VN1 (M) of the internal node N1 stops at 3 V. That is, the refreshing action is executed for the case M.

In the case H also, the transistor T1 is turned on due to the boost upthrust. However, 3.6 V is applied to the source line SL. Even when the potential VN1 (H) of the internal node N1 falls a little from 5 V, its fall amount is less than 1 V. Thus, reversely-biased state is provided from the source line SL toward the internal node N1, so that the source line SL and the internal node N1 are not connected due to the rectifying action of the diode D1. That is, the potential VN1 (H) of the internal node N1 is not affected by the voltage applied to the source line SL.

Thus, in the case L, since the transistor T1 is off, the source line SL and the internal node N1 are not connected. Thus, the voltage applied to the source line SL does not affect the potential VN1 (L) of the internal node N1.

To summarize the above, the refreshing action is executed for the pixel circuit in which the potential of the internal node N1 is the refreshing isolation voltage or more and the refreshing desired voltage or less, in the phase P1. In the phase P1, the refreshing isolation voltage is 2.5 V (=4.5−2 V), and the refreshing desired voltage is 3 V, so that the refreshing action to refresh the potential VN1 to 3 V is executed only for the pixel circuit in which the potential VN1 of the internal node N1 is 2.5 V to 3 V, that is, for the case M.

<<Step S1/phase 2>>

In the phase P2, the writing node N1 (H) of the case H (high voltage state) is the refreshing target.

The voltage applied to the boost line BST is constantly 10 V from the phase P1.

Thus, when the internal node N1 shows the voltage state (case H) serving as the refreshing target, a voltage that keeps the transistor T2 turned off is applied to the reference line REF, while when it shows the voltage state (cases M and L) lower than the voltage state (case H) serving as the refreshing target, a voltage that turns on the transistor T2 is applied thereto at the time t4.

More specifically, the threshold voltage Vt2 of the transistor T2 is 2 V, and the voltage VN1 (M) of the internal node N1 of the case M is 3 V, so that when a voltage higher than 5 V (=2+3) is applied to the reference line REF, the transistor T2 can be turned on in the case M. At this time, the transistor T2 in the case L is turned on as a matter of course.

However, when a voltage higher than 7 V is applied to the reference line REF, the transistor T2 in the case H comes to be also turned on. Therefore, formally, the voltage between 5 V and 7 V is to be applied to the reference line REF. However, since the voltage has to be applied with a view to staying on the safe side similar to the phase P1, 6.5 V is applied as one example here. This voltage 6.5 V corresponds to the refreshing reference voltage, and the voltage 4.5 V which is provided by subtracting the threshold voltage of the transistor T2 therefrom corresponds to the refreshing isolation voltage in the phase P2.

At this time, when the potential VN1 of the internal node N1 is the refreshing isolation voltage of 4.5 V or more, the transistor T2 is turned off. Meanwhile, the transistor T2 is turned on in the pixel circuit in which the VN1 is lower than 4.5 V. That is, in the case H written to 5 V in the last writing action, the VN1 is 4.5 V or more, so that the transistor T2 is turned off. Meanwhile, in the case L written to 0 V and in the case M written to 3 V in the last writing action, the VN1 is lower than 4.5 V, so that the transistor T2 is turned on.

A voltage provided by adding the turn-on voltage Vdn of the diode D1 to the desired voltage of the internal node N1 to be restored by the refreshing action is applied to the source line SL (time t5). Here, since the refreshing target is the case H in the phase P2 in this embodiment, the desired voltage of the internal node N1 is 5 V. Therefore, when the turn-on voltage Vdn of the diode D1 is 0.6 V, 5.6 V is applied to the source line SL. In addition, as will be described below, the time t5 at which 5.6 V is applied to the source line SL needs to be later than the time t4 at which 6.5 V is applied to the reference line REF in this phase P2.

In the case H, the transistor T2 still remains off state from the phase P1, and the potential of the internal node N2 holds the state of the phase P1, so that the transistor T1 is turned on. In this state, when the voltage of 5.6 V is applied to the source line SL, in the case where the potential VN1 (H) of the internal node N1 falls a little from 5 V, a potential difference more than the turn-on voltage Vdn of the diode D1 is generated between the source line SL and the internal node N1. Therefore, the diode D1 is turned on in a direction from the source line SL toward the internal node N1, and a current flows from the source lines SL toward the internal node N1. Thus, the potential VN1 (H) of the internal node N1 continues to rise until the potential difference between the source line SL and the internal node N1 becomes equal to the turn-on voltage Vdn (=0.6 V). That is, the VN1 (H) reaches 5 V, and maintains the potential. Thus, the refreshing action is executed for the case H.

The case M will be described in detail. At a stage just before the time t4 at which 6.5 V is applied to the reference line REF, the potential VN2 (M) of the node N2 is about 12 V, and the VN1 (M) is 3 V. In this state, when 6.5 V is applied to the reference line REF at the time t4, the transistor T2 is turned on in the direction from the node N2 to the node N1, and a current is generated in this direction. However, as described above, the parasitic capacity of the node N1 is extremely larger than the parasitic capacity of the node N2, the potential of the node N2 falls due to the current generation, but the potential of the node N1 remains unchanged. The node N2 falls until it becomes the same potential (that is, 3 V) as that of the node N1 and then potential fall stops. In addition, at this point, since the refreshing action has been already executed for the case M in the phase P1, the potential VN2 (M) of the node N2 also becomes the same potential as the VN1 (M) after the refreshing action.

When the potential of the node N2 falls below the voltage (that is, 5 V) provided by adding the threshold voltage (2 V) of the transistor T1 to the potential of the node N1, the transistor T1 is turned off. Thus, as described above, the node N2 becomes the same potential as that of the node N1, and the potential change stops, so that the transistor T1 is still off. Therefore, in this state, even when 5.6 V is applied to the source line SL, this voltage is not supplied to the node N1 (M) through the transistor T1. That is, the voltage (5.6 V) applied to the source line SL in the phase P2 does not affect the potential of the potential VN1 (M) of the internal node N1.

In other words, in the case where 5.6 V is applied to the source line SL at the time t5, in order to prevent this voltage from being supplied to the internal node N1 of the case M, the transistor T1 has to be off at the time t5. At the stage just before 6.5 V is applied to the reference line REF, the transistor T1 of the case M is on, so that in order to turn off it, after 6.5 V has been applied to the reference line REF, the potential VN2 of the node N2 has to be lower than 5 V. Therefore, after 6.5 V has been applied to the reference line REF at the time t4 and a time has passed so that the potential VN2 of the node N2 falls below 5 V, the voltage applied to the source line SL has to be changed to 5.6 V. Therefore, the time t5 at which 5.6 V is applied to the source line SL is required to be later than the time t4 at which 6.5 V is applied to the reference line REF. In FIG. 23, this is expressed by delaying the timing a little when the transistor T1 (M) shifts from on to off than the time t4.

In the case L, since the transistor T1 remains off continuously from the phase P1, the source line SL and the internal node N1 are not connected. Thus, the voltage applied to the source line SL does not affect the potential of the potential VN1 (L) of the internal node N1.

To summarize the above, in the phase P2, the refreshing action is executed for the pixel circuit in which the potential of the internal node N1 is the refreshing isolation voltage or more and the refreshing desired voltage or less. Here, since the refreshing isolation voltage is 4.5 V (=6.5-2 V), and the refreshing desired voltage is 5 V, the refreshing action to refresh the potential VN1 to 5 V is performed only for the pixel circuit in which the potential VN1 of the internal node N1 is 4.5 V to 5 V, that is, for the case H.

After the refreshing action of the case H, the voltage application to the boost line BST is stopped (time t6), and the high voltage (here, 10 V) is applied to the reference line REF to turn on the transistor T2 in each of the cases H, M, and L (time t7). Thus, the voltage application to the source line SL is stopped (time t8). In addition, the order of the times t6 to t8 is not limited to this order, and they may be executed at the same time.

<<Step S2>>

After the time t8, the process is moved to the stand-by step S2 with the voltage state unchanged (times t8 to t9). At this time, since the high voltage is applied to the reference line REF, the nodes N1 and N2 show the same potential in each of the cases H, M, and L. A time sufficiently longer than that of the reference step S1 is ensured in the stand-by step S2, which is similar to the second embodiment.

Figure 23:
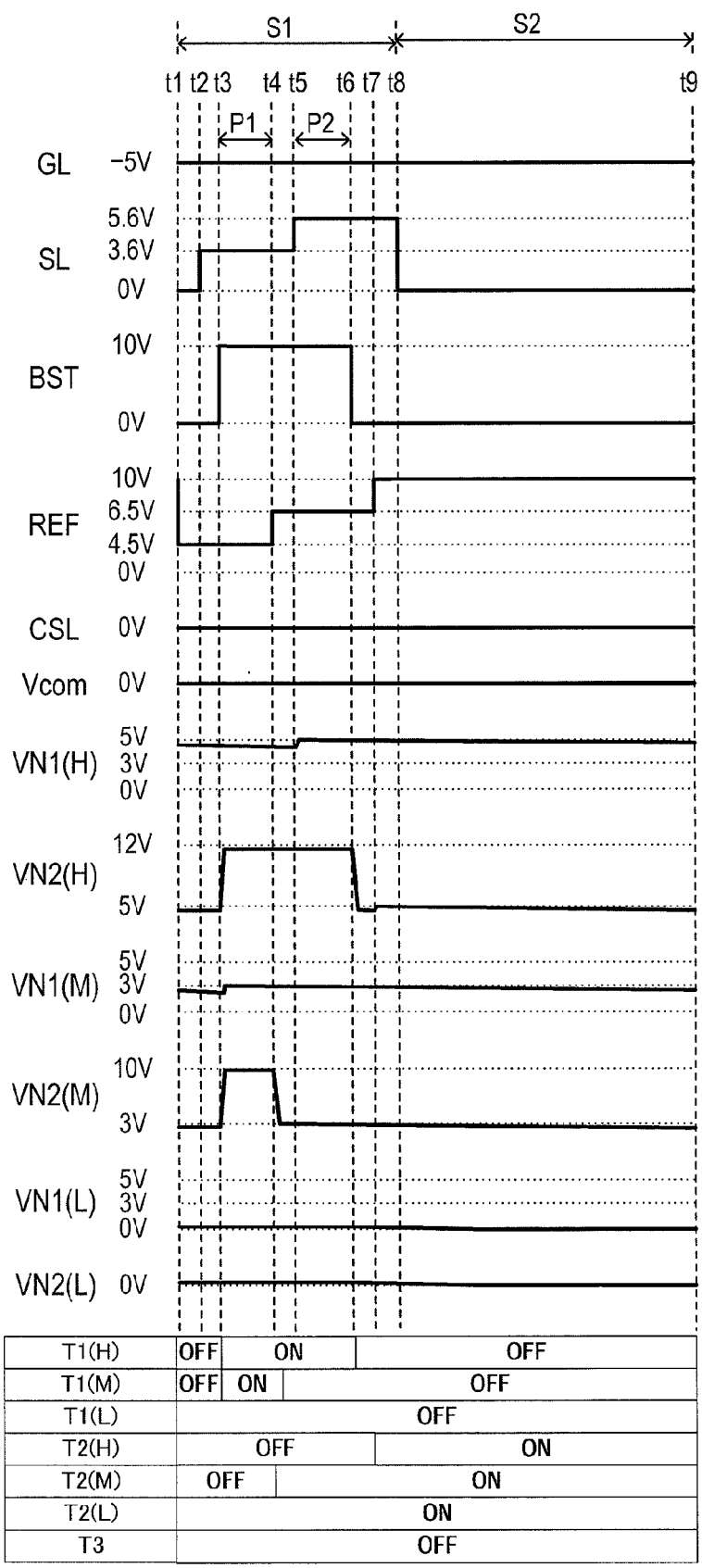
FIG. 23 is a timing chart of a self refreshing action according to a third embodiment in the first type pixel circuit.

As described above, according to the self refreshing action in this embodiment shown in FIG. 23, the number of times to fluctuate the voltage to the boost line BST can be suppressed, compared to the second embodiment shown in FIG. 18, and the power consumption can be further cut. In addition, the above description is also applied to the variation pixel circuit shown in FIG. 8 other than the pixel circuit 2A shown in FIG. 7, as a matter of course.

In addition, the order of refreshing action of the case H and the case M can be exchanged in the second embodiment, but in this embodiment in which the number of times to fluctuate the voltage to the boost line BST is one, the refreshing action needs to be performed for the case H after the refreshing action for the case M, so that the order cannot be reversed. This is because when 10 V is applied to the boost line BST to execute the refreshing action for the case H first, the potential of the node N2 of the case M does not thrust upward, so that it is necessary to generate the voltage fluctuation in the boost line BST again to execute the refreshing action for the case M.

In addition, in this embodiment, 10 V (that can turn on the transistor T2 regardless of the cases H, M, and L) is applied to the reference line REF just before the time t1, and in the stand-by step S2, but like the second embodiment, 0 V may be applied to the reference line REF to turn off the transistor T2. However, it is to be noted that the fluctuation of the voltage applied to the reference line REF can be suppressed when the voltage application in this embodiment is performed.

<Second Type>

Figure 24:
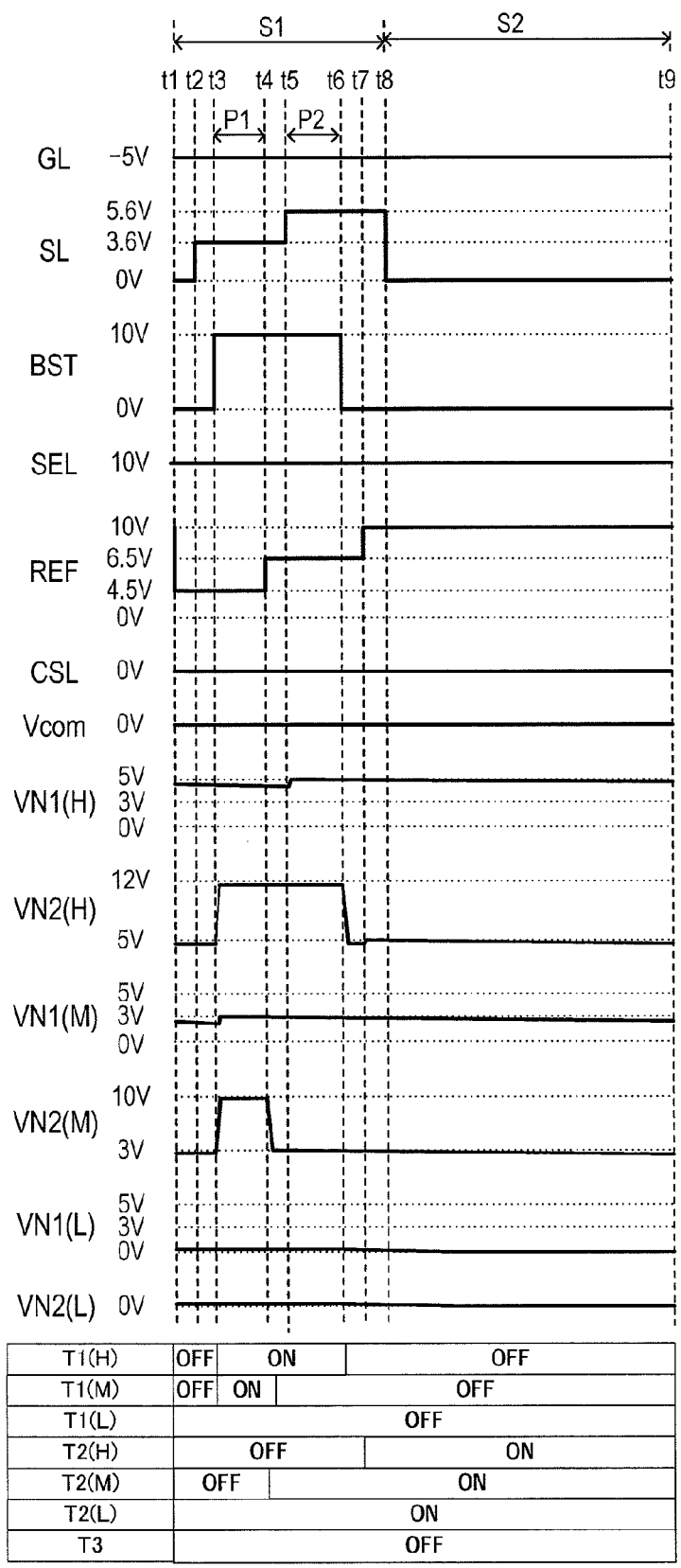
FIG. 24 is a timing chart of a self refreshing action according to the third embodiment in the second type pixel circuit.

In the second type pixel circuit 2B shown in FIG. 9, the transistor T4 is provided and the selection line SEL to control the on/off of the transistor T4 is provided separately from the boost line BST. Therefore, the totally the same voltage state as the first type can be implemented by applying the voltage that surely turns on the transistor T4 to the selection line SE, during the refreshing step S1. FIG. 24 shows a timing chart in this case. In addition, here, the voltage applied to the selection line SEL is 10 V.

Figure 25:
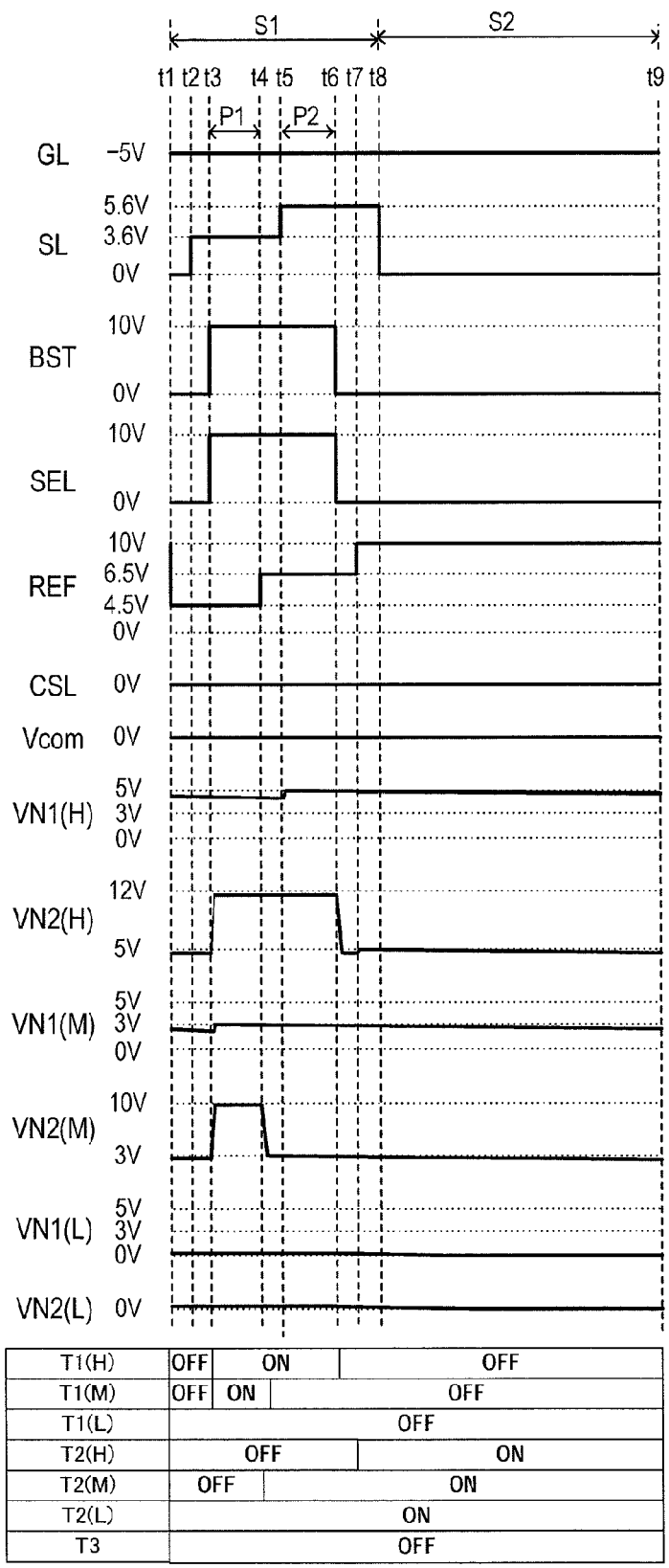
FIG. 25 is another timing chart of a self refreshing action according to the third embodiment in the second type pixel circuit.

In addition, the pulse-shaped voltage may be applied to the selection line SEL at the same timing as that when the boost voltage is applied to the boost line BST. FIG. 25 shows a timing chart in this case.

The above description can be applied to the pixel circuits 2B shown in FIGS. 10 and 11, and the pixel circuits 2C shown in FIGS. 12 to 15, as well as the pixel circuit 2B shown in FIG. 9, as a matter of course. Detailed description is omitted.

<Third Type>

According to the pixel circuits 2D and 2E belonging to the third type, compared to the pixel circuit belonging to the second type, the control terminal of the transistor T4 is connected to the boost line BST, and the selection line SEL is not provided. Therefore, unlike the second type pixel circuit, the boost line BST controls the on/off of the transistor T4.

However, as shown in FIG. 25, when the pulse voltage is applied to the selection line SEL at the same timing as the boost line BST, in the second type, totally the same voltage states as that of the first type pixel circuit can be implemented. Thus, this means that totally the same voltage state can be implemented when the control terminal of the transistor T4 is connected to the boost line BST.

Therefore, the self refreshing action can be executed for the pixel circuit 2D shown in FIG. 16 by providing the same voltage state as that in FIG. 25. Thus, this is applied to the pixel circuit 2E shown in FIG. 17. Detailed description is omitted.

[Fourth Embodiment]

In a fourth embodiment, a description will be given of the writing action in the constant display mode with reference to the drawings.

According to the writing action in the constant display mode, pixel data for one frame is divided with respect to each display line in the horizontal direction (row direction), and a voltage corresponding to each pixel data for the one display line is applied to the source line SL in each column. Here, similar to the second embodiment, three gradations are assumed as the pixel data. That is, a high level voltage (5 V), a middle level voltage (3 V), or a low level voltage (0 V) is applied to the source line SL. Thus, a selected row voltage 8 V is applied to the gate line GL of the selected display line (selected row) to turn on the first switch circuits 22 of all the pixel circuits belonging to the selected row, and the voltage of the source line SL in each column is transferred to the internal node N1 of each pixel circuit 2 in the selected row.

In addition, an unselected row voltage −5 V is applied to the gate line GL (unselected row) except for the selected display line to turn off the first switch circuits 22 of all the pixel circuits 2 in the selected row. In addition, the timing control of the voltage applied to each signal line in the writing action as will be described below is performed by the display control circuit 11, and individual voltage application is performed by the display control circuit 11, the opposite electrode drive circuit 12, the source driver 13, and the gate driver 14.

<First Type>

First, a description will be given of the pixel circuit belonging to the first type, in which the second switch circuit 23 is the series circuit composed of the transistor T1 and the diode D1 only.

Figure 26:
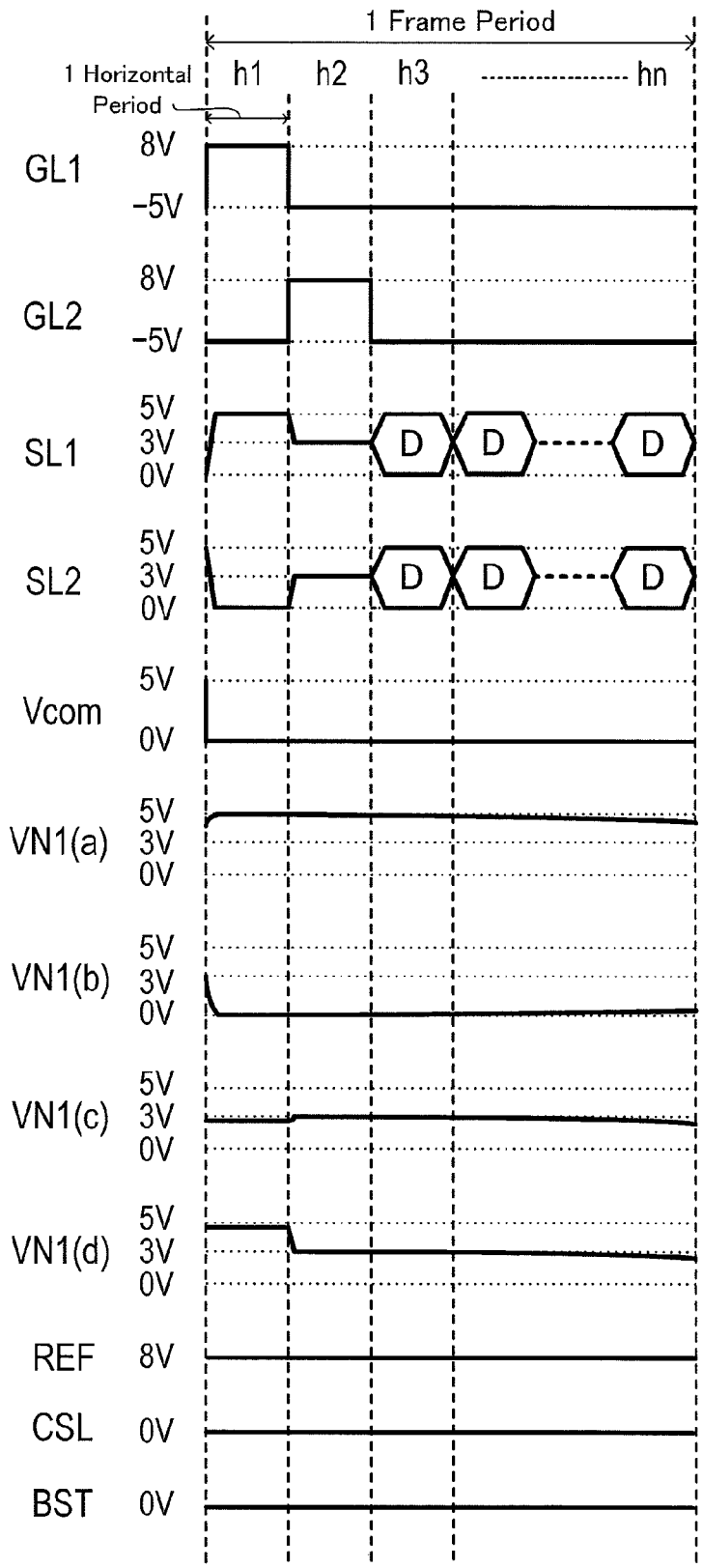
FIG. 26 is a timing chart of a writing action in a constant display mode in the first type pixel circuit.

FIG. 26 shows a timing chart of the writing action using the first type pixel circuit 2A (FIG. 7). FIG. 26 illustrates a voltage waveform of each of the two gate lines GL1 and GL2, the two source lines SL1 and SL2, the reference line REF, the auxiliary capacity line CSL, and the boost line BST for the one frame period, and a voltage waveform of the opposite voltage Vcom.

In addition, FIG. 26 also illustrates the potentials VN1 of the internal nodes N1 of the four pixel circuits 2A. These four pixel circuits 2A are the pixel circuit 2A (a) selected by the gate line GL1 and the source line SL1, the pixel circuit 2A (b) selected by the gate line GL1 and the source line SL2, the pixel circuit 2A (c) selected by the gate line GL2 and the source line SL1, and the pixel circuit 2A (d) selected by the gate line GL2 and the source line SL2. In the drawing, (a) to (d) are added behind the internal node potentials VN1 to be discriminated.

The one frame period is divided into the horizontal periods whose number corresponds to the number of the gate lines GL, and the gate lines GL1 to GLn to be selected in the horizontal periods are sequentially allocated to them. FIG. 26 illustrates voltage changes of the two gate lines GL1 and GL2 in the first two horizontal periods. In the one horizontal period, the selected row voltage 8 V is applied to the gate line GL1, and unselected row voltage −5 V is applied to the gate line GL2, and in the second horizontal period, the selected row voltage 8 V is applied to the gate line GL2, and the unselected row voltage −5 V is applied to the gate line GL1. In the following horizontal period, the unselected row voltage −5 V is applied to both gate lines GL1 and GL2.

The voltages (5 V, 3 V, and 0 V) which correspond to the pixel data of the display line corresponding to each horizontal period are applied to the source line in each column. FIG. 26 illustrates the two source lines SL1 and SL2 as a representative of the source line SL. In addition, FIG. 26 shows the voltages 5 V, 3 V, and 0 V of the two source lines SL1 and SL2 for the first two horizontal periods. After those periods, the three-valued voltage corresponding to the pixel data is applied thereto. In FIG. 26, "D" is illustrated to show that this is a voltage value depending on the data.

FIG. 26 shows a case, as one example, where the high level voltage is written in the pixel circuit 2A (a), and the low level voltage is written in the pixel circuit 2A (b) in the first horizontal period h1, and the middle level voltage is written in the pixel circuits 2A (c) and 2A (d) in the second horizontal period h2.

It is assumed that, as one example, the pixel circuits 2A (a) to 2A(d) at the point just before the writing action are written such that the 2A (a) is roughly to 0 V (low voltage state), 2A (b) and 2A (c) are roughly to 3 V (middle voltage state), and 2A (d) is roughly to 5 V (high voltage state). In addition, the term "roughly" is used in view of the potential change over time due to the leak current as described in the second embodiment.

That is, it is assumed that by the writing action of this embodiment, the pixel circuit 2A (a) is written from 0 V to 5 V, 2A (b) is written from 3 V to 0 V, 2A (c) is continuously written to 3 V, and 2A (d) is written from 5 V to 3 V.

During the writing action (one frame period), a voltage to constantly keep the transistor T2 in on state, regardless of the voltage state of the internal node N1, is applied to the reference line REF. Here, the voltage is 8V. This voltage is to be a value greater than a value provided by adding the threshold voltage (2 V) of the transistor T2 to the potential VN1 (5 V) of the internal node N1 written in the high voltage state. Thus, the output node N2 and the internal node N1 are electrically connected, and the auxiliary capacitive element Cs connected to the internal node N1 can be used to stabilize the internal node potential VN1.

In addition, during the writing period, the boost thrusting action is not performed, so that the low level voltage (here, 0 V) is applied to the boost line BST. The auxiliary capacity line CSL is fixed to a predetermined fixed voltage (such as 0V). As the opposite voltage Vcom is subjected to the opposite AC driving as described above, it is fixed to the high level voltage (5 V) or the low level voltage (0 V) during the one frame period. In FIG. 26, the opposite voltage Vcom is fixed to 0 V.

In the first horizontal period h1, the selected row voltage is applied to the gate line GL1, and the voltage corresponding to the pixel data is applied to the source line SL. In addition, 5 V is applied to the source line SL1 and 0 V is applied to the source line SL2 to write 5 V in the pixel circuit 2A (a) and 0 V in the pixel circuit 2A (b), respectively among the pixel circuits in which the control terminals of the transistors T3 are connected to the gate line GL 1. Similarly, the voltage according to the pixel data is applied to the other source line.

In the first horizontal period h1, the transistor T3 is turned on in each of the pixel circuits 2A (a) and 2A (b), so that the voltage applied to the source line SL is written to the internal node N1 through the transistor T3.

Meanwhile, in the first horizontal period h1, the transistor T3 is off in the pixel circuit whose control terminal of the transistor T3 is connected to the gate line GL except for the gate line GL1, so that the voltage applied to the source line SL is not applied to the internal node N1 through the first switch circuit 22.

Here, the pixel circuit 2A (c) selected by the gate line GL2 and the source line SL1 is to be focused on. As for the pixel circuit 2A (c), the control terminal of the transistor T3 is connected to the gate line GL2, so that the transistor T3 is off as described above, and the voltage (5 V) applied to the source line SL1 is not written in the internal node N1 through the first switch circuit 22.

Thus, the potential VN1 (c) of the internal node N1 shows roughly 3 V just before the writing, and the internal node N1 and the output node N2 show the same potential, so that the gate potential of the transistor T1 shows roughly 3 V. Since 5 V is applied to the source line SL1, the transistor T1 is turned off. Therefore, the voltage applied to the source line SL1 is not written in the internal node N1 through the second switch circuit 23.

Thus, the VN1 (c) still remains the potential at the point just before the writing action, in the first horizontal period h1.

Next, the pixel circuit 2A (d) selected by the gate line GL2 and the source line SL2 is to be focused on. As for the pixel circuit 2A (d) also, the control terminal of the transistor T3 is connected to the gate line GL2, similar to the pixel circuit 2A (c), so that the transistor T3 is off. Therefore, the voltage (0 V) applied to the source line SL2 is not applied to the internal node N1 through the first switch circuit 22.

Thus, the potential VN1 (d) of the internal node N1 shows roughly 5 V just before the writing. Since 0 V is applied to the source line SL2, a reversely-biased voltage is applied to the diode D1. Therefore, the voltage (0 V) applied to the source line SL2 is not applied to the internal node N1 through the second switch circuit 23.

Thus, the VN1 (d) also still remains the potential at the point just before the writing action, in the first horizontal period h1.

Meanwhile, in the second horizontal period h2, in order to write 3 V in the pixel circuit 2A (c) and 2A (d), the selected row voltage is applied to the gate line GL2, the unselected row voltage is applied to the other gate line GL, 3 V is applied to the source line SL1 and the SL2, and the voltage corresponding to the pixel data of the pixel circuit selected by the gate line GL2 is applied to the other source line SL. As for the pixel circuits 2A (c) and 2A (d), the voltage applied to the source line SL is applied to the internal node N1 through the first switch circuit 22. Thus, as for the pixel circuits 2A (a) and 2A (b), the first switch circuit 22 is off, and the diode D1 is in the reversely-biased state, or the transistor T1 is turned off in the second switch circuit 23, so that the voltage applied to the source line SL is not applied to the internal node N1.

Through the above voltage application, for only the selected pixel circuit, the voltage according to the pixel data is applied from the source line SL to the internal node N1 through the first switch circuit 22.

In addition, the description has been given assuming that the pixel circuit is the pixel circuit 2A shown in FIG. 7 in the above embodiment, the same writing action can be implemented in the pixel circuit 2A shown in FIG. 8, as a matter of course.

<Second Type>

Next, a description will be given of the pixel circuit belonging to the second type in which the second switch circuit 23 is the series circuit composed of the transistor T1, the diode D1, and the transistor T4, and the control terminal of the transistor T4 is connected to the selection line SEL.

The second type assumes the pixel circuits 2B (FIGS. 9 to 11) in which the first switch circuit 22 is only composed of the transistor T3, and the pixel circuits 2C (FIGS. 12 to 15) in which the first switch circuit 22 is the series circuit composed of the transistors T3 and T4 (or T5), as described above.

Figure 27:
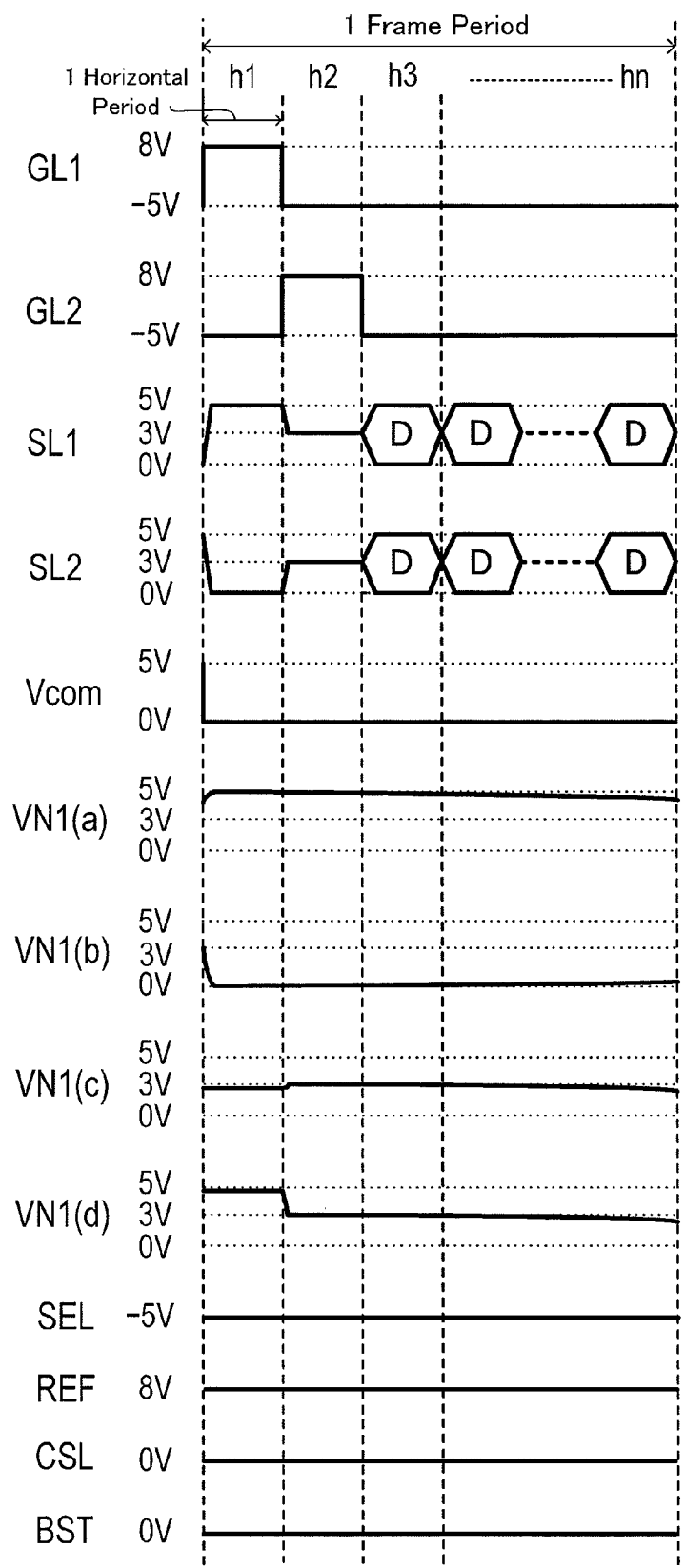
FIG. 27 is a timing chart of a writing action in the constant display mode in the second type pixel circuit.

As described in the first type, at the time of writing action, the second switch circuit 23 is turned off, and the voltage is applied from the source line SL to the internal node N1 through the first switch circuit 22. As for the pixel circuit 2B, the second switch circuit 23 can be surely off at the time of writing action, by constantly keeping the transistor T4 in the off state. In addition, as for the rest, the writing action can be implemented by the same method as that of the first type. FIG. 27 shows a timing chart of the writing action using the second type pixel circuit 2B (FIG. 9). In addition, in FIG. 27, in order to keep the transistor T4 in the off state during the writing action, −5 V is applied to the selection line SEL.

Meanwhile, as shown in FIGS. 12 to 15, in the case where the first switch circuit 22 is the series circuit composed of the transistors T3 and T4 (or T5), in order to turn on the first switch circuit 22, the transistor T4 (or T5) has to be turned on in addition to the transistor T3, at the time of writing action. In addition, as for the pixel circuit 2C shown in FIG. 15, the first switch circuit 22 is provided with the transistor T5, and the transistor T5 and the transistor T4 are connected through their control terminals, so that the conduction control of the first switch circuit 22 can be performed by controlling the conduction of the transistor T4, similar to the other pixel circuit 2C.

To summarize the above, as for the pixel circuit 2C, all the selection lines SEL are not collectively controlled like the pixel circuit 2B, but they need to be controlled individually with respect to each row like the gate line GL. That is, the selection lines SEL are provided in respective rows as many as the gate lines GL1 to GLn, and sequentially selected similar to the gate lines GL1 to GLn.

Figure 28:
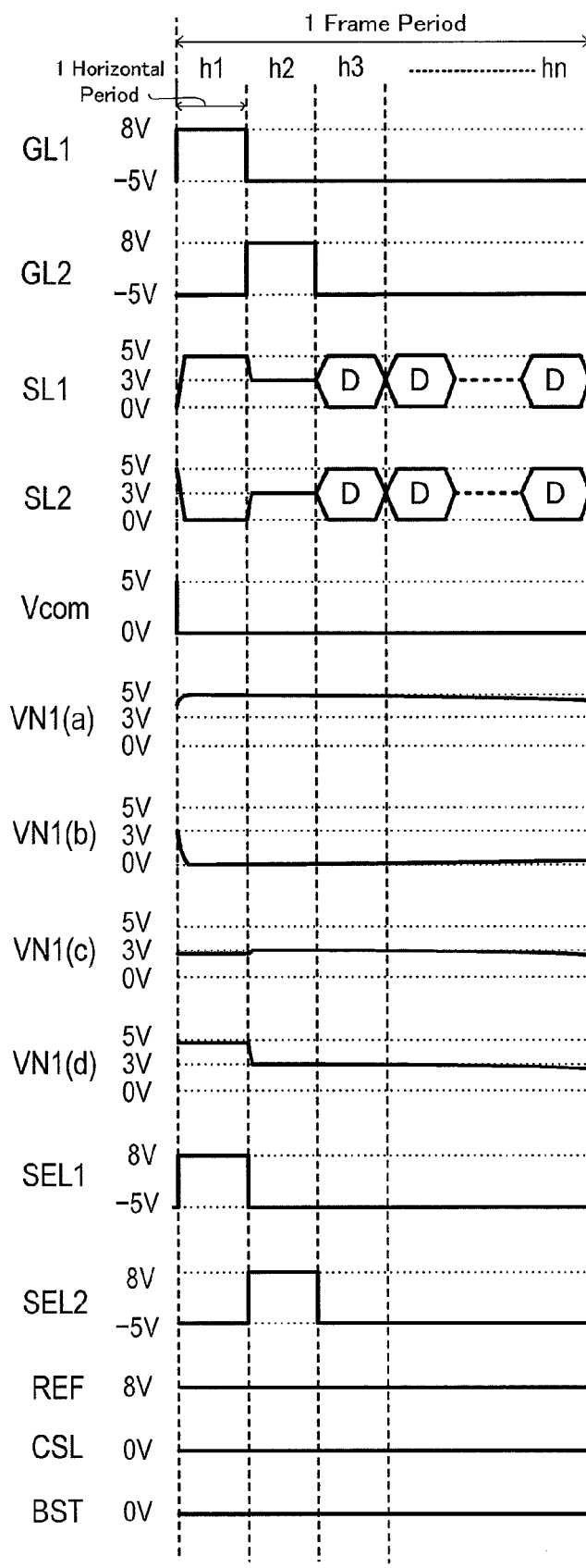
FIG. 28 is a timing chart of a writing action in the constant display mode in the second type pixel circuit.

FIG. 28 shows a timing chart of the writing action using the second type pixel circuit 2C (FIG. 12). FIG. 28 illustrates voltage changes of the two selection lines SEL1 and SEL2 in the first two horizontal periods. In the first horizontal period, the selecting voltage 8 V is applied to the selection line SEL1, and non-selecting voltage −5 V is applied to the selection line SEL2, and in the second horizontal period, the selecting voltage 8 V is applied to the selection line SEL2, and the non-selecting voltage −5 V is applied to the selection line SELL. In the following horizontal period, the non-selecting voltage −5 V is applied to both selection lines SEL1 and SEL2. The rest is the same as the timing chart of the writing action of the first type pixel circuit 2A shown in FIG. 26. Thus, the same voltage state as the first type pixel circuit 2A shown in FIG. 26 can be implemented. Detailed description is omitted.

<Third Type>

Next, a description will be given of the pixel circuit belonging to the third type in which the second switch circuit 23 is the series circuit composed of the transistor T1, the diode D1, and the transistor T4, and the control terminal of the transistor T4 is connected to the boost line BST.

Figure 29:
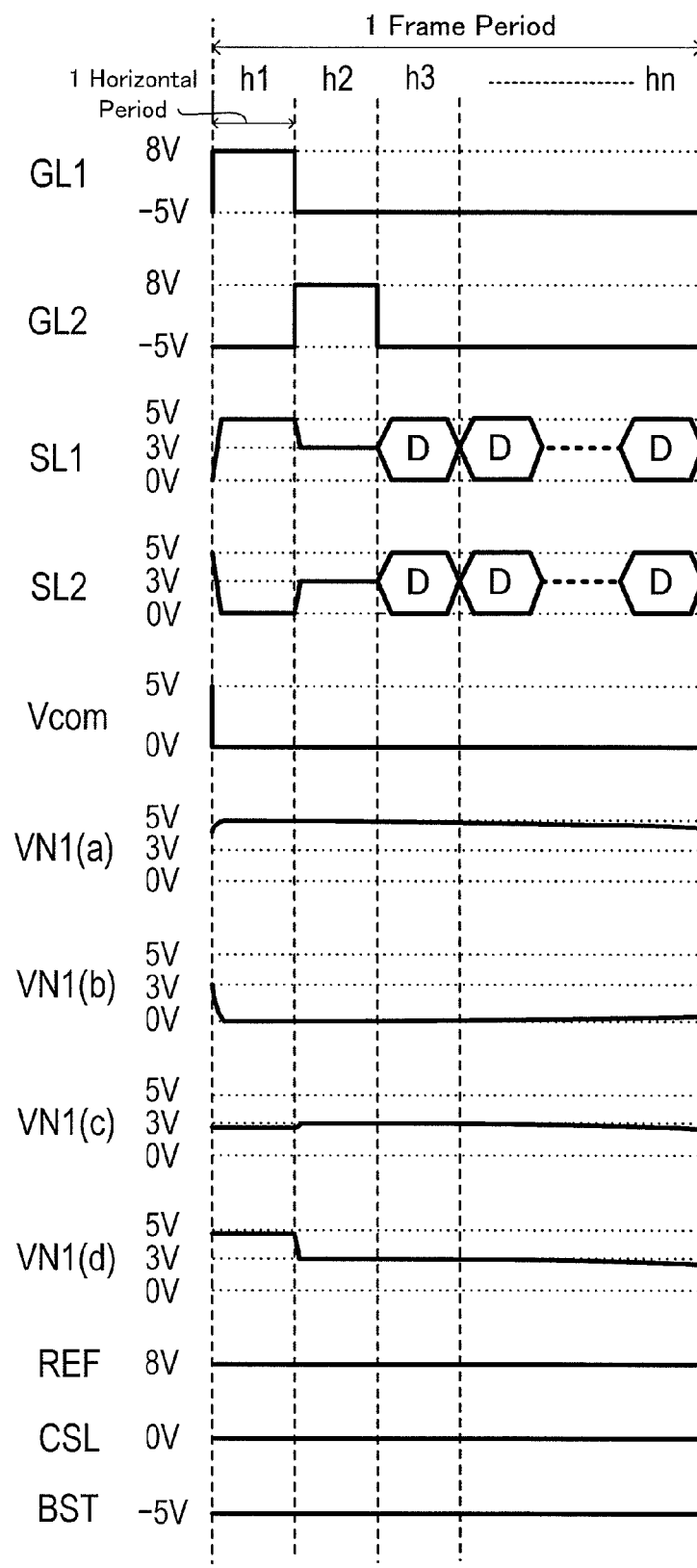
FIG. 29 is a timing chart of a writing action in the constant display mode in the third type pixel circuit.

The third type pixel circuit is different from the second type in that the selection line SEL is not provided, and the boost line BST is connected to the control terminal of the transistor T4. Therefore, the voltage may be applied to the boost line BST by the same method as that used for applying the voltage to the selection line SEL in the second type. FIG. 29 shows a timing chart of the writing action using the third type pixel circuit 2D (FIG. 16).

In addition, at this time, 8 V is applied to the reference line REF, and the transistor T2 is constantly on, so that even when the voltage applied to the boost line BST rises, the potential VN2 of the output node N2 hardly rises, and the transistor T1 is not turned on.

[Fifth Embodiment]

In a fifth embodiment, a description will be given of a relationship between the self refreshing action and the writing action in the constant display mode.

In the constant display mode, after the writing action has been executed for the image data for the one frame, the writing action is not performed for a certain period and the display contents provided by the last writing action are maintained.

By the writing action, a voltage is applied to the internal node N1 (pixel electrode 20) in the pixel through the source line SL. Then, the gate line GL becomes low level, and the transistor T3 is turned off. However, the potential VN1 of the internal node N1 is maintained due to the presence of the electric charges accumulated in the pixel electrode 20 by the last writing action. That is, the voltage Vlc is maintained between the pixel electrode 20 and the opposite electrode 80. Thus, after the completion of the writing action, the voltage required to display the image data is kept applied to between both ends of the liquid crystal capacity Clc.

In the case where the potential of the opposite electrode 80 is fixed, the liquid crystal voltage Vlc depends on the potential of the pixel electrode 20. This potential fluctuates with time due to the generation of the leak current of the transistor in the pixel circuit 2. For example, in the case where the potential of the source line SL is lower than the potential of the internal node N1, the leak current generates from the internal node N1 to the source line SL, and the potential VN1 of the internal node N1 gradually decreases with time. On the other hand, in the case where the potential of the source line SL is higher than the potential of the internal node N1 (especially, in the case where the low voltage state is written), the leak current is generated from the source line SL toward the internal node N1, and the VN1 increases with time. That is, after the time has elapsed without externally executing the writing action, the liquid crystal voltage Vlc gradually changes, and as a result, a display image also changes.

In the normal display mode, the writing action is executed for all the pixel circuits 2 with respect to each frame even when the image is the still image. Therefore, the electric charge amount accumulated in the pixel electrode 20 needs to be held for only one frame period. Since the potential fluctuation amount of the pixel electrode 20 for the one frame period is very small, the potential fluctuation in this period does not affect the displayed image data to such a degree that it can be visually recognized. Therefore, in the normal display mode, the potential fluctuation of the pixel electrode 20 can be ignored.

Meanwhile, in the constant display mode, the writing action is not executed with respect to each frame. Therefore, while the potential of the opposite electrode 80 is fixed, it is necessary to hold the potential of the pixel electrode 20 over the several frames in some cases. However, when left over the several frames without executing the writing action, the potential of the pixel electrode 20 fluctuates intermittently due to the above-described generation of the leak current. As a result, the display image data could change to a degree that it can be visually realized.

Figure 30:
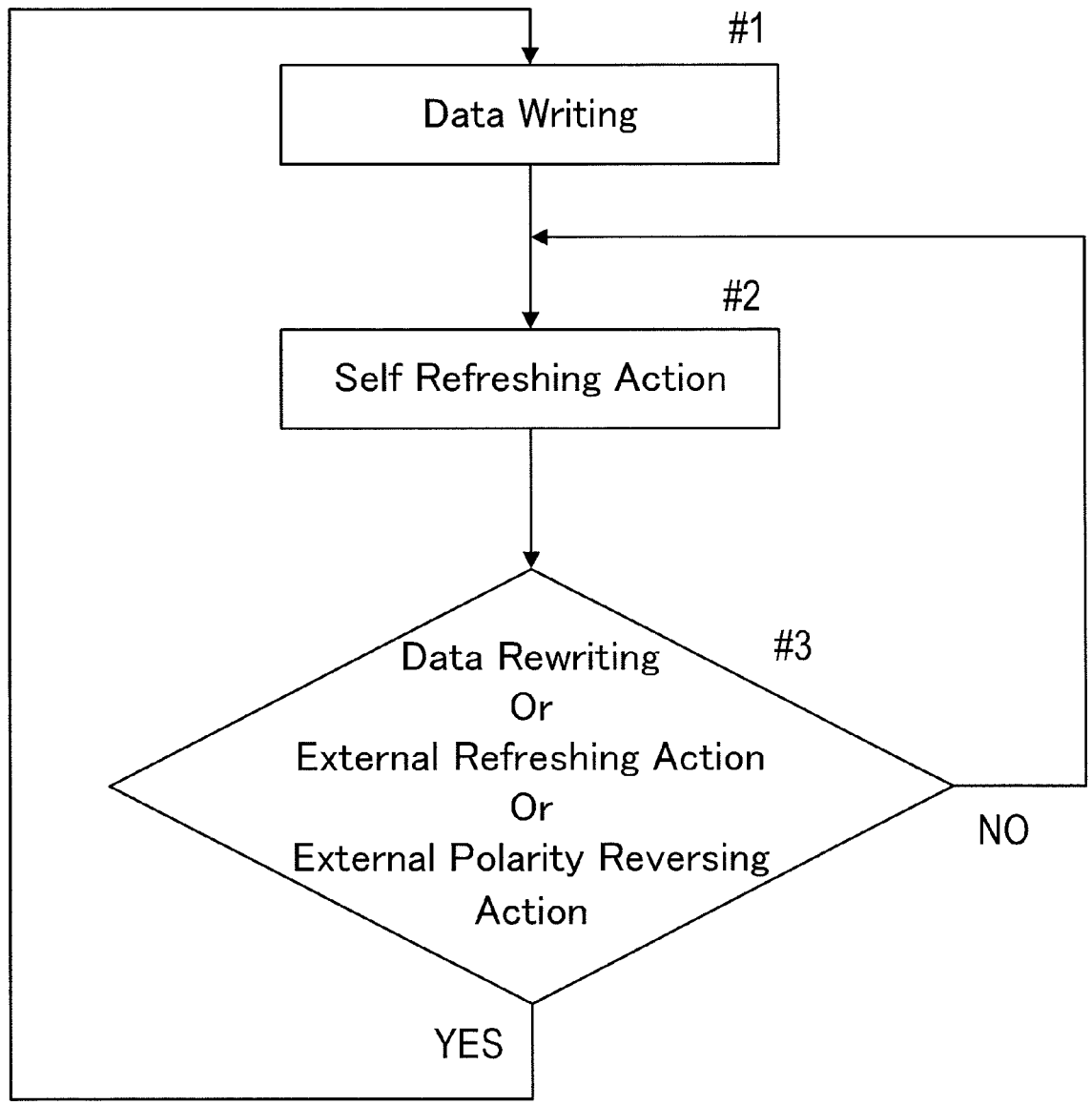
FIG. 30 is a flowchart showing a procedure of the writing action and the self refreshing action in the constant display mode.

In order to prevent this phenomenon from being generated, the self refreshing action and the writing action are combined and executed in a manner shown in a flowchart in FIG. 30, so that while the potential fluctuation of the pixel electrode is suppressed, power consumption is considerably cut.

First, the writing action of the pixel data for the one frame in the constant display mode is executed in the manner described in the fourth embodiment (step #1).

After the writing action in the step #1, the self refreshing action is executed in the manner described in the second embodiment (step #2). As described above, the self refreshing action is composed of the refreshing step S1 and the stand-by step S2.

Here, when a request for the writing action of new pixel data (data rewriting), the external refreshing action, or the external polarity reversing action is received during the stand-by step S2 (YES in a step #3), the process returns to the step #1, and the writing action of the new pixel data or the previous pixel data is executed. When the above request is not received during the stand-by step S2 (NO in step #3), the process returns to the step #2, and the self refreshing action is executed again. Thus, the display image is prevented from being changed due to the leak current.

When the refreshing action is performed by the writing action without performing the self refreshing action, the power consumption is as expressed by the relational expression shown in the above formula 1, but in a case where the self refreshing action is repeated at the same refreshing rate, and each pixel circuit holds three-valued pixel data, a variable number n in the formula is 2 because the number of times to drive all the source lines is 2 like the fourth embodiment, so that when VGA is assumed as display resolution (pixel number), the number is such that m=1920, and n=480, and as a result, power consumption can be expected to be cut to about one-240th.

The reason why the self refreshing action and the external refreshing action or the external polarity reversing action are combined in this embodiment is to deal with a case where even when the pixel circuit 2 normally operates at first, a defect is generated in the second switch circuit 23 or the control circuit 24 due to a change over time, and a state in which the writing action can be performed without any problem but the self refreshing action cannot be normally executed is generated in some pixel circuits 2. That is, when only depending on the self refreshing action, the display of the some pixel circuits 2 deteriorates, and it is fixed, but by combining with the external polarity reversing action, the display defect can be prevented from being fixed.

[Sixth Embodiment]

In a sixth embodiment, a description will be given of the writing action in the normal display mode, with reference to the drawing with respect to each type.

According to the writing action in the normal display mode, the pixel data for the one frame is divided with respect to each display line in the horizontal direction (row direction), a multi-gradation analog voltage corresponding to the pixel data for the one display line is applied to the source line SL of each row with respect to each horizontal period, and the selected row voltage 8 V is applied to the gate line GL of the selected display line (selected row) to turn on the first switch circuits 22 of all the pixel circuits 2 in the selected row and transfer the voltage of the source line SL of each row to the internal node N1 of each pixel circuit in the selected row. The unselected row voltage −5 V is applied to the gate line GL (unselected row) except for the selected display line to turn off the first switch circuits 22 of all the pixel circuits 2 in the unselected row.

In addition, unlike the constant display mode, according to the writing action in the normal display mode, the opposite voltage Vcom changes with respect to each horizontal period (opposite AC driving), so that the auxiliary capacity line CSL is driven so as to become the same voltage as the opposite voltage Vcom. This is because the pixel electrode 20 is capacitively coupled with the opposite electrode 80 through the liquid crystal layer, and also capacitively coupled with the auxiliary capacity line CSL through the auxiliary capacitive element Cs, so that when the voltage of the auxiliary capacitive element Cs is fixed, only the Vcom fluctuates in the formula 2, which induces fluctuation of the liquid crystal voltage Vlc of the pixel circuit 2 in the unselected row. Therefore, the voltages of the opposite electrode 80 and the pixel electrode 20 are changed in the same voltage direction by driving all the auxiliary capacity line CSL at the same voltage as the opposite voltage Vcom to offset the effect of the opposite AC driving.

Figure 31:
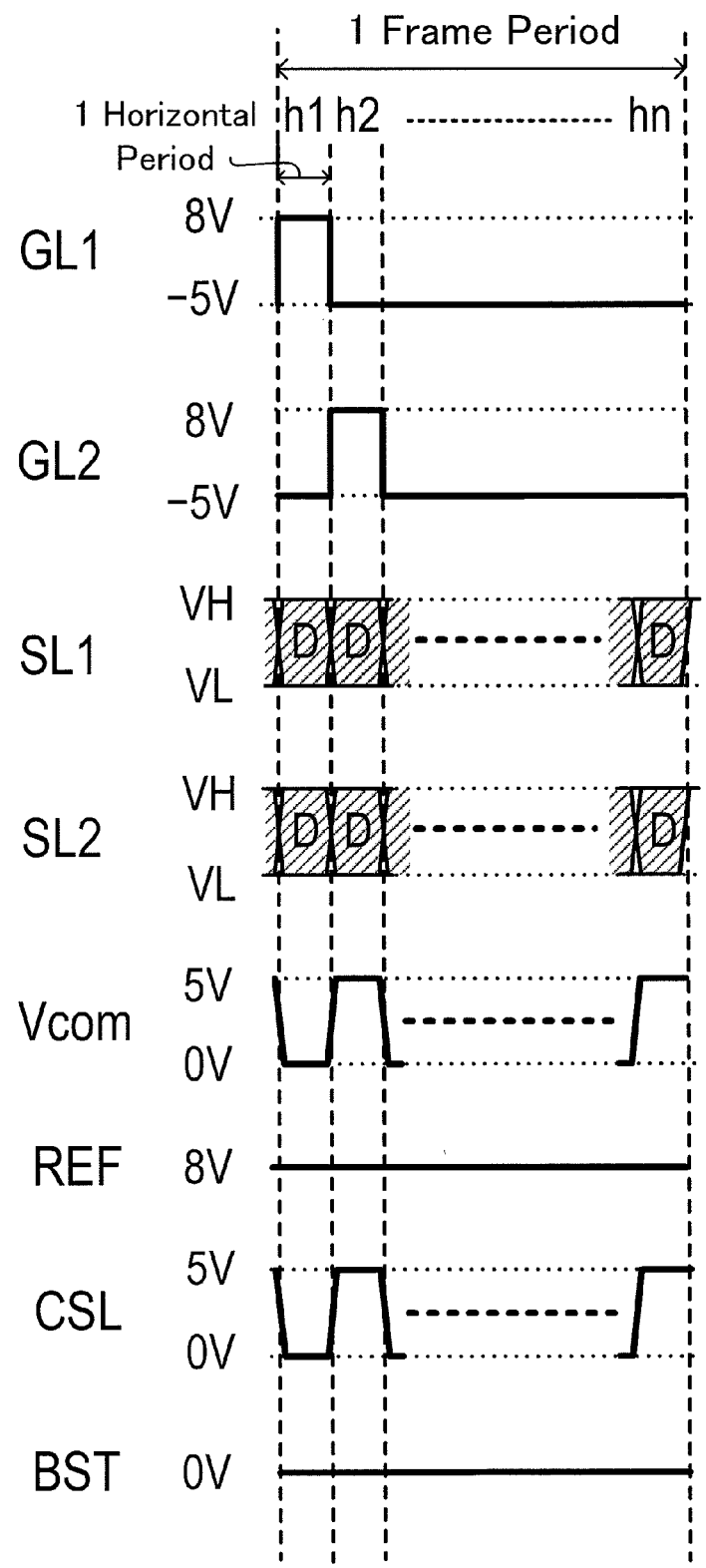
FIG. 31 is one example of a timing chart of a writing action in a normal display mode in the first type pixel circuit.

The writing action in the normal display mode is the same as that in the constant display mode in principle except that the opposite AC driving is performed, and the analog voltage of the multi-gradation more than that of the constant display mode is applied to the source line SL, so that detailed description is omitted. FIG. 31 shows a timing chart of the writing action in the normal display mode for the first type pixel circuit 2A (FIG. 7). In addition, in FIG. 31, the analog voltage of the multi-gradation corresponding to the pixel data of the analog display line is applied to the source line SL, so that the applied voltage cannot be unambiguously specified between a minimum value VL and a maximum value VH, and this is expressed by a shaded part.

Figure 32:
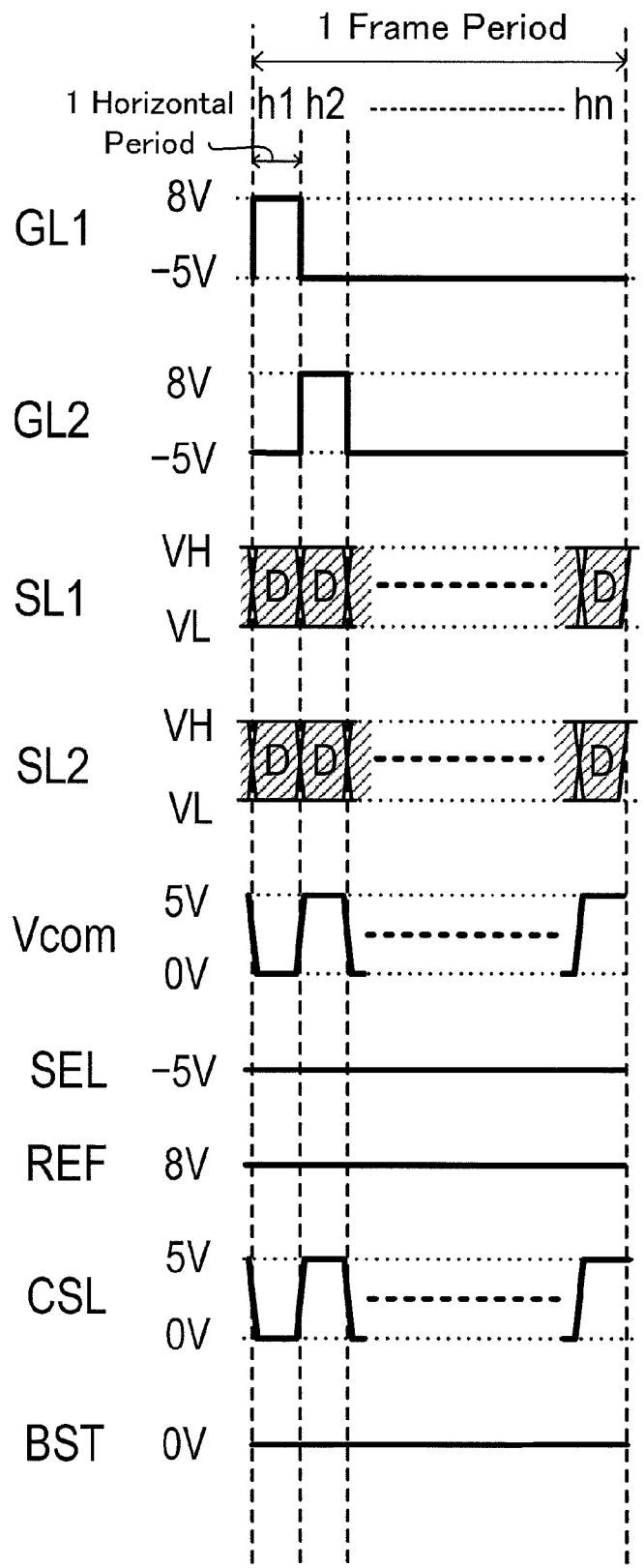
FIG. 32 is one example of a timing chart of a writing action in the normal display mode in the second type pixel circuit.

Similarly, FIG. 32 shows a timing chart of the writing action using the second type pixel circuit 2C (FIG. 12).

In this embodiment, a method to reverse the polarity of each display line with respect to each horizontal period in the writing action in the normal display mode is used because the following inconvenience generated when the polarity is reversed with respect to each frame is to be solved. In addition, a method to solve such inconvenience includes a method to reverse the polarity with respect to each column, and a method to reverse the polarity with respect to each pixel in the row and column directions at the same time.

A case is assumed such that a positive liquid crystal voltage Vlc is applied to all the pixels in a certain frame F1, and a negative liquid crystal voltage Vlc is applied to all the pixels in the next frame F2. Even when the voltage having the same absolute value is applied to the liquid crystal layer 75, a slight difference is generated in some cases in optical transmittance depending on whether it is positive or negative. In a case where high-quality still image is displayed, this slight difference could generate a fine change in a display manner between the frame F1 and the frame F2. In addition, in a case where a moving image is displayed also, a fine change could be generated in its display manner, in a display region to display the same contents between the frames. In displaying the high-quality still or moving image, even such fine change could be visually recognized.

Thus, since such high-quality still or moving image is displayed in the normal display mode, the above fine change could be visually recognized. In order to avoid this phenomenon, the polarity is reversed with respect to each display line in the same frame in this embodiment. Thus, since the liquid crystal voltages Vlc having different polarities are applied between the display lines in the same frame, the display image data is prevented from being affected by the polarity of the liquid crystal voltage Vlc.

[Seventh Embodiment]

A seventh embodiment relates to the self refreshing action and the writing action in the constant display mode, and a description will be given of a method of an action having a function to further prevent a flicker.

<<Writing Action>>

In the fourth embodiment, in the writing action in the constant display mode, the value of the opposite voltage Vcom is constant over the one frame period. For example, in FIG. 26, at the time to start the writing action, Vcom is shifted from 5 V (H level) to 0 V (low level), and this value of 0 V is maintained for the one frame, and the pixel data is written in the internal node N1 of the pixel circuit arranged in each row by switching the gate line GL to be activated. Thus, after the completion of the writing for the pixel circuit arranged in the last row, the opposite voltage Vcom is shifted from 0 V (L level) to 5 V (H level), and with the value of 5 V maintained for one frame period, the writing action is performed again.

That is, the value of the Vcom is constantly maintained for the one frame period, and after the completion of the writing to the last line, the value of the Vcom is switched between H and L, and the switched value of Vcom is maintained for the one frame period.

However, according to the above writing method, a flicker is viewed in some cases. This reason will be described below.

Figure 33C:
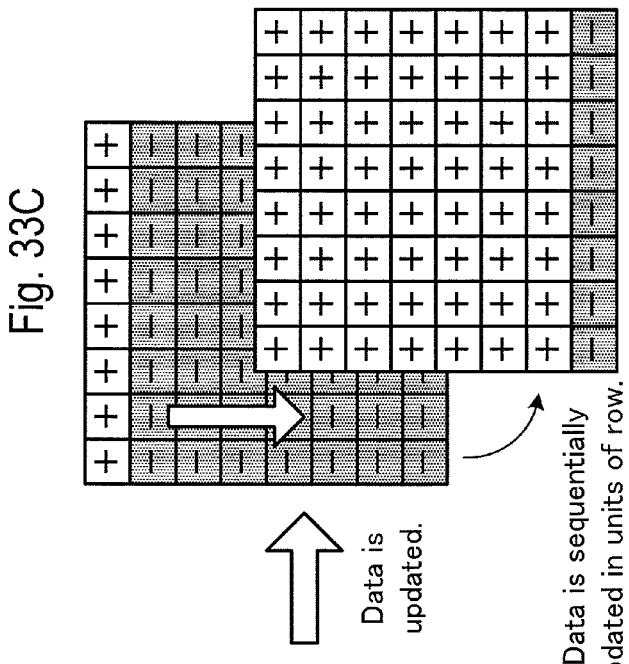
FIG. 33 is a conceptual diagram to describe a problem assumed in the writing action in the constant display mode.
Figure 33B:
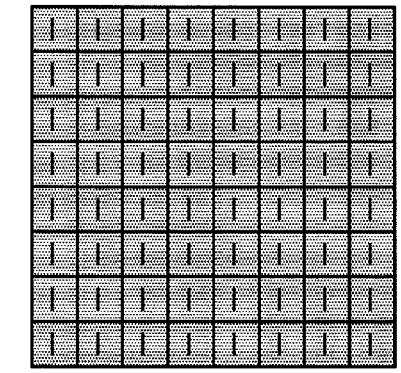
Figure 33A:
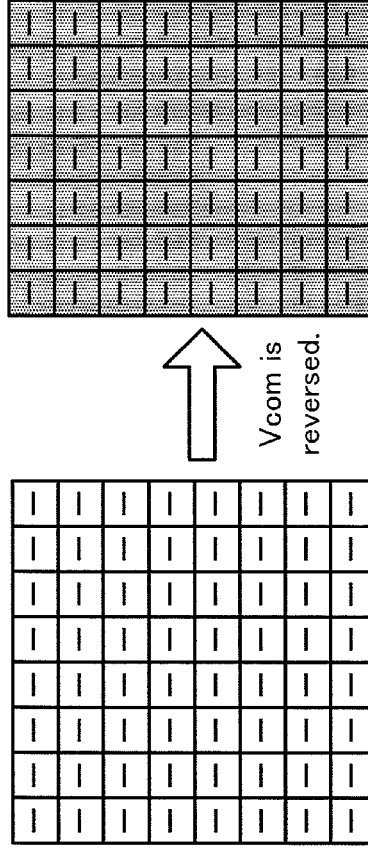

FIG. 33 is a conceptual diagram showing the case where the writing action is performed by the method described in the fourth embodiment. In FIG. 33A, a case is assumed such that the potential VN1 of the nodes N1 in all the pixel circuits is negative with respect to the opposite voltage Vcom. That is, it is assumed that the value of the Vcom is the H level value (5 V in the example of FIG. 26).

Before the start of the writing action, the value of the Vcom is reversed (FIG. 33B). Here, since the value is the high level value just before, it is shifted to the low level value (0 V).

Here, referring to the pixel circuit 2A in FIG. 7, when the value of Vcom drops from 5 V to 0 V, the potential of the opposite electrode 80 drops from 5 V to 0 V. Thus, accordingly, the potential of the pixel electrode 20 is thrust downward. The potential fluctuation amount of the pixel electrode 20 is determined by the ratio of the liquid crystal capacity Clc and the total parasitic capacity of the node N1, but it does not become completely the same as the potential fluctuation amount of the opposite electrode 80, and smaller than that value.

Therefore, the voltage between both ends of the liquid crystal capacitive element Clc is lower at the point of FIG. 33B than that at the point of FIG. 33A. As a result, the brightness of the display device decreases as a whole at the point of FIG. 33B.

Then, the writing action is sequentially performed for the pixel circuits from the first row. When the writing action is performed, a voltage corresponding to the pixel data is induced between both ends of the liquid crystal capacitive element Clc, and brightness corresponding to the pixel data is displayed.

However, in this configuration, as for the pixel circuit positioned in the last row, it takes a time (such as 16.7 ms) corresponding to the one frame from when the brightness drops once at the point of FIG. 33B until when it returns to a correct brightness. As the period in which the brightness is low becomes longer, the flicker becomes viewable.

In order to solve the above problem, according to this embodiment, the polarity of the writing voltage is changed between an even-numbered row and an odd-numbered row, and the Vcom is reversed with respect to each horizontal period at the time of writing.

Figure 34:
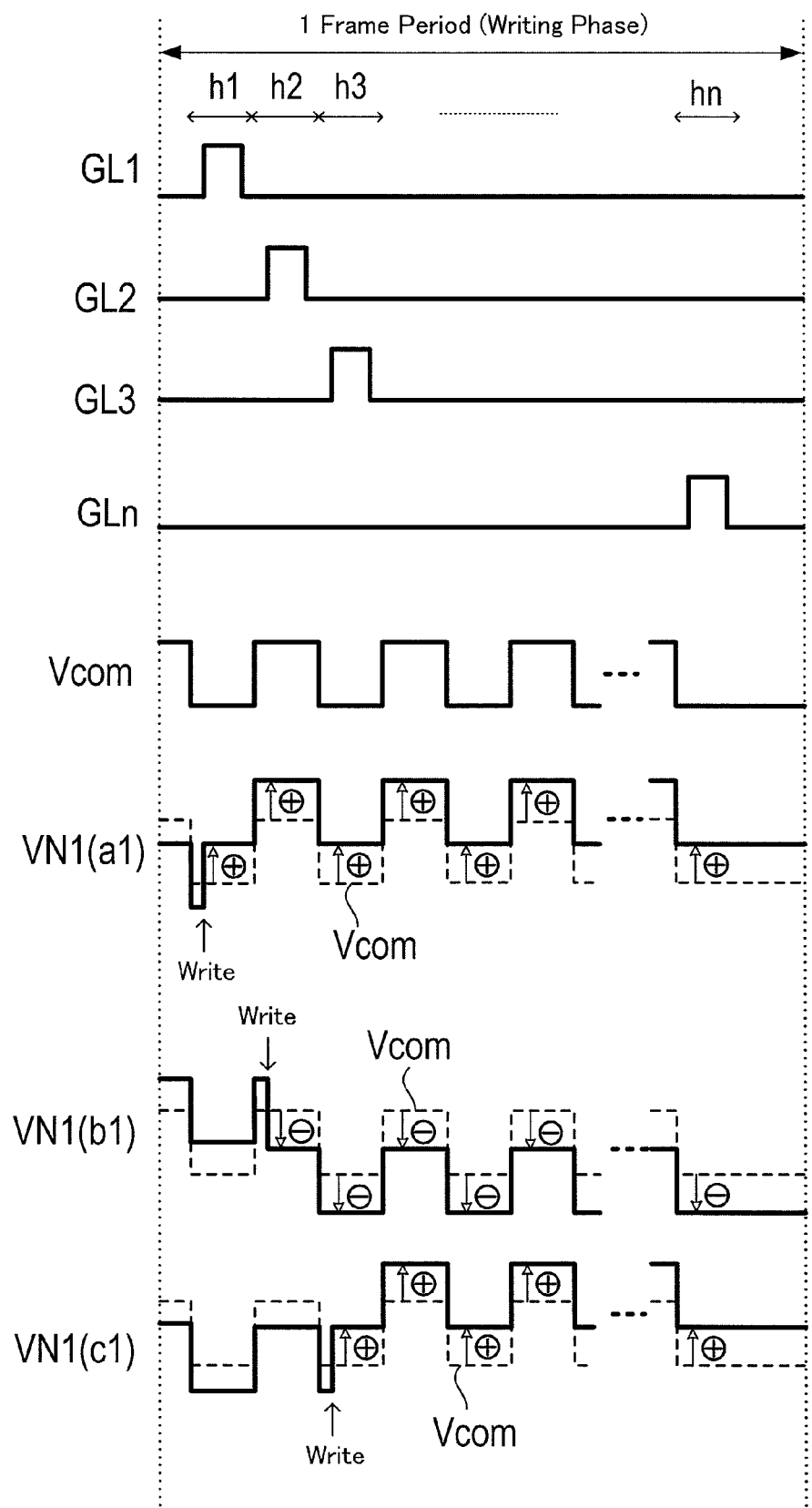
FIG. 34 is one example of a timing chart of a writing action in the constant display mode in a seventh embodiment.
Figure 35:
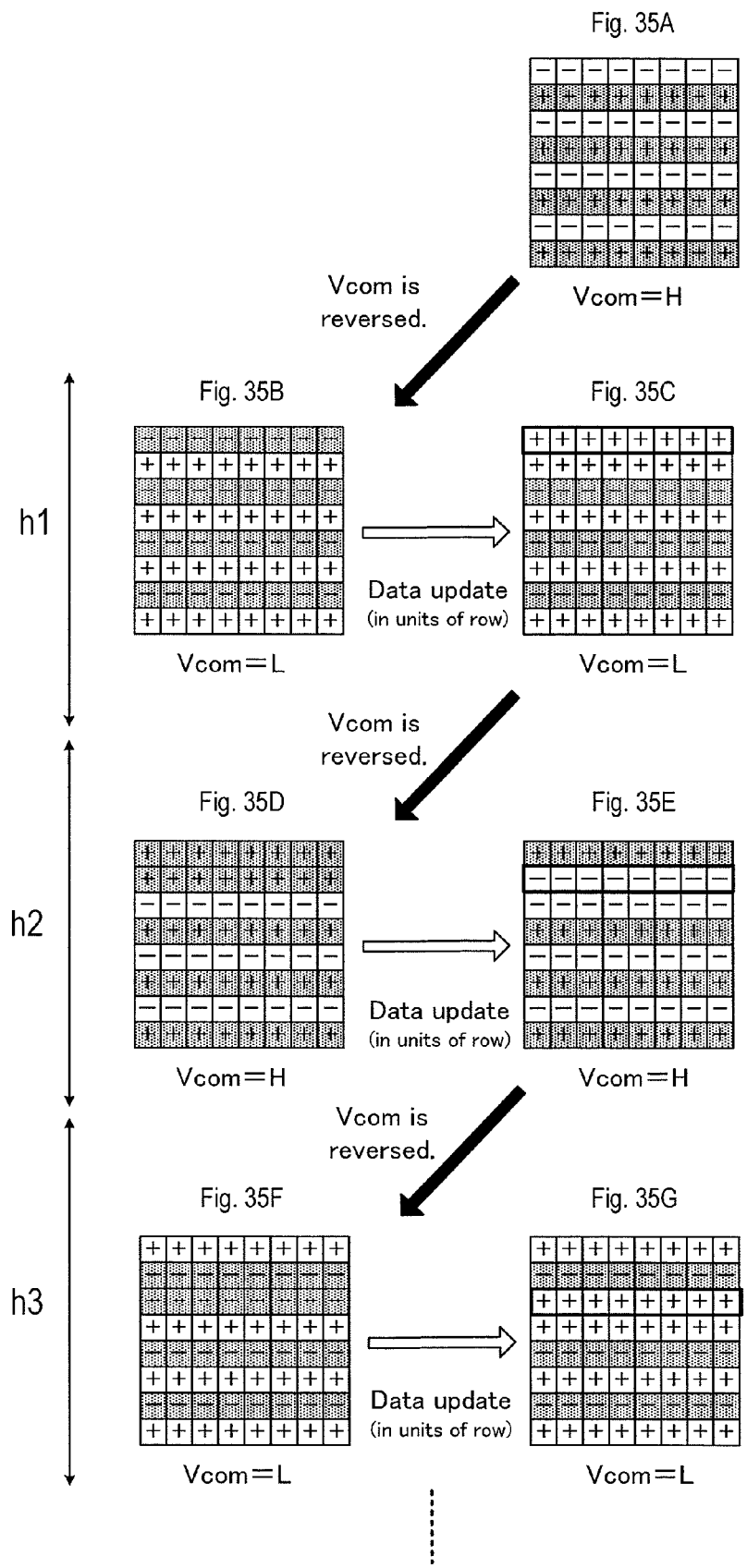
FIG. 35 is a conceptual diagram showing a change in polarity when the writing action in the seventh embodiment is performed.

FIG. 34 is a timing chart of the writing action in this embodiment. In addition, FIG. 35 is a conceptual diagram showing a change in polarity of each pixel when the writing action in this embodiment is performed.

FIG. 34 selectively shows the part characteristic to this embodiment. In addition, the changes of the potentials of the nodes N1 of pixels a1, b1, and c1 are shown as VN1($a1$), VN1($b1$), and VN1($c1$), respectively. The pixels a1, b1, and c1 are selected by the gate lines GL1, GL2, and GL3, respectively. In addition, the value of the Vcom is shown together with the potential of the node N1 of each pixel.

In addition, in FIG. 34 and FIG. 35, a description will be given assuming that the Vcom before the writing action is positive, but the same description can be applied to a case where it is negative.

FIG. 35A shows the voltage polarity of each pixel before the writing action. In FIG. 35A, the pixel shown by "−" is written such that the node N1 becomes negative based on the opposite voltage Vcom, and the pixel shown by "+" is written such that the node N1 becomes positive based on the opposite voltage Vcom. In FIG. 35A, "−" and "+" are alternately shown with respect to each row, and this means that the polarity of the node N1 is written so as to be alternately reversed between the odd-numbered row and the even-numbered row.

In addition, in FIG. 35A, the pixel in the even-numbered row is hatched to show that the pixel in the even-numbered row is low in brightness. This shows the contents assumed such that the writing is performed for the even-numbered row when the opposite voltage Vcom is at "L", and the writing is performed for the odd-numbered row when the opposite voltage Vcom is at "H", at the point before the state of FIG. 35A.

As described above, when the opposite voltage Vcom is shifted from "H" to "L", the potential VN1 of the node N1 is also lowered, but the change amount of the VN1 is smaller than the change amount of the Vcom, so that the voltage between both ends of the liquid crystal capacitive element Clc drops, whereby the brightness is lowered.

Meanwhile, after that, when the opposite voltage Vcom is shifted from "L" to "H" again, the potential VN1 of the node N1 returns to the value provided when the opposite voltage Vcom shows "H" just before. Therefore, the voltage between both ends of the liquid crystal capacitive element Clc also returns to the right value, so that the state having the lowered brightness is recovered.

In the case where the writing is performed for the odd-numbered pixel when the opposite voltage Vcom is at "L" level, the brightness of the pixel of the odd-numbered row is lowered when Vcom is shifted to "H" level, but after that, when the Vcom is shifted to "L" level again, the lowered brightness is recovered. Similarly, in the case where the writing is performed for the even-numbered pixel when the opposite voltage Vcom is at "H" level, the brightness of the pixel of the even-numbered row is lowered when Vcom is shifted to "L" level, but after that, when Vcom is shifted to "H" level again, the lowered brightness is recovered.

As described above, at the point shown in FIG. 35A, since the opposite voltage Vcom is at "H", the desired brightness is shown in the pixel in the odd-numbered row, but the brightness is lowered in the pixel in the even-numbered row.

In addition, according to this embodiment, the level of the opposite voltage Vcom is not only reversed with respect to each horizontal period, but the polarity with respect to the opposite voltage Vcom in each pixel is also reversed with respect to each frame period during the writing action.

That is, at the point shown in FIG. 35A (the point just before the start of the writing phase shown in FIG. 34), the voltage is written for the pixel such that the polarity of the node N1 with respect to the opposite voltage Vcom becomes negative in the odd-numbered row and positive in the even-numbered row. In this case, in the writing phase shown in FIG. 34, the writing action is performed for the pixels such that the odd-numbered row becomes positive, and the even-numbered row becomes negative (refer to FIG. 35C below).

In the first horizontal period h1, the opposite voltage Vcom is reversed to "L" level. At this time, as shown in FIG. 35B, the brightness is lowered in the pixel in the odd-numbered row, while the lowered brightness is recovered and returns to the desired brightness in the pixel in the even-numbered row.

Thus, the gate line GL1 is activated, and the voltage according to the pixel data is written in each pixel circuit in the first row through the source line SL. As for the pixel a1, the writing is performed in this period h1, and as a result, the polarity of the node N1 (a1) becomes positive with respect to Vcom (polarity is reversed). In FIG. 35C, this is shown by describing "+" as the pixel in the first row.

In addition, at the point in FIG. 35C, since the writing action is actually performed for the pixel in the first row, the desired brightness is shown. This is the reason why the pixel in the first row is not hatched in FIG. 35C.

In the next second horizontal period h2, the opposite voltage Vcom is reversed to "H" level. At this time, as shown in FIG. 35D, while the brightness is lowered in the pixel in the first row and the even-numbered row, the lowered brightness is recovered and returns to the desired brightness in the pixel in the odd-numbered row except for the first row.

Thus, the gate line GL2 is activated, and the voltage according to the pixel data is written in each pixel circuit in the second row through the source line SL. As for the pixel b1, the writing is performed in this period h2, and as a result, the polarity of the node N1 (b1) becomes negative with respect to the Vcom (polarity is reversed). In FIG. 35E, this is shown by describing "−" as the pixel in the second row.

In the next third horizontal period h3, the opposite voltage Vcom is reversed to "L" level again. At this time, as shown in FIG. 35F, while the brightness is lowered in the pixel in the odd-numbered row except for the second row and the first row, the lowered brightness is recovered and returns to the desired brightness in the pixel in the even-numbered row except for the second row and the first row.

Thus, the gate line GL3 is activated, and the voltage according to the pixel data is written in each pixel circuit in the third row through the source line SL. As for the pixel c1, the writing is performed in this period h3, and as a result, the polarity of the node N1 (c1) becomes positive with respect to the Vcom (polarity is reversed). In FIG. 35F, this is shown by describing "+" as the pixel in the third row.

Similarly, the writing action is performed with respect to each row in the one horizontal period while shifting the level of the Vcom.

In the case of the writing action in this embodiment, the row whose brightness is lowered over the writing action period returns to the desired brightness in the one horizontal period (30 to 100 μs). In addition, by narrowing a time interval between the Vcom reversing action and the writing action, the row whose brightness is lowered is not provided in series. Thus, even when the row whose brightness is lowered exists, as long as its adjacent row has the desired brightness, the brightness is averaged in the display region. As a result, the problem that the flicker is recognized as shown in FIG. 33 can be resolved.

<<Self Refreshing Action>>

According to the second and third embodiments, the value of the opposite voltage Vcom is constant over the one frame period in the self refreshing action. Thus, as described above in the fifth embodiment, the external refreshing action or the external polarity reversing action is appropriately combined to reverse the polarity collectively.

However, in the case of this embodiment, the polarity with respect to the Vcom is different between the odd-numbered row and the even-numbered row. That is, among the pixel circuits written at high level, the potential VN1 of the node N1 of the pixel circuit existing in the odd-numbered row and the potential VN1 of the node N1 of the pixel circuit existing in the even-numbered row have the different values.

That is, as the potentials written in the pixel nodes N1, there are five kinds such as VN1 (+H), VN1 (+M), VN1 (L), VN1 (−M), and VN1 (−H) (VN1 (+L) and VN1 (−L) are regarded as the same) as the refreshing desired voltage, wherein "+" represents the case where the polarity with respect to the Vcom is positive, and "−" represents the case where the polarity therewith is negative. Thus, VN1 (+H) and VN1 (+M) are written when the Vcom is at "L" level, and VN1 (−H) and VN1 (−M) are written when the Vcom is at "H" level.

As described above, when the value of the Vcom is shifted, the voltage between both ends of the liquid crystal capacitive element Clc drops, and when the value of the Vcom is restored, the voltage between both ends of the liquid crystal capacitive element Clc returns to the value at the time of the writing (as long as the leak current is not considered). In the case where the potential of the internal node N1 is deviated from the value at the time of the writing due to the presence of the leak current, the refreshing action is performed to eliminate this deviation. Based on this, at the time of the refreshing action, it is preferable to conform the levels of the Vcom at the time of the writing and the refreshing action so as not to consider the shift in potential of the internal node N1 due to the fluctuation of the Vcom.

According to this embodiment, as for the odd-numbered row, the writing is performed so that the polarity with respect to the Vcom becomes positive when the Vcom is at "L" level, and as for the even-numbered row, the writing is performed so that the polarity with respect to the Vcom becomes negative when the Vcom is at "H" level. Therefore, in the case where the self refreshing action is performed also, it is preferable that the refreshing action is executed for the odd-numbered row when the Vcom is at "L" level, and the refreshing action is executed for the even-numbered row when the Vcom is at "H" level.

Based on this, in the self refreshing action in this embodiment, the level of the Vcom is changed during the self refreshing action period, and then the refreshing action is executed for the odd-numbered row and the even-numbered row, separately.

Therefore, in performing the self refreshing action in this embodiment, the boost line BST needs to be divided into a boost line BSTo connected to the pixel circuit in the odd-numbered row, and a boost line BSTe connected to the pixel circuit in the even-numbered row. In addition, as for the second type pixel circuit (FIG. 5), the selection line SEL also needs to be divided into a selection line SELo connected to the pixel circuit in the odd-numbered row, and a selection line SELe connected to the pixel circuit in the even-numbered row.

Hereinafter, the first type pixel circuit 2A in FIG. 8 is assumed, and a description will be given of the case where the boost line connected to the pixel circuit is changed between the even-numbered row and the odd-numbered row. In addition, the description will be given assuming that the basic refreshing action method is the method described in the third embodiment (FIG. 23). In addition, in a case where the method described in the second embodiment is used, and a case where the self refreshing action is performed for the second and third type pixel circuits also, the self refreshing action may be performed using the same principle as described below, with respect to the even number and odd number separately.

Figure 36:
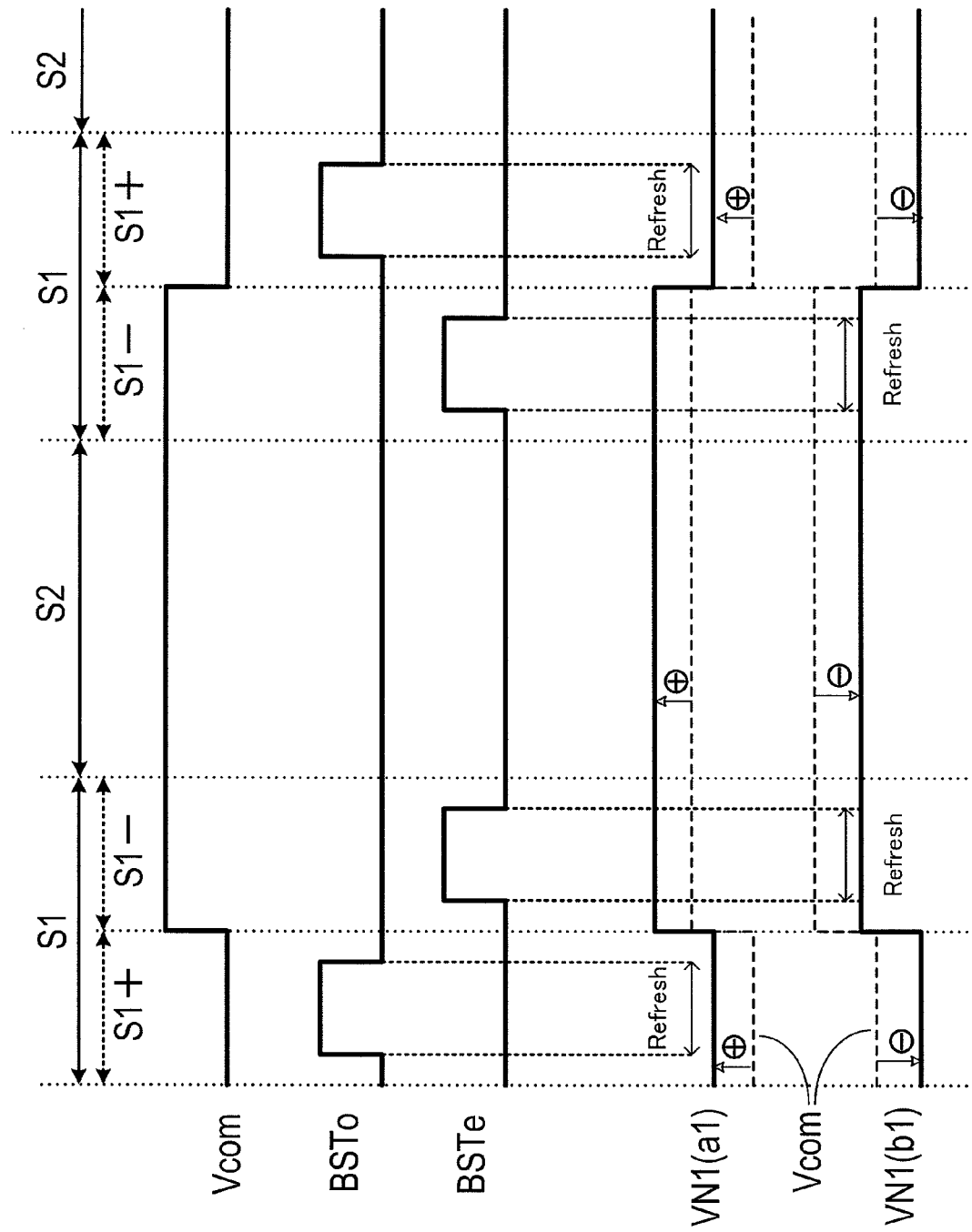
FIG. 36 is a timing chart of a self refreshing action in the seventh embodiment.

FIG. 36 is a timing chart of the self refreshing action of this embodiment. FIG. 36 selectively shows the parts only which are characteristic to this embodiment. In addition, similar to FIG. 34, the VN1 (a1) represents the potential of the internal node N1 of the specific pixel a1 existing in the first row, and the VN1 (b1) represents the potential of the internal node N1 of the specific pixel b1 existing in the second row.

Similar to FIG. 23, the self refreshing action is divided into the two steps S1 (refreshing step) and S2 (stand-by step). However, in this embodiment, the step S1 is divided into a step S1+ to perform the refreshing action for the odd-numbered row, and a step S1− to perform the refreshing action for the even-numbered row. In addition, here, it is assumed that at the point just before the start of the first step S1 shown in FIG. 36, the positive voltage with respect to the opposite voltage Vcom is written in the internal node N1 of the pixel circuit in the odd-numbered row, and the negative voltage with respect to the opposite voltage Vcom is written in the internal node N1 of the pixel circuit in the even-numbered row. In addition, at this point, it is assumed that the opposite voltage Vcom shows the "L" level.

When the term of the self refreshing action is started, similar to the third embodiment, while the predetermined voltages are applied to the reference line REF, and the source line SL, the voltage of the boost line BSTo of the odd-numbered row is set at "H" level, and only the pixel circuit arranged in the odd-numbered row is subjected to the boost upthrust. In addition, the boost line BSTe of the even-numbered row is kept at 0 V. Thus, the refreshing action is performed for the pixel circuit written to the predetermined level and arranged in the odd-numbered row. Similar to FIG. 23, when 4.5 V is applied to the reference line REF, 3.6 V is applied to the source line SL, and 10 V is applied to the boost line BSTo, the refreshing action is performed for the pixel circuit of the case M arranged in the odd-numbered row.

Then, with the voltage of the boost line BSTo continuously kept at "H" level, the voltages applied to the reference line REF and the source line SL are changed, and the target of the pixel circuit to be refreshed is changed. Similar to FIG. 23, when 6.5 V is applied to the reference line REF, and 5.6 V is applied to the source line SL, the refreshing action is performed for the pixel circuit of the case H arranged in the odd-numbered row.

In addition, in FIG. 36, it seems that the refreshing action for the pixel a1 is performed for the whole period while the boost line BSTo is at "H" level, but this means that the refreshing action may be performed at any point in this period. In the case where the refreshing method in FIG. 23 is used, when it is assumed that the "M" level voltage is written in the pixel a1, the refreshing action is performed in an anterior half of the period in which the "H" level voltage is applied to the boost line BSTo, and when it is assumed that "H" level voltage is written therein, the refreshing action is performed in a posterior half of the period in which the "H" level is applied to the boost line BSTo. In addition, when it is assumed that the "L" level voltage is written in the pixel a1, the refreshing action is not performed in the period of the step S1+ because the refreshing action is performed indirectly in the stand-by step S2.

After the refreshing actions for the odd-numbered rows in the case M and the case H have been completed, the voltage applied to the boost line BSTo in the odd-numbered row is set to "L" level, and the opposite voltage Vcom is shifted to "H" level. Thus, the potential VN1 of the internal node N1 in each pixel is thrust upward. As for the pixel circuit in the even-numbered row in which the negative polarity is written when the opposite voltage Vcom is at "H" level, the internal node N1 returns to the value close to the desired writing voltage when the opposite voltage Vcom is shifted to "H" level. However, since this only eliminates a fluctuation error of the internal node N1 depending on the polarity reversing action of the opposite voltage Vcom, the refreshing action needs to be performed to restore the potential lowered by the presence of the leak current.

Thus, after the reference line REF and the source line SL have been set to the predetermined voltages, the voltage applied to the boost line BSTe in the even-numbered row is shifted to "H" level, and only the pixel circuit arranged in the even-numbered row is subjected to the boost upthrust. In addition, the boost line BSTo of the odd-numbered row is kept at 0 V. Thus, the refreshing action is performed for the pixel circuit written to the predetermined level and arranged in the even-numbered row. Then, the voltage applied to the reference line REF and the source line SL are changed, and the refreshing action is also performed for the pixel circuit in the even-numbered row written to the different level.

In addition, in the case of the even-numbered row, the writing is performed so that the polarity becomes negative with respect to the Vcom. Similar to the odd-numbered row, when it is assumed that the three-valued writing is performed in each pixel circuit, at the point when the Vcom=5 V (H level), the case H (high level writing) is such that VN1 (H)=0 V, the case M (middle level writing) is such that VN1 (M)=2 V (=5−3), and the case L (low level writing) is such that VN1 (L)=5 V. That is, when simply focusing on the potential of the internal node N1, the lowest potential is provided in the case H, and the potential becomes high in the order of the case M and the case L.

Therefore, when 2.6 V is applied to the source line SL, 3.5 V is applied to the reference line REF, and 10 V is applied to the boost line BSTo in the step S1−, the refreshing action is performed for the pixel circuit of the case M arranged in the even-numbered row. With the voltage of the boost line BSTe continuously maintained at "H" level, 6.5 V is applied to the reference line REF, and 5.6 V is applied to the source line SL, so that the refreshing action is performed for the pixel circuit in the case L arranged in the even-numbered row.

Thus, the voltage of the boost line BSTe is shifted to "L" level, and 0 V is applied to the source line SL. In addition, a voltage that turns on the transistors T2 in all the pixel circuits is applied to the reference line REF. Since the Vcom is at "H" level, the VN1 in the pixel circuit in which the "H" level writing is performed in the odd-numbered row shows about 10 V (=5+5). Thus, when 15 V is applied to the REF, the transistors T2 can be turned on in all the pixel circuits.

Such voltage state is maintained for a predetermined time (step S2). Thus, as for the pixel circuit in which the "H" level writing is performed in the even-numbered row, the potential VN1 of the internal node N1 gradually approaches 0 V, and refreshing action is executed indirectly. In addition, as for the pixel circuit in which the "L" level writing is performed in the odd-numbered row, it is preferable to perform the indirect refreshing action when the Vcom shows the "L" level.

After the voltage state in the step S2 has been maintained for a predetermined time, the Vcom shows "H" level, so that the voltages to the reference line REF and the source line SL are set at the appropriate voltage values, and the refreshing action is executed in the even-numbered row by thrusting upward the boost line BSTo. Then, after the value of the Vcom has been shifted to "L" level, the voltages to the reference line REF and the source lines SL are set at the appropriate values, and the refreshing action is executed in the even-numbered row by thrusting upward the boost line BSTe.

Then, while the Vcom shows "L" level, 0 V is applied to the source line SL, and the refreshing action is executed indirectly for the pixel circuit in which the "L" level writing is performed in the odd-numbered row.

In addition, according to this embodiment, the description has been given assuming that the boost line BSTo is connected to the pixel circuit in the odd-numbered row, and the boost line BSTe is connected to the pixel circuit in the even-numbered row, but in a case where the boost line BST extends in the column direction, the boost line BSTo may be connected to the pixel circuit in an odd-numbered column, and the boost line BSTe may be connected to the pixel circuit in an even-numbered column, as a matter of course.

[Other Embodiments]

Hereinafter other embodiments will be described.

<1> The description has been given assuming that the constant display mode serving as the target of the self refreshing action is smaller in display color number than the normal display mode. However, by increasing the gradation number to increase the display color number to a certain level, the liquid crystal display may be implemented only by the constant display mode. In this case, the full-color display cannot be implemented like the normal display mode, but the display process can be performed only by the constant display mode of the present invention, for a screen in which the required displayable color number is not so many.

In addition, when the gradation number increases, the number of times to apply the pulse increases in the self refreshing action in the second embodiment, that is, the phase number also increases in the refreshing step S1. The second embodiment can be implemented with the phases P1 and P2 in the case of the three values, but three phases are needed in the case of four gradations, and four phases are needed in the case of five gradations.

Meanwhile, according to the method of the third embodiment, with the voltage to the boost line BST kept constant from the start of the phase P1, the number of the voltage applications to the reference line REF, and the number of the voltage application to the source line SL is changed to (gradation number −1).

In addition, as the values of the pixel data in the constant display mode, 5 V, 3 V, and 0 V are employed in the above embodiments, the values are not limited to the above voltage values, as a matter of course.

<2> As for the second type pixel circuits 2B (FIGS. 9 to 11), the low level voltage may be applied to the reference line REF at the time of writing actions in the normal display mode and the constant display mode to turn off the transistor T2. In this case, the internal node N1 and the output node N2 are electrically isolated, and as a result, the potential of the pixel electrode 20 is not affected by the voltage of the output node N2 before the writing action. Thus, the voltage of the pixel electrode 20 correctly reflects the voltage applied to the source line SL, and the image data can be displayed without an error.

<3> In the above embodiments, the second switch circuit 23 and the control circuit 24 are provided with respect to each pixel circuit 2 formed on the active matrix substrate 10. Meanwhile, in a case where two kinds of pixel parts such as a transmissive pixel part to perform a transmissive liquid crystal display, and a reflective pixel part to perform a reflective liquid crystal display are provided on the active matrix substrate 10, the second switch circuit 23 and the control circuit 24 may be provided only for the pixel circuit of the reflective pixel part, and the second switch circuit 23 and the control circuit 24 may not be provided for the pixel circuit of the transmissive display part.

In this case, the image is displayed by the transmissive pixel part in the normal display mode, and the image is displayed by the reflective pixel part in the constant display mode. In this configuration, the number of elements formed on the whole of the active matrix substrate 10 can be reduced.

<4> The pixel circuit 2 has the auxiliary capacitive element Cs in the above embodiments, but the auxiliary capacitive element Cs may not be provided. However, it is preferable to provide the auxiliary capacitive element Cs in order to further stabilize the potential of the internal node N1, and surely stabilize the display image.

Figure 37:
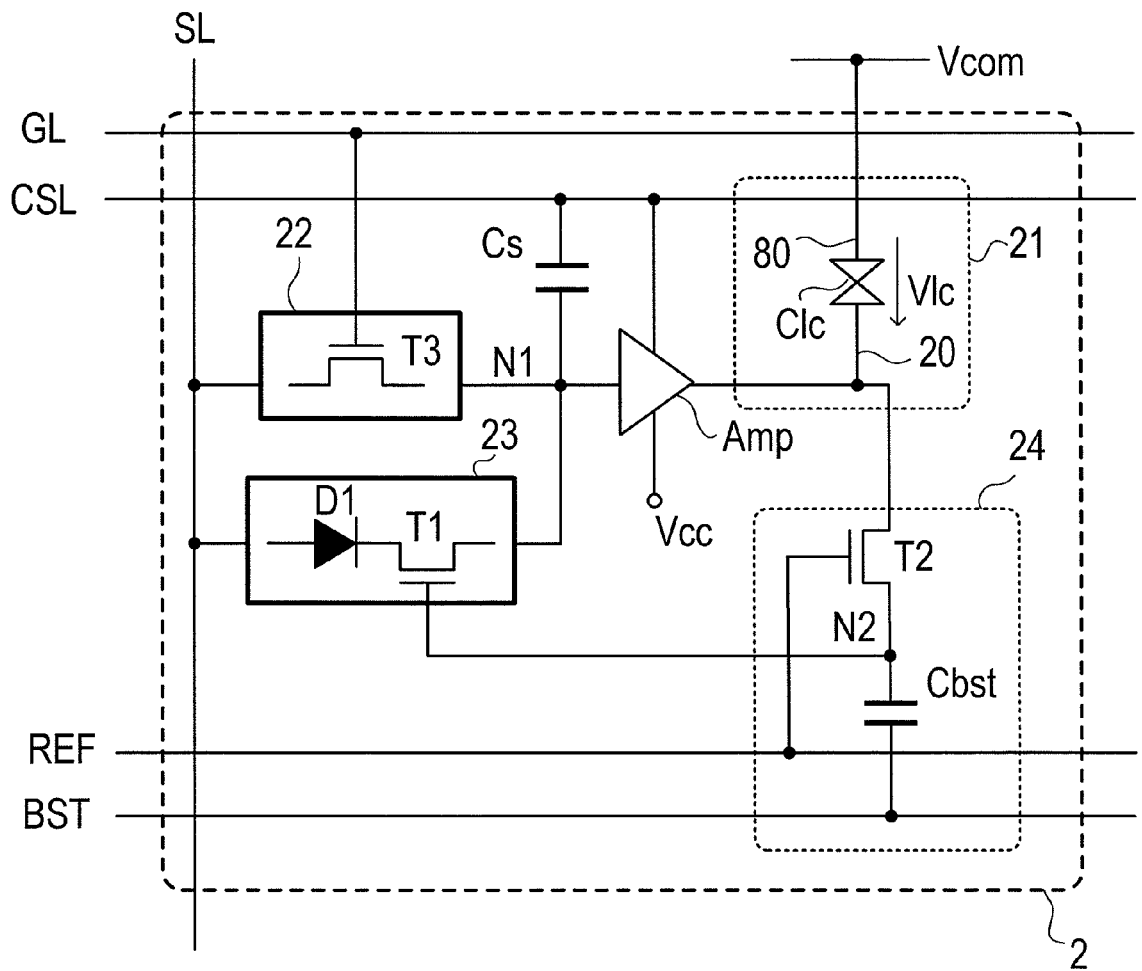
FIG. 37 is a circuit diagram showing still another basic circuit configuration of a pixel circuit in the present invention.

<5> It is assumed that the display element part 21 of the pixel circuit 2 is only composed of the unit liquid crystal display element Clc in the above embodiments, but as shown in FIG. 37, an analog amplifier Amp (voltage amplifier) may be provided between the internal node N1 and the pixel electrode 20. In FIG. 37, as one example, the auxiliary capacity line CSL and a power supply line Vcc are inputted as a power supply line of the analog amplifier Amp.

In this case, the voltage applied to the internal node N1 is amplified at a amplification factor n set by the analog amplifier Amp, and the amplified voltage is supplied to the pixel electrode 20. Thus, a fine voltage change of the internal node N1 can be reflected on the display image.

In addition, in this configuration, the voltage of the internal node N1 is amplified at the amplification factor η and supplied to the pixel electrode 20, in the self polarity reversing action in the constant display mode, so that the voltages in the first and second voltage states supplied to the pixel electrode 20 can be conformed to the high level and low level voltages of the opposite voltage Vcom by adjusting a difference in voltage between the first and second states applied to the source line SL.

<6> The N channel type polycrystalline silicon TFT are assumed as the transistors T1 to T4 in the pixel circuit 2 in the above embodiments, but a P channel type TFT or amorphous silicon TFT may be used. In this case, the pixel circuit 2 can be operated in the same manner as the above embodiments by reversing a height relationship of the voltages or a rectifying direction of the diode D1, and the same effect can be provided.

<7> The description has been given of the liquid crystal display device in the above embodiments, but the present invention is not limited to this, and the present invention can be applied to any display device as long as it has capacity corresponding to the pixel capacity Cp for holding the pixel data, and displays an image based on a voltage held in the capacity.

Figure 38:
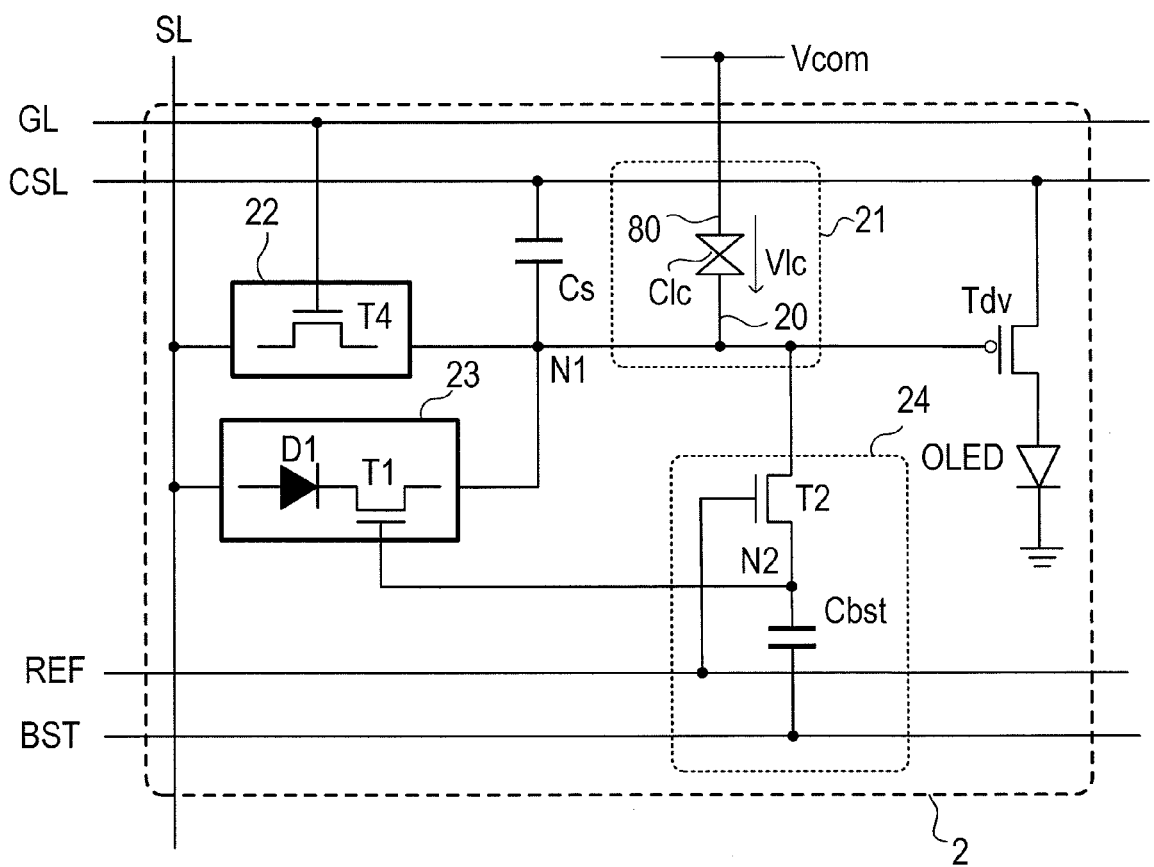
FIG. 38 is a circuit diagram showing still another basic circuit configuration of a pixel circuit in the present invention.

For example, in a case of an organic EL (Electroluminescence) display device which displays an image by holding a voltage corresponding to pixel data in capacity corresponding to pixel capacity, the present invention can be applied to the self refreshing action especially. FIG. 38 is a circuit diagram showing one example of a pixel circuit of the organic EL display device. In this pixel circuit, a voltage held in the auxiliary capacity Cs as the pixel data is applied to a gate terminal of a driving transistor Tdv composed of a TFT, and a current corresponding to the voltage flows to a light emitting element OLED through the driving transistor Tdv. Therefore, the auxiliary capacity Cs corresponds to the pixel capacity Cp in the above embodiments.

In addition, as for the pixel circuit shown in FIG. 38, unlike the liquid crystal display device which displays the image by controlling optical transmittance by applying the voltage to between electrodes, it displays an image by light emission of the element when a current flows in the element. Therefore, the polarity of the voltage applied to between both ends of the element cannot be reversed due to a rectifying property of the light emitting element, and what is more, it is not needed.

<8> In the second embodiment, the self refreshing action of the second type pixel circuit has been described with reference to the timing charts in FIGS. 21 and 22. The second type pixel circuits 2B and 2C (FIGS. 9 to 15) are provided with the transistor T4, and also provided with the selection line SEL connected to the gate of the transistor T4 in addition to the boost line BST. Therefore, in this type pixel circuit, the voltage application timing to the boost line BST, and the turn-on timing of the T4 can be intentionally differentiated.

With this, in the case where the self refreshing action is performed for the second type pixel circuits 2B and 2C, the voltage application timing to the selection line SEL may be delayed a little from the timing to apply the voltage to the reference line REF and the boost line BST.

As described above, as for the pixel having the gradation lower than the gradation serving as the refreshing target, the voltage that can turn on the T2 is applied to the reference line REF. Thus, even when the voltage is applied to the boost line BST in this state, the potential of the node N2 of the pixel is not boosted, and as a result, the transistor T1 is not turned on.

However, depending on an effect of another element such as an ability of the transistor or a parasitic capacity of the node, even when the transistor T2 is on, the potential of the node N2 could be temporarily boosted when the voltage is applied to the boost line BST. In this case, the transistor T1 is turned on at that point, and as a result the pixel could be rewritten by the voltage having the different gradation.

Meanwhile, by delaying the turn-on timing of the transistor T4 a little from the voltage application timing to the boost line BST, even when the potential of the node N2 temporarily rises and the transistor T1 is on in this period, the transistor T4 is off, so that the source line SL and the node N1 cannot be connected by the transistor T4. In addition, even when the potential of the node N2 temporarily rises, the electric charge is absorbed into the parasitic capacity of the node N1 after that, so that the potential of the node N2 falls. The transistor T1 is turned off at this time, so that even when the node T4 is turned on, the node N1 of the pixel circuit of the gradation lower than the refreshing target gradation is not rewritten by the voltage applied to the source line SL.

As described above, according to the second type pixel circuit especially, the voltage application timing to the selection line SEL can be controlled independently from the voltage application timing to the boost line BST, so that the error operation in which the wrong gradation is written can be surely prevented by delaying it a little from the application timing to the boost line BST.

This method can be applied to the timing chart shown in FIG. 25 in the third embodiment. That is, in FIG. 25, the voltage application timing to the selection line SE may be delayed a little from the time t3.

In addition, the refreshing action cannot be performed in the first type or the third type by this method, but probability the above error writing occurs is low from the beginning, so that the original gradation can be correctly restored by the refreshing action performed by the method described in the second embodiment.

EXPLANATION OF REFERENCE

1: Liquid crystal display device
2: Pixel circuit
2A, 2B, 2C, 2D, 2E: Pixel circuit
10: Active matrix substrate
11: Display control circuit
12: Opposite electrode drive circuit
13: Source driver
14: Gate driver
20: Pixel electrode
21: Display element part
22: First switch circuit
23: Second switch circuit
24: Control circuit
74: Sealing material
75: Liquid crystal layer
80: Opposite electrode
81: Opposite substrate
Amp: Analog amplifier
BST: Boost line
Cbst: Boost capacitive element
Clc: Liquid crystal display element
CML: Opposite electrode wiring
CSL: Auxiliary capacity line
Cs: Auxiliary capacitive element
Ct: Timing signal
D1: Diode element
DA: Digital image signal
Dv: Data signal
GL (GL1, GL2, . . . , GLn): Gate line
Gtc: Scan side timing control signal
N1: Internal node
N2: Output node
OLED: Light emitting element
P1, P2: Phase
REF: Reference line
S1, S2: Step
Sc1, Sc2, . . . , Scm: Source signal
SEL: Selection line
SL (SL1, SL2, . . . , SLm): Source line
Stc: Data side timing control signal
T1, T2, T3, T4, T5: Transistor
Tdv: Driving transistor
Vcom: Opposite voltage
Vlc: Liquid crystal voltage
VN1: Internal node potential, Pixel electrode potential
VN2: Output node potential

The invention claimed is:

1. A pixel circuit comprising:
a display element part including a unit display element;
an internal node composing a part of the display element part, for holding a pixel data voltage applied to the display element part;
a first switch circuit for transferring the pixel data voltage supplied from a data signal line to the internal node through at least a predetermined switch element;
a second switch circuit for transferring a voltage supplied from the data signal line to the internal node without passing through the predetermined switch element; and
a control circuit for holding a predetermined voltage depending on the pixel data voltage held by the internal node at one end of a first capacitive element, and controlling ON/OFF of the second switch circuit, wherein the second switch circuit is a series circuit comprising a first transistor element having a first terminal, a second terminal, and a control terminal for controlling connection between the first and second terminals, and a diode element, the control circuit is a series circuit comprising a second transistor element having a first terminal, a second terminal, and a control terminal for controlling connection between the first and second terminals, and the first capacitive element, one end of each of the first and second switch circuits is connected to the data signal line, the other end of each of the first and second switch circuits, and the first terminal of the second transistor element are connected to the internal node, the diode element has a rectifying function from the data signal line to the internal node, the control terminal of the first transistor element, the second terminal of the second transistor element, and one end of the first capacitive element are connected to each other to form an output node of the control circuit, the control terminal of the second transistor element is connected to a first control line, and the other end of the first capacitive element is connected to a second control line.

2. The pixel circuit according to claim 1, wherein the predetermined switch element comprises a third transistor element having a first terminal, a second terminal, and a control terminal for controlling connection between the first and second terminals, and the control terminal of the third transistor element is connected to a scan signal line.

3. The pixel circuit according to claim 1, wherein the second switch circuit is a series circuit comprising the first transistor element, the diode element, and a fourth transistor element having a first terminal, a second terminal, and a control terminal for controlling connection between the first and second terminals, and the control terminal of the fourth transistor element is connected to the second control line or a third control line.

4. The pixel circuit according to claim 3, wherein the first switch circuit is a series circuit comprising the fourth transistor element in the second switch circuit and the predetermined switch element, or a series circuit comprising a fifth transistor element having a control terminal connected to the control terminal of the fourth transistor element in the second switch circuit and the predetermined switch element.

5. The pixel circuit according to claim 1, further comprising:

a second capacitive element having one end connected to the internal node, and the other end connected to a fourth control line or a predetermined fixed voltage line.

6. A display device in which a pixel circuit array comprises a plurality of pixel circuits, each according to claim 1, arranged in a row direction and a column direction, the data signal line is provided with respect to each of the columns, one end of the first switch circuit in each of the pixel circuits arranged in the same column is connected to a common data signal line, the control terminal of the second transistor element in each of the pixel circuits arranged in the same row or the same column is connected to a common first control line, and the other end of the first capacitive element in each of the pixel circuits arranged in the same row or the same column is connected to a common second control line, the display device comprising:

a data signal line drive circuit for driving the data signal lines individually; and a control line drive circuit for driving the first and second control lines individually.

7. The display device according to claim 6, wherein the predetermined switch element is a third transistor element having a first terminal, a second terminal, and a control terminal for controlling connection between the first and second terminals, the control terminal being connected to a scan signal line, the scan signal line is provided with respect to each of the rows, and the pixel circuits arranged in the same row are connected to a common scan signal line, and a scan signal line drive circuit for driving the scan signal lines individually is provided.

8. The display device according to claim 7, wherein the second switch circuit is a series circuit comprising the first transistor element, the diode element, and a fourth transistor element having a first terminal, a second terminal, and a control terminal for controlling connection between the first and second terminals, and the control terminal of the fourth transistor element in each of the pixel circuits arranged in the same row or the same column is connected to the common second control line.

9. The display device according to claim 7, wherein he second switch circuit is a series circuit comprising the first transistor element, the diode element, and a fourth transistor element having a first terminal, a second terminal, and a control terminal for controlling connection between the first and second terminals, the control terminal of the fourth transistor element in each of the pixel circuits arranged in the same row or the same column is connected to a common third control line, and the control line drive circuit drives the first to third control lines, individually.

10. The display device according to claim 8, wherein the first switch circuit is a series circuit comprising the fourth transistor element in the second switch circuit, and the third transistor element, or a series circuit comprising a fifth transistor element having a control terminal connected to the control terminal of the fourth transistor element in the second switch circuit, and the third transistor element.

11. The display device according to claim 9, wherein the first switch circuit is a series circuit comprising the fourth transistor element in the second switch circuit, and the third transistor element, or a series circuit comprising a fifth transistor element having a control terminal connected to the control terminal of the fourth transistor element in the second switch circuit, and the third transistor element.

12. The display device according to claim 7, wherein at a time of a writing action for writing the pixel data in the pixel circuits arranged in one selected row individually, the scan signal line drive circuit applies a predetermined selected row voltage to the scan signal line in the selected row to turn on the third transistor elements arranged in the selected row, and applies a predetermined unselected row voltage to the scan signal line in an unselected row to turn off the third transistor elements arranged in the unselected row, and the data signal line drive circuit applies a data voltage corresponding to the pixel data to be written in the pixel circuit in each column in the selected row, to the data signal lines, individually.

13. The display device according to claim 12, wherein at the time of the writing action, the control line drive circuit applies a predetermined voltage to the first control line to turn on the second transistor element.

14. The display device according to claim 10, wherein at a time of a writing action for writing the pixel data in the pixel circuits arranged in one selected row individually, the scan signal line drive circuit applies a predetermined selected row voltage to the scan signal line in the selected row to turn on the third transistor elements arranged in the selected row, and applies a predetermined unselected row voltage to the scan signal line in an unselected row to turn off the third transistor elements arranged in the unselected row, the control line drive circuit applies a predetermined selecting voltage to the second control line arranged in the selected row to turn on the fourth transistor elements, and applies a predetermined non-selecting voltage to the second control line in the unselected row to turn off the fourth transistor elements, and the data signal line drive circuit applies a data voltage corresponding to the pixel data to be written in the pixel circuit in each column in the selected row, to the data signal lines, individually.

15. The display device according to claim 11, wherein at a time of a writing action for writing the pixel data in the pixel circuits arranged in one selected row individually, the scan signal line drive circuit applies a predetermined selected row voltage to the scan signal line in the selected row to turn on the third transistor elements arranged in the selected row, and applies a predetermined unselected row voltage to the scan signal line in an unselected row to turn off the third transistor elements arranged in the unselected row, the control line drive circuit applies a predetermined selecting voltage to the third control line arranged in the selected row to turn on the fourth transistor elements, and applies a predetermined non-selecting voltage to the third control line in the unselected row to turn off the fourth transistor elements, and the data signal line drive circuit applies a data voltage corresponding to the pixel data to be written in the pixel circuit in each column in the selected row, to the data signal lines, individually.

16. The display device according to claim 7, wherein the internal node of each of the pixel circuits in the pixel circuit array holds one voltage state among a plurality of discrete voltage states, in which multi-gradation is implemented by the different voltage states, and at a time of a self refreshing action for compensating voltage fluctuations of the internal nodes at the same time by activating the second switch circuits and the control circuits in the plurality of pixel circuits, the scan signal line drive circuit applies a predetermined voltage to the scan signal lines connected to all the pixel circuits in the pixel circuit array to turn off the third transistor elements, the data signal line drive circuit applies a refreshing input voltage provided by adding a predetermined first adjusting voltage corresponding to a voltage drop in the second switch circuit, to a refreshing desired voltage corresponding to the voltage state of a target gradation to be subjected to a refreshing action, to the data signal line, and the control line drive circuit applies a refreshing reference voltage provided by adding a predetermined second adjusting voltage corresponding to a voltage drop in the first control line and the internal node, to a refreshing isolation voltage defined by a middle voltage between a voltage state of a gradation one step lower than the target gradation and the voltage state of the target gradation, to the first control line, and applies a boost voltage having a predetermined amplitude to the second control line to apply a voltage change due to capacitive coupling through the first capacitive element, to the output node, and when the voltage state of the internal node is higher than the refreshing desired voltage, the diode element is reversely biased from the data signal line to the internal node, and the data signal line and the internal node are not connected, when the voltage state of the internal node is lower than the refreshing isolation voltage, a potential fluctuation of the output node due to the boost voltage application is suppressed, the first transistor element is turned off, and the data signal line and the internal node are not connected, and when the voltage state of the internal node is higher than the refreshing isolation voltage and lower than the refreshing desired voltage, the diode element is forwardly biased from the data signal line to the internal node, the potential fluctuation of the output node is not suppressed, the first transistor element is turned on, and the refreshing desired voltage is applied to the internal node, so that the refreshing action is executed for the pixel circuit having the internal node showing the voltage state of the target gradation.

17. The display device according to claim 8, wherein the internal node of each of the pixel circuits in the pixel circuit array holds one voltage state among a plurality of discrete voltage states, in which multi-gradation is implemented by the different voltage states, and at a time of a self refreshing action for compensating voltage fluctuations of the internal nodes at the same time by activating the second switch circuits and the control circuits in the plurality of pixel circuits, the scan signal line drive circuit applies a predetermined voltage to the scan signal lines connected to all the pixel circuits in the pixel circuit array to turn off the third transistor elements, the data signal line drive circuit applies a refreshing input voltage provided by adding a predetermined first adjusting voltage corresponding to a voltage drop in the second switch circuit, to a refreshing desired voltage corresponding to the voltage state of a target gradation to be subjected to a refreshing action, to the data signal line, and the control line drive circuit applies a refreshing reference voltage provided by adding a predetermined second adjusting voltage corresponding to a voltage drop in the first control line and the internal node, to a refreshing isolation voltage defined by a middle voltage between a voltage state of a gradation one step lower than the target gradation and the voltage state of the target gradation, to the first control line, and applies a boost voltage having a predetermined amplitude to the second control line to apply a voltage change due to capacitive coupling through the first capacitive element, to the output node, and when the voltage state of the internal node is higher than the refreshing desired voltage, the diode element is reversely biased from the data signal line to the internal node, and the data signal line and the internal node are not connected, when the voltage state of the internal node is lower than the refreshing isolation voltage, a potential fluctuation of the output node due to the boost voltage application is suppressed, the first transistor element is turned off, and the data signal line and the internal node are not connected, and when the voltage state of the internal node is higher than the refreshing isolation voltage and lower than the refreshing desired voltage, the diode element is forwardly biased from the data signal line to the internal node, the potential fluctuation of the output node is not suppressed, the first transistor element is turned on, and the refreshing desired voltage is applied to the internal node, so that the refreshing action is executed for the pixel circuit having the internal node showing the voltage state of the target gradation.

18. The display device according to claim 9, wherein
the internal node of each of the pixel circuits in the pixel circuit array holds one voltage state among a plurality of discrete voltage states, in which multi-gradation is implemented by the different voltage states, and at a time of a self refreshing action for compensating voltage fluctuations of the internal nodes at the same time by activating the second switch circuits and the control circuits in the plurality of pixel circuits, the scan signal line drive circuit applies a predetermined voltage to the scan signal lines connected to all the pixel circuits in the pixel circuit array to turn off the third transistor elements, the data signal line drive circuit applies a refreshing input voltage provided by adding a predetermined first adjusting voltage corresponding to a voltage drop in the second switch circuit, to a refreshing desired voltage corresponding to the voltage state of a target gradation to be subjected to a refreshing action, to the data signal line, and the control line drive circuit applies a refreshing reference voltage provided by adding a predetermined second adjusting voltage corresponding to a voltage drop in the first control line and the internal node, to a refreshing isolation voltage defined by a middle voltage between a voltage state of a gradation one step lower than the target gradation and the voltage state of the target gradation, to the first control line, applies a predetermined voltage to the third control line to turn on the fourth transistor element, and applies a boost voltage having a predetermined amplitude to the second control line to apply a voltage change due to capacitive coupling through the first capacitive element, to the output node, and when the voltage state of the internal node is higher than the refreshing desired voltage, the diode element is reversely biased from the data signal line to the internal node, and the data signal line and the internal node are not connected, when the voltage state of the internal node is lower than the refreshing isolation voltage, a potential fluctuation of the output node due to the boost voltage application is suppressed, the first transistor element is turned off, and the data signal line and the internal node are not connected, and when the voltage state of the internal node is higher than the refreshing isolation voltage and lower than the refreshing desired voltage, the diode element is forwardly biased from the data signal line to the internal node, the potential fluctuation of the output node is not suppressed, the first transistor element is turned on, and the refreshing desired voltage is applied to the internal node, so that the refreshing action is executed for the pixel circuit having the internal node showing the voltage state of the target gradation.

19. The display device according to claim 16, wherein
under the condition that the third transistor element is turned off, the refreshing input voltage is applied to the data signal line, and the refreshing reference voltage is applied to the first control line, the action to apply the boost voltage to the second control line is executed several times while changing the values of the refreshing input voltage and the refreshing isolation voltage, so that the refreshing action is sequentially executed for the pixel circuits having the internal nodes showing the voltage states of different gradations.

20. The display device according to claim 19, wherein
the boost voltage is applied while the refreshing input voltage and the refreshing isolation voltage are changed the number of times provided by subtracting one from the number of gradations corresponding to the number of the voltage states held by the internal node of each of the pixel circuits in the pixel circuit array.

21. The display device according to claim 19, wherein
after completion of a refreshing step including an action in which the action to apply the boost voltage to the second control line is executed several times while changing the values of the refreshing input voltage and the refreshing isolation voltage under the condition that the third transistor element is turned off, the refreshing input voltage is applied to the data signal line, and the refreshing reference voltage is applied to the first control line, a stand-by step is executed in such a manner that the data signal line drive circuit applies a voltage corresponding to a minimum value of the voltage state held by the internal node to the data signal line, and the control line drive circuit does not apply the boost voltage to the second control line, and applies a voltage to the first control line over at least a given time to turn on the second transistor element regardless of the voltage state of the internal node.

22. The display device according to claim 21, wherein
after the stand-by step is executed over a time which is ten times as long as that of the refreshing step, the refreshing step is executed again.

23. The display device according to claim 16, wherein
the first adjusting voltage is a turn-on voltage of the diode element.

24. The display device according to claim 16, wherein
the second adjusting voltage is a threshold voltage of the second transistor element.

25. The display device according to claim 9, wherein
the internal node of each of the pixel circuits in the pixel circuit array holds one voltage state among a plurality of discrete voltage states, in which multi-gradation is implemented by the different voltage states, and at a time of a self refreshing action for compensating voltage fluctuations of the internal nodes at the same time by activating the second switch circuits and the control circuits in the plurality of pixel circuits, the scan signal line drive circuit applies a predetermined voltage to the scan signal lines connected to all the pixel circuits in the pixel circuit array to turn off the third transistor elements, the data signal line drive circuit applies a refreshing input voltage provided by adding a predetermined first adjusting voltage corresponding to a voltage drop in the second switch circuit, to a refreshing desired voltage corresponding to the voltage state of a target gradation to be subjected to a refreshing action, to the data signal line, and the control line drive circuit applies a refreshing reference voltage provided by adding a predetermined second adjusting voltage corresponding to a voltage drop in the first control line and the internal node, to a refreshing isolation voltage defined by a middle voltage between a voltage state of a gradation one step lower than the target gradation and the voltage state of the target gradation, to the first control line, applies a boost voltage having a predetermined amplitude to the second control line to apply a voltage change due to capacitive coupling through the first capacitive element, to the output node, and applies a predetermined voltage to the third control line to turn on the fourth transistor element, and when the voltage state of the internal node is higher than the refreshing desired voltage, the diode element is reversely biased from the data signal line to the internal node, and the data signal line and the internal node are not connected, when the voltage state of the internal node is lower than the refreshing isolation voltage, a potential fluctuation of the output node due to the boost voltage application is suppressed, the first transistor element is turned off, and the data signal line and the internal node are not connected, and when the voltage state of the internal node is higher than the refreshing isolation voltage and lower than the refreshing desired voltage, the diode element is forwardly biased from the data signal line to the internal node, the potential fluctuation of the output node is not suppressed, the first transistor element is turned on, and the refreshing desired voltage is applied to the internal node, so that the refreshing action is executed for the pixel circuit having the internal node showing the voltage state of the target gradation.

26. The display device according to claim 16, wherein at the time of the self refreshing action,
under a condition that a first gradation is set as the target gradation, the refreshing input voltage is applied to the data signal line, and the refreshing reference voltage is applied to the first control line, the boost voltage is applied to the second control line, and then
with the boost voltage continuously applied, a second gradation one step higher than the first gradation is set as the target gradation, the refreshing reference voltage applied to the first control line is changed, and thereafter the refreshing input voltage applied to the data signal line is changed, so that the refreshing action is sequentially executed for the pixel circuits having the internal nodes showing the voltage states of different gradations.

27. The display device according to claim 26, wherein in a case where a gradation higher than the second gradation exists,
after completion of the refreshing action for the second gradation, with the boost voltage continuously applied, an action is repeatedly executed in such a manner that a one step higher gradation is set as the target gradation, the refreshing reference voltage applied to the first control line is changed, and thereafter the refreshing input voltage applied to the data signal line is changed.

28. The display device according to claim 18, wherein at the time of the self refreshing action,
under a condition that a first gradation is set as the target gradation, the refreshing input voltage is applied to the data signal line, and the refreshing reference voltage is applied to the first control line, the boost voltage is applied to the second control line, and a predetermined voltage is applied to the third control line to turn on the fourth transistor element, and then
with the boost voltage and the predetermined voltage to turn on the fourth transistor element continuously applied, a second gradation one step higher than the first gradation is set as the target gradation, the refreshing reference voltage applied to the first control line is changed, and thereafter the refreshing input voltage applied to the data signal line is changed, so that the refreshing action is sequentially executed for the pixel circuits having the internal nodes showing the voltage states of different gradations.

29. The display device according to claim 25, wherein at the time of the self refreshing action,
under a condition that a first gradation is set as the target gradation, the refreshing input voltage is applied to the data signal line, and the refreshing reference voltage is applied to the first control line, the boost voltage is applied to the second control line, and a predetermined voltage is applied to the third control line to turn on the fourth transistor element, and then
with the boost voltage and the predetermined voltage to turn on the fourth transistor element continuously applied, a second gradation one step higher than the first gradation is set as the target gradation, the refreshing reference voltage applied to the first control line is changed, and thereafter the refreshing input voltage applied to the data signal line is changed, so that the refreshing action is sequentially executed for the pixel circuits having the internal nodes showing voltage states of different gradations.

30. The display device according to claim 28, wherein in a case where a gradation higher than the second gradation exists,
after completion of the refreshing action for the second gradation, with the boost voltage and the predetermined voltage to turn on the fourth transistor element continuously applied, an action is repeatedly executed in such a manner that a one step higher gradation is set as the target gradation, the refreshing reference voltage applied to the first control line is changed, and thereafter the refreshing input voltage applied to the data signal line is changed.

31. The display device according to claim 16, wherein the second control lines connected to the other ends of the first capacitive elements of the pixel circuits arranged in odd-numbered rows or odd-numbered columns are electrically connected to each other,
the second control lines connected to the other ends of the first capacitive elements of the pixel circuits arranged in even-numbered rows or even-numbered columns are electrically connected to each other, and
the second control line connected to the other end of the first capacitive element of each of the pixel circuits arranged in the odd-numbered row or the odd-numbered column and the second control line connected to the other end of the first capacitive element of each of the pixel circuits arranged in the even-numbered row or the even-numbered column are not electrically connected to each other, and driven by the control line drive circuit individually.

32. The display device according to claim 17, wherein the second control lines connected to the other ends of the first capacitive elements of the pixel circuits arranged in odd-numbered rows or odd-numbered columns are electrically connected to each other, the second control lines connected to the other ends of the first capacitive elements of the pixel circuits arranged in even-numbered rows or even-numbered columns are electrically connected to each other, and the second control line connected to the other end of the first capacitive element of each of the pixel circuits arranged in the odd-numbered row or the odd-numbered column and the second control line connected to the other end of the first capacitive element of each of the pixel circuits arranged in the even-numbered row or the even-numbered column are not electrically connected to each other, and driven by the control line drive circuit individually.

33. The display device according to claim 18, wherein the second control lines connected to the other ends of the first capacitive elements, and the third control lines connected to the control terminals of the forth transistor elements are electrically connected to each other, respectively in the pixel circuits arranged in odd-numbered rows or odd-numbered columns, the second control lines connected to the other ends of the first capacitive elements, and the third control lines connected to the control terminals of the forth transistor elements are electrically connected to each other, respectively in the pixel circuits arranged in even-numbered rows or even-numbered columns, the second control line connected to the other end of the first capacitive element of each of the pixel circuits arranged in the odd-numbered row or the odd-numbered column, and the second control line connected to the other end of the first capacitive element of each of the pixel circuits arranged in the even-numbered row or the even-numbered column are not electrically connected to each other, and driven by the control line drive circuit individually, and the third control line connected to the control terminal of the fourth transistor terminal of each of the pixel circuits arranged in the odd-numbered row or the odd-numbered column, and the third control line connected to the control terminal of the fourth transistor terminal of each of the pixel circuits arranged in the even-numbered row or the even-numbered column are not electrically connected to each other, and driven by the control line drive circuit individually.

34. The display device according to claim 31, wherein a terminal, which is opposite to a terminal connected to the internal node, of the terminals of the unit display element is connected to a common electrode, and the writing is performed in such a manner that at the time of the writing action for writing the pixel data in the pixel circuit, a polarity of a potential of the internal node based on a potential of the common electrode is changed between the pixel circuits arranged in the odd-numbered row or the odd-numbered column, and the pixel circuits arranged in the even-numbered row or the even-numbered column.

35. The display device according to claim 34, wherein two high and low voltages are allowed to be applied to the common electrode, and the two high and low voltages to be applied to the common electrode are switched between a period to perform the writing action for the pixel circuits arranged in the odd-numbered row or the odd-numbered column, and a period to perform the writing action for the pixel circuits arranged in the even-numbered row or the even-numbered column.

36. The display device according to claim 35, wherein the refreshing action is executed for the pixel circuits arranged in the odd-numbered row or the odd-numbered column in such a manner that under a condition that one of the high and low voltages is applied to the common electrode, the third transistor element is turned off, and under a condition that the refreshing input voltage is applied to the data signal line, and the refreshing reference voltage is applied to the first control line, the boost voltage is applied to the second control line connected to the odd-numbered row or the odd-numbered column, and the refreshing action is executed for the pixel circuits arranged in the even-numbered row or the even-numbered column in such a manner that after the voltage applied to the common electrode is switched to the other of the high and low voltages, under the condition that the refreshing input voltage is applied to the data signal line, and the refreshing reference voltage is applied to the first control line, the boost voltage is applied to the second control line connected to the even-numbered row or the even-numbered column.

* * * * *